United States Patent
Oh et al.

(10) Patent No.: US 8,280,386 B2
(45) Date of Patent: Oct. 2, 2012

(54) SYSTEM AND METHOD FOR UTILIZING RESOURCES IN A COMMUNICATION SYSTEM

(75) Inventors: Seong-Keun Oh, Suwon-si (KR); Ki-Tae Kim, Seoul (KR)

(73) Assignee: Ajou University Industry-Academic Cooperation Foundation, Suwon-si (KR)

( * ) Notice: Subject to any disclaimer, the term of this patent is extended or adjusted under 35 U.S.C. 154(b) by 674 days.

(21) Appl. No.: 12/439,361

(22) PCT Filed: Aug. 31, 2007

(86) PCT No.: PCT/KR2007/004209
§ 371 (c)(1),
(2), (4) Date: Feb. 27, 2009

(87) PCT Pub. No.: WO2008/026897
PCT Pub. Date: Mar. 6, 2008

(65) Prior Publication Data
US 2010/0008311 A1    Jan. 14, 2010

(30) Foreign Application Priority Data
Aug. 31, 2006   (KR) ........................ 10-2006-0083918

(51) Int. Cl.
*H04W 40/00* (2009.01)
(52) U.S. Cl. ........ 455/447; 455/446; 455/450; 455/451; 455/452.1; 370/328
(58) Field of Classification Search .................. 455/447, 455/450–453, 509, 515, 516; 370/328, 329, 370/320; 447/446
See application file for complete search history.

(56) References Cited

U.S. PATENT DOCUMENTS

| | | | | |
|---|---|---|---|---|
| 5,365,571 A * | 11/1994 | Rha et al. | ...................... | 455/446 |
| 5,483,667 A * | 1/1996 | Faruque | ........................ | 455/447 |
| 5,974,323 A | 10/1999 | Doner | | |
| 5,974,324 A | 10/1999 | Henson | | |
| 6,097,708 A * | 8/2000 | Mao | ............................... | 370/329 |
| 6,212,385 B1 * | 4/2001 | Thomas et al. | ................ | 455/447 |
| 6,405,044 B1 * | 6/2002 | Smith et al. | ................... | 455/447 |
| 6,424,836 B1 | 7/2002 | Gil et al. | | |
| 6,741,582 B1 * | 5/2004 | Mansour | ....................... | 370/342 |
| 6,907,246 B2 * | 6/2005 | Xu et al. | ...................... | 455/447 |
| 6,952,586 B2 | 10/2005 | Kim et al. | | |
| 7,006,823 B2 * | 2/2006 | Shurvinton et al. | ........ | 455/422.1 |
| 7,151,937 B2 * | 12/2006 | Jin et al. | ........................ | 455/450 |
| 7,212,821 B2 * | 5/2007 | Laroia et | ........................ | 455/437 |
| 7,412,242 B2 * | 8/2008 | Cho et al. | ....................... | 455/447 |
| 7,474,895 B1 * | 1/2009 | Jiang et al. | .................... | 455/447 |
| 7,715,846 B2 * | 5/2010 | Ji et al. | ........................... | 455/447 |

(Continued)

FOREIGN PATENT DOCUMENTS
EP  1 043 861 A1   10/2000
(Continued)

*Primary Examiner* — Kamran Afshar
*Assistant Examiner* — Mong-Thuy Tran
(74) *Attorney, Agent, or Firm* — Jefferson IP Law, LLP

(57) ABSTRACT

A system and method for utilizing resources in a communication system are provided, in which a cell is divided into N sectors, a total frequency resource is divided into a center frequency region and a normal frequency region, the center frequency region is divided into N or more center frequency bands, and resources are allocated so that one sector uses at least one center frequency band and a normal frequency band corresponding to the normal frequency region.

20 Claims, 62 Drawing Sheets

U.S. PATENT DOCUMENTS

| | | | |
|---|---|---|---|
| 7,782,900 B2* | 8/2010 | Bachl et al. | 370/468 |
| 7,796,997 B2* | 9/2010 | Kim et al. | 455/450 |
| 2001/0046866 A1* | 11/2001 | Wang | 455/447 |
| 2002/0082003 A1* | 6/2002 | Chervatin et al. | 455/422 |
| 2003/0119517 A1* | 6/2003 | Dhainaut | 455/447 |
| 2004/0127223 A1* | 7/2004 | Li et al. | 455/446 |
| 2005/0068902 A1* | 3/2005 | Rath | 370/256 |
| 2005/0197129 A1* | 9/2005 | Cho et al. | 455/447 |
| 2005/0281189 A1* | 12/2005 | Lee et al. | 370/208 |
| 2005/0282550 A1* | 12/2005 | Cho et al. | 455/447 |
| 2006/0109865 A1* | 5/2006 | Park et al. | 370/482 |
| 2006/0189321 A1* | 8/2006 | Oh et al. | 455/452.2 |
| 2006/0205412 A1* | 9/2006 | Oh et al. | 455/450 |
| 2006/0212133 A1* | 9/2006 | Damnjanovic et al. | 700/1 |
| 2007/0036179 A1* | 2/2007 | Palanki et al. | 370/491 |
| 2008/0225752 A1 | 9/2008 | Kwon et al. | |
| 2008/0232320 A1* | 9/2008 | Lee et al. | 370/329 |

FOREIGN PATENT DOCUMENTS

| | | |
|---|---|---|
| KR | 10-1999-0050228 A | 7/1999 |
| KR | 10-2002-0012105 A | 2/2002 |
| KR | 10-2007-0023510 A | 2/2007 |
| KR | 10-2007-0113518 A | 11/2007 |

* cited by examiner

| | |
|---|---|
| ▨ | SECTOR 1 |
| ▧ | SECTOR 2 |
| ▦ | SECTOR 3 |

| | |
|---|---|
| ▨ | SECTOR 1 |
| ▧ | SECTOR 2 |
| ▦ | SECTOR 3 |

| | |
|---|---|
| ▨ | SECTOR 1 |
| ▧ | SECTOR 2 |
| ▦ | SECTOR 3 |

| | |
|---|---|
| ▨ | SECTOR 1 |
| ▧ | SECTOR 2 |
| ▦ | SECTOR 3 |

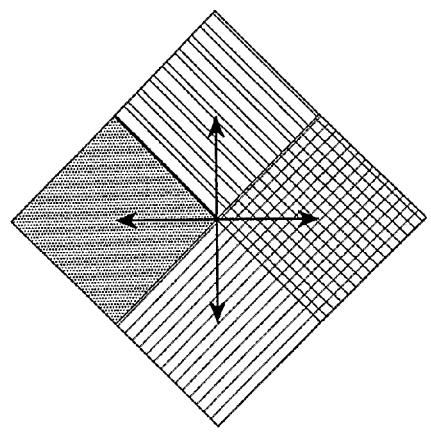
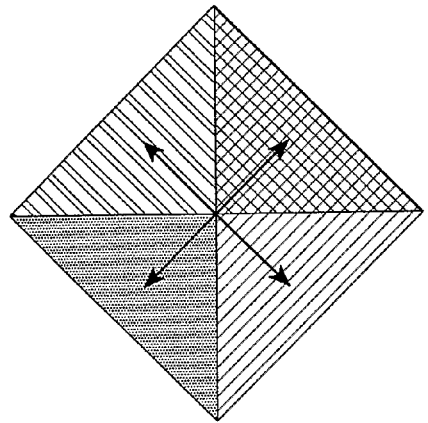
| | SECTOR 1 |
|---|---|
| | SECTOR 2 |
| | SECTOR 3 |
| | SECTOR 4 |
FIG.2A
| | SECTOR 1 |
|---|---|
| | SECTOR 2 |
| | SECTOR 3 |
| | SECTOR 4 |
FIG.2B
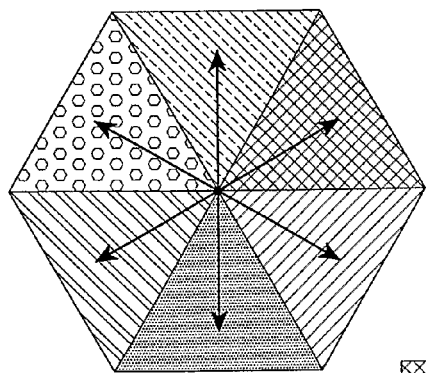
| | SECTOR 1 |
|---|---|
| | SECTOR 2 |
| | SECTOR 3 |
| | SECTOR 4 |
| | SECTOR 5 |
| | SECTOR 6 |
FIG.3

3-SECTOR ANTENNA PATTERN OF CLOVER CELL

3-SECTOR ANTENNA PATTERN OF HEXAGONAL CELL

SYSTEM AND METHOD FOR UTILIZING RESOURCES IN A COMMUNICATION SYSTEM

BACKGROUND OF THE INVENTION

1. Field of the Invention

The present invention relates to a system and method for utilizing resources in a communication system.

2. Description of the Related Art

Future-generation communication systems are under development to provide high-speed large data transmission/reception services to Mobile Stations (MSs). To accommodate more MSs, they are generally designed in the form of sectorized cellular communication systems (hereinafter, referred to as sectorized cellular communication systems).

A cell is sectorized by using directional antennas with a predetermined beamwidth, usually 120°, 90° or 60° in a Base Station (BS). Theoretically, if the sectors of the cell are mutually orthogonal, the system capacity increases by three, four, and six times for the respective sectorization angles. In practice, however, the beam patterns of the directional antennas, namely sectorized antennas overlap, rendering the sectors non-orthogonal. Therefore, the contribution of the cell sectorization to the system capacity is limited.

A major future-generation communication system is an Institute of Electrical and Electronics Engineers (IEEE) 802.16e communication system based on Orthogonal Frequency Division Multiplexing (OFDM). The IEEE 802.16e communication system is sectorized cellular communication systems. It seeks to fully utilize frequency resources in a cell by using ⅓ or less of the frequency resources for each sector. Compared to Code Division Multiple Access (CDMA), an OFDM sectorized cellular communication system such as the IEEE 802.16e suffers from interference among MSs to which the same frequency resources are allocated within a cell. Especially inter-sector interference affects performance degradation of MSs more adversely than inter-cell interference. Typically, the OFDM sectorized cellular communication system divides frequency resources for allocation to the sectors so that they are orthogonal in order to prevent the intra-cell interference. With the limitation of frequency resource allocation for no inter-sector interference on system design, an actual increase in the system capacity that can be achieved through cell sectorization does not approach a theoretical system capacity increase from cell sectorization.

SUMMARY OF THE INVENTION

An aspect of exemplary embodiments of the present invention is to address at least the problems and/or disadvantages and to provide at least the advantages described below. Accordingly, an aspect of exemplary embodiments of the present invention is to provide a system and method for utilizing resources in a communication system.

Another aspect of exemplary embodiments of the present invention is to provide a system and method for utilizing resources so as to avoid inter-sector interference in an OFDM sectorized cellular communication system.

A further aspect of exemplary embodiments of the present invention is to provide a system and method for utilizing resources so as to increase the amount of available frequency resources, while avoiding inter-sector interference in an OFDM sectorized cellular communication system.

In accordance with an aspect of exemplary embodiments of the present invention, there is provided a method for utilizing resources in a communication system, in which a cell is divided into N sectors, a total frequency resource is divided into a center frequency region and a normal frequency region, the center frequency region is divided into N or more center frequency bands, and resources are allocated so that one sector uses at least one center frequency band and a normal frequency band corresponding to the normal frequency region.

In accordance with another aspect of exemplary embodiments of the present invention, there is provided a system for utilizing resources in a communication system, in which a resource allocation system divides a cell into N sectors, divides a total frequency resource into a center frequency region and a normal frequency region, divides the center frequency region into N or more center frequency bands, and allocates resources so that one sector uses at least one center frequency band and a normal frequency band being the normal frequency region.

BRIEF DESCRIPTION OF THE DRAWINGS

The above and other objects, features and advantages of certain exemplary embodiments of the present invention will be more apparent from the following detailed description taken in conjunction with the accompanying drawings, in which:

FIGS. 2A and 2B illustrate 4-sector cell configurations according to exemplary embodiments of the present invention;

FIG. 3 illustrates 6-sector cell configurations according to an exemplary embodiment of the present invention;

Throughout the drawings, the same drawing reference numerals will be understood to refer to the same elements, features and structures.

DETAILED DESCRIPTION OF EXEMPLARY EMBODIMENTS

Figure 1A:
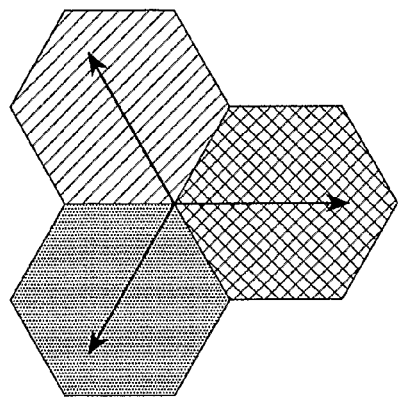
FIGS. 1A to 1D illustrate 3-sector cell configurations according to exemplary embodiments of the present invention.

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide a system and method for utilizing resources in an OFDM sectorized cellular communication system. For better understanding the subject matter of the present invention, terms used herein are defined as follows. Herein, center frequency band represents sector-centric frequency band, and normal frequency band represents general use frequency band. But, for convenience of explanation, in the present invention, center frequency band and normal frequency band are used.

(1) Sector boundary region: a region where inter-sector interference occurs. In the sector boundary region, interference from neighbor sectors within the same cell is equal to or higher than a predetermined interference requirement.

(2) Sector center region: a region where no inter-sector interference or negligibly small inter-sector interference occurs in a sector.

(3) Center frequency band: frequency resources immune from interference from neighbor sectors even in a sector boundary region among a total available frequency resource of a cell. Center frequency bands allocated to the sectors of the cell should be mutually orthogonal, but may overlap one another under some circumstances. The ratio of the center frequency band to the total frequency resource depends on situations of the OFDM sectorized cellular communication system.

(4) Normal frequency band: frequency resources that are spatially immune from inter-sector interference in a sector center region among the total available frequency resource of the cell and thus that are reusable in the sector center regions of all sectors in the cell. The ratio of the normal frequency band to the total frequency resource depends on situations of the OFDM sectorized cellular communication system.

The resource utilization system and method for the OFDM sectorized cellular communication system according to the present invention are designed according to the following two design steps.

<First Design Step: the Step of Designing a Resource Utilization System in the Case where an Antenna Beam Pattern is Determined>

(1) A sector boundary region and a sector center region are defined for each sector and a boundary threshold $\eta_{threshold}$ is set according to a sectorization factor, a cell shape, an interference criterion, a Quality of Service (QoS) parameter, etc. The sectorization factor indicates the number of sectors defined in one cell. If the sectorization factor is N, this means that one cell is divided into N sectors.

(2) For each sector, a center frequency bandwidth and a normal frequency bandwidth are determined in accordance with the ratio between the sector boundary region and the sector center region.

(3) The center frequency band is allocated to MSs located in the sector boundary region, while the normal frequency band is allocated to MSs in the sector center region.

(4) A Dynamic Channel Allocation (DCA) scheme is designed to dynamically allocate the resources of the center frequency band and the normal frequency band to MSs according to their locations.

<Second Design Step: the Step of Designing a Resource Utilization System in the Case where an Antenna Beam Pattern is Determined after Determining System Parameters>

(1) For each sector, a system-required center frequency bandwidth and normal frequency bandwidth are determined.

(2) A sector boundary region and a sector center region are defined for each sector and a boundary threshold $\eta_{threshold}$ is set according to a sectorization factor, a cell shape, an interference criterion, a QoS parameter, etc. An antenna beam pattern is designed accordingly.

(3) The center frequency band is allocated to MSs located in the sector boundary region, while the normal frequency band is allocated to MSs in the sector center region.

(4) A DCA scheme is designed to dynamically allocate the resources of the center frequency band and the normal frequency band to MSs according to their locations.

Now a description will be made of the resource utilization system and method for the OFDM sectorized cellular communication system according to the present invention.

Regarding an N-sector cell, firstly, a sector shape needs to be classified for cell sectorization because an antenna beam pattern design depends on the sector shape.

A cell structure realized by cell sectorization varies with an initially defined cell shape. For an initially defined cell structure, application or non-application of 120°-sectorization, 90°-sectorization, or 60°-sectorization is determined. Therefore, the cell sectorization and the antenna beam pattern design depend on the initial cell shape.

Secondly, various sector shapes are available for the defined cell structure.

A variety of N-sector cell structures can be considered and cell sectorization is performed largely at 120°, 90°, or 60°.

(1) 3-Sector Cell

A 3-sector cell is configured by 120°-sectorization. FIGS. 1A to 1D illustrate 3-sector cell structures according to exemplary embodiments of the present invention.

FIG. 1A illustrates a 3-sector clover cell structure according to an exemplary embodiment of the present invention. The clover cell is divided into three hexagonal sectors and the center of each antenna beam pattern is pointed toward a cell boundary remotest from the center of the cell.

Figure 1B:
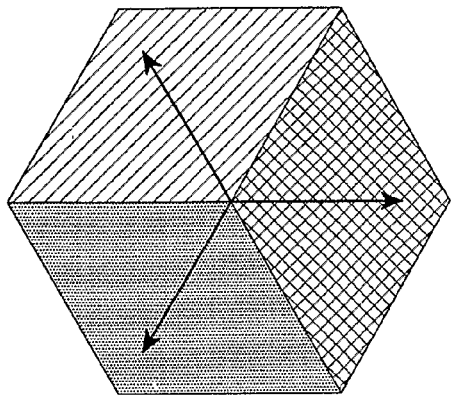

FIG. 1B illustrates a first hexagonal cell structure in a 3-sector system according to an exemplary embodiment of the present invention. The hexagonal cell is divided into three rhombus-shaped sectors and the center of each antenna beam pattern is pointed toward a cell boundary remotest from the center of the cell.

Figure 1C:
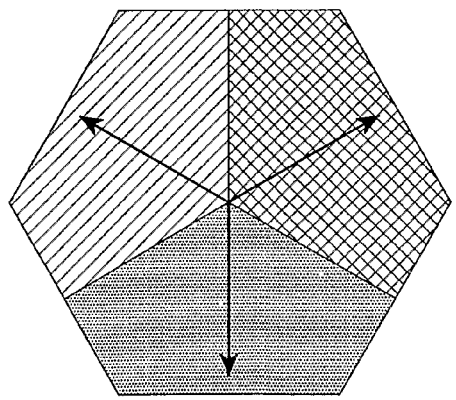

FIG. 1C illustrates a second hexagonal cell structure in a 3-sector system according to an exemplary embodiment of the present invention. The hexagonal cell is divided into three pentagon sectors and the center of each antenna beam pattern is pointed toward a cell boundary nearest to the center of the cell.

Figure 1D:
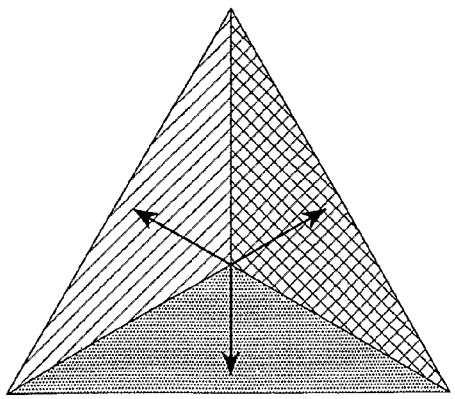

FIG. 1D illustrates a 3-sector triangular cell structure according to an exemplary embodiment of the present invention. The triangular cell is divided into three isosceles triangular sectors and the center of each antenna beam pattern is pointed toward a cell boundary nearest to the center of the cell.

(2) 4-Sector Cell

A 4-sector cell is configured by 90°-sectorization. FIGS. 2A and 2B illustrate 4-sector cell structures according to exemplary embodiments of the present invention.

FIG. 2A illustrates a first 4-sector square cell structure according to an exemplary embodiment of the present invention. The first square cell is divided into four regular square sectors and the center of each antenna beam pattern is pointed toward a cell boundary remotest from the center of the cell.

FIG. 2B illustrates a second 4-sector square cell structure according to an exemplary embodiment of the present invention. The second square cell is divided into four isosceles triangular sectors and the center of each antenna beam pattern is pointed toward a cell boundary nearest to the center of the cell.

(3) 6-Sector Cell

A 6-sector cell is configured by 60°-sectorization. FIG. 3 illustrates a 6-sector hexagonal cell structure according to an exemplary embodiment of the present invention. The hexagonal cell is divided into six equilateral triangular sectors and the center of an antenna beam pattern is pointed toward a cell boundary nearest to the center of the cell.

Thirdly, a layout relationship must be set among cells in tier 1 of a center cell.

Cells in tier 1, which interfere most with the center cell, determines a geometrical structure that in turn determines an inter-cell interference type. Since a basic cell shape is different, a cell layout is also to be different from a conventional cell layout, considering an antenna beam pattern. With reference to FIGS. 4A to 4D, FIGS. 5A and 5B, and FIG. 6, basic 3-sector cell layouts, basic 4-sector cell layouts, and a basic 6-sector cell layout will be described respectively.

Figure 4A:
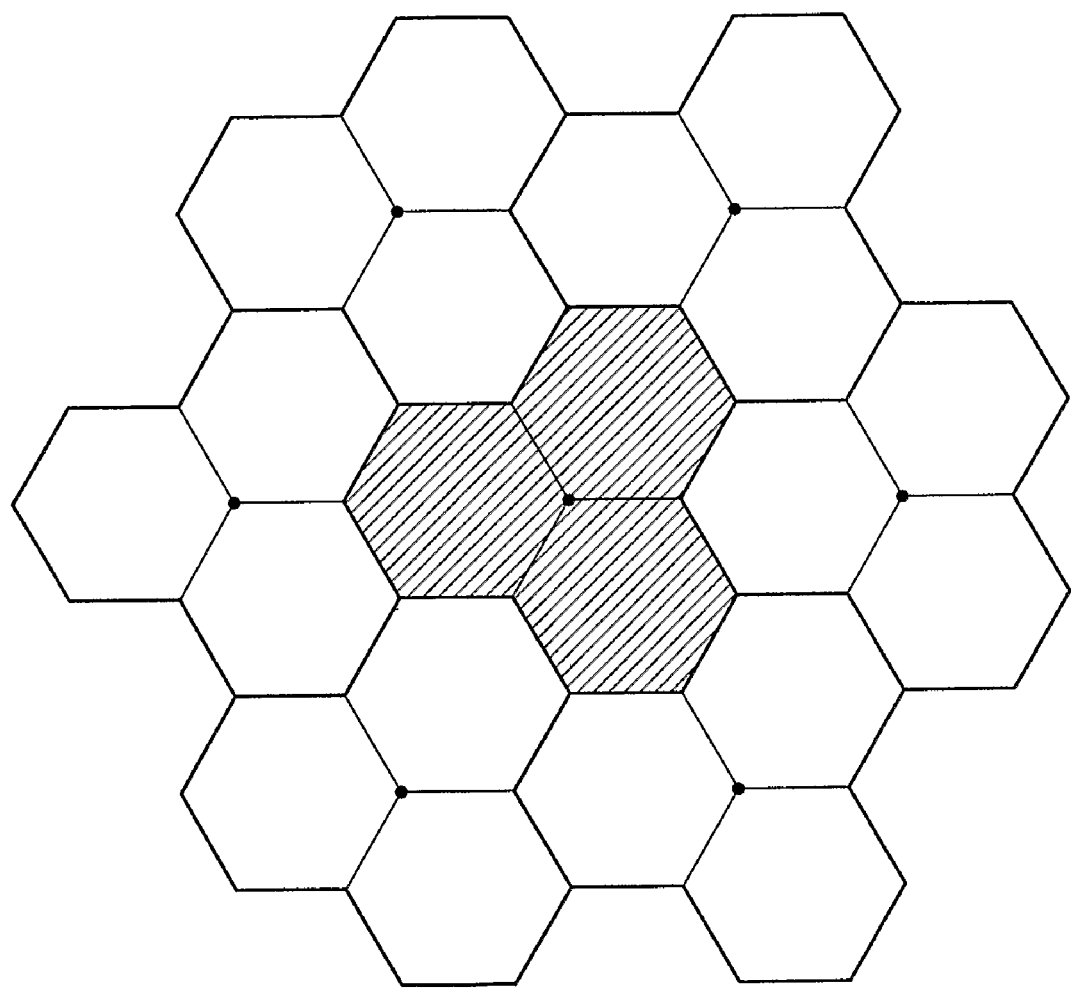
FIGS. 4A to 4D illustrate basic layouts of 3-sector cells according to exemplary embodiments of the present invention.
Figure 4B:
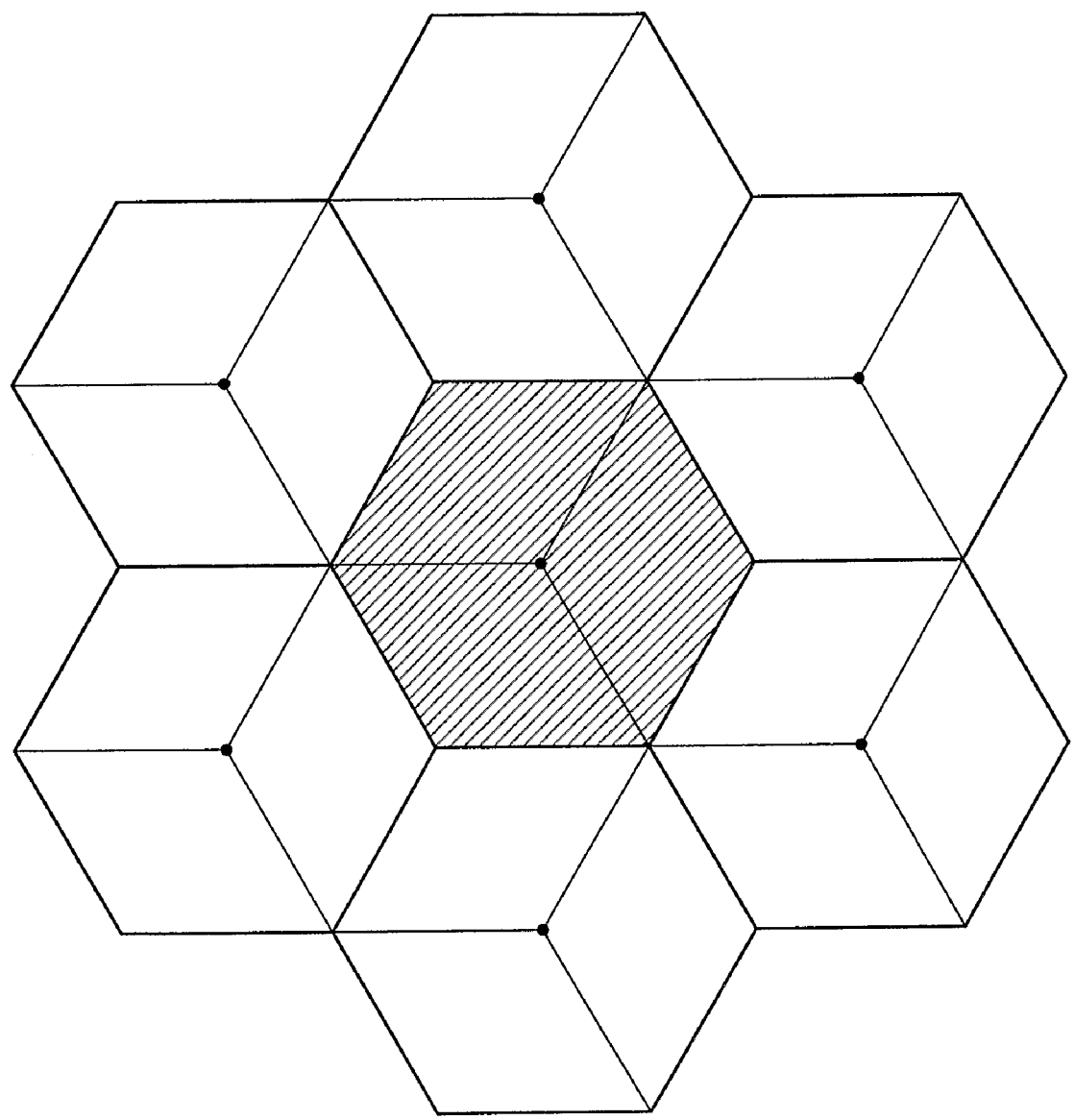
Figure 4C:
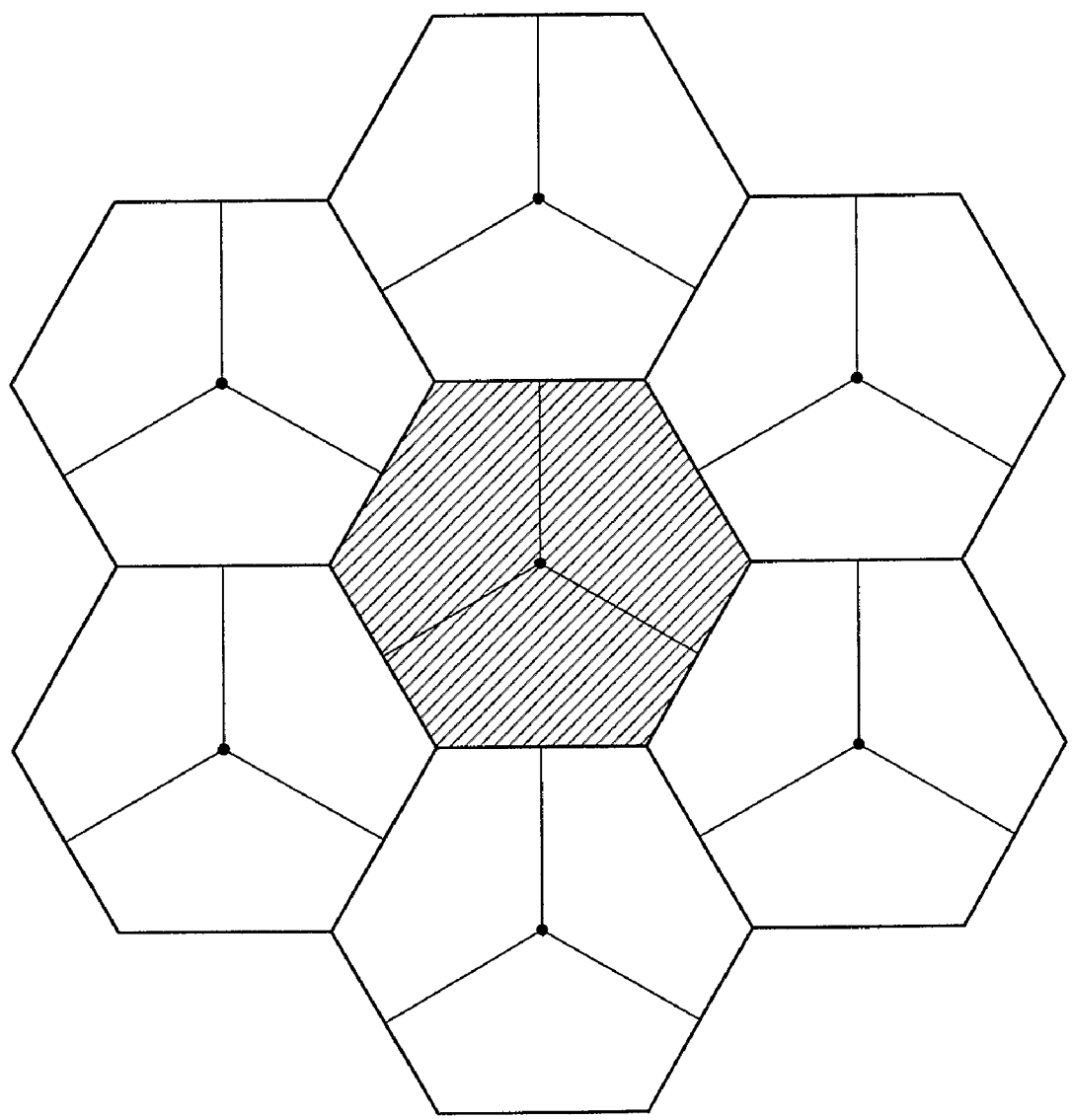
Figure 4D:
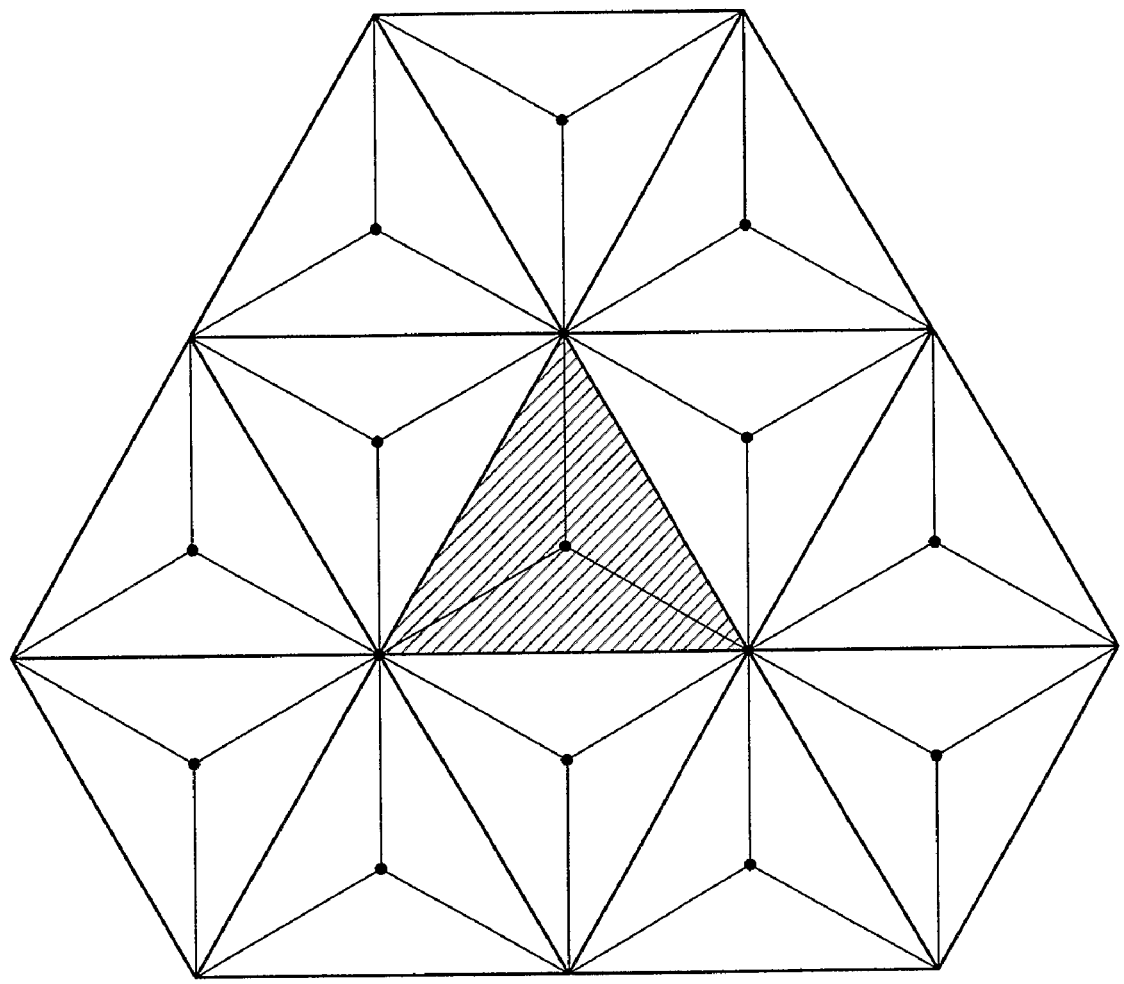

FIGS. 4A to 4D illustrate basic 3-sector cell layouts. Specifically, FIG. 4A illustrates a basic layout of 3-sector clover cells, FIG. 4B illustrates a basic layout of first hexagonal cells in a 3-sector system, FIG. 4C illustrates a basic layout of second hexagonal cells in a 3-sector system, and FIG. 4D illustrates a basic layout of 3-sector triangular cells. In FIGS. 4A to 4D, each center cell is shaded.

Figure 5A:
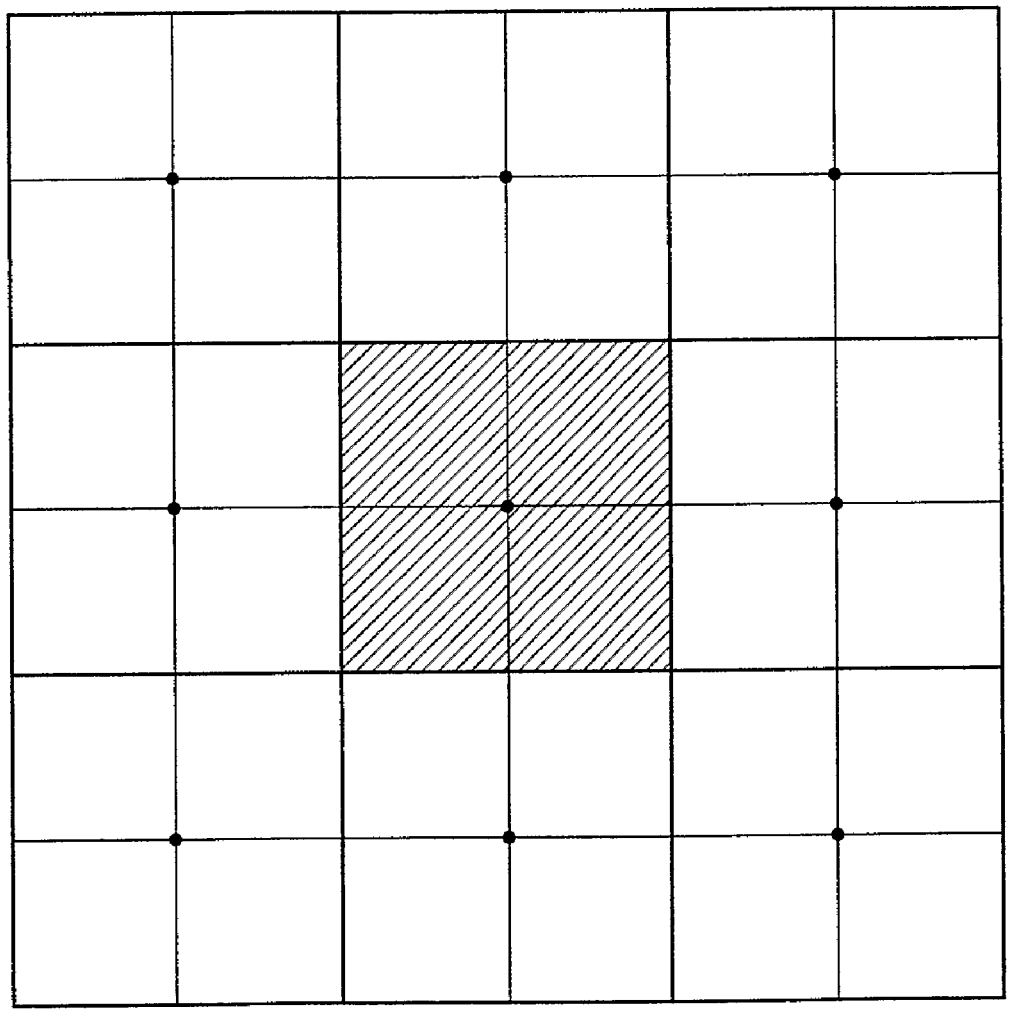
FIGS. 5A and 5B illustrate basic layouts of 4-sector cells according to exemplary embodiments of the present invention.
Figure 5B:
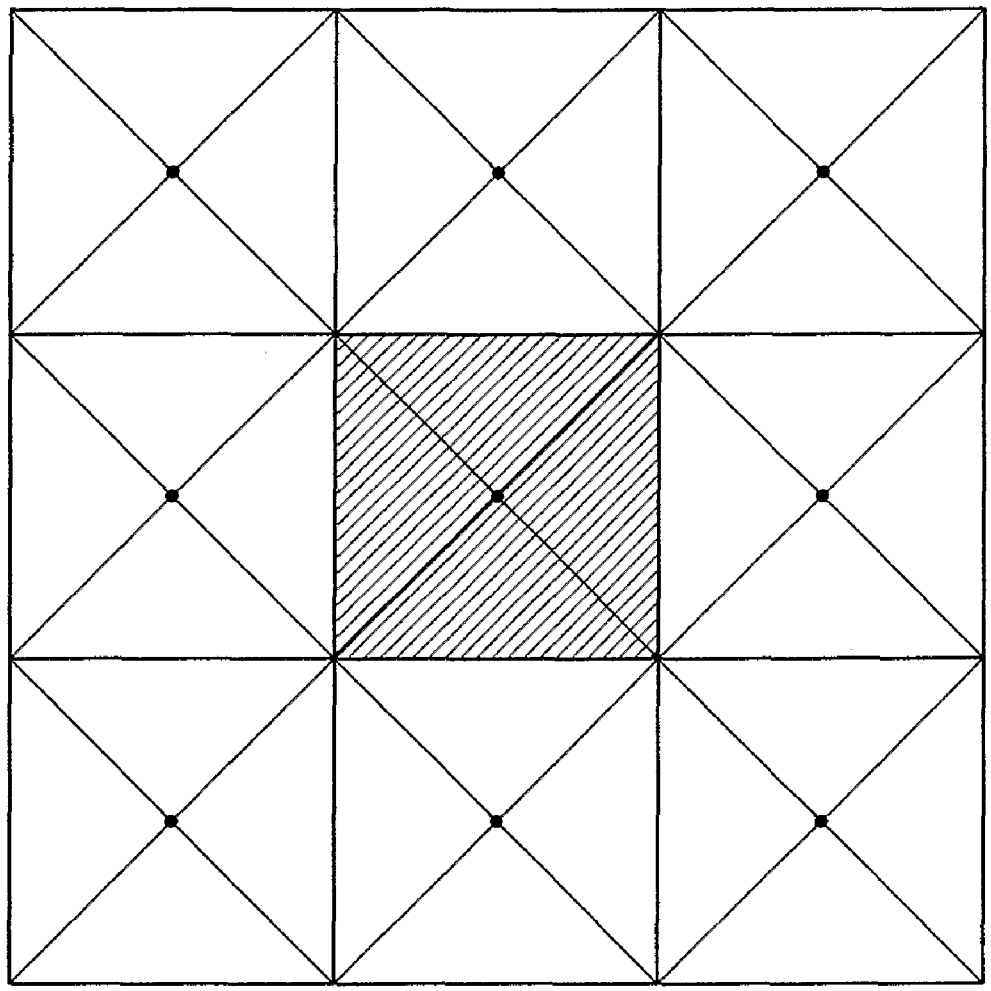

FIGS. 5A and 5B illustrate basic 4-sector cell layouts. Specifically, FIG. 5A illustrates a basic layout of first 4-sector square cells and FIG. 5B illustrates a basic layout of second 4-sector square cells. In FIGS. 5A and 5B, shaded cells are center cells.

Figure 6:
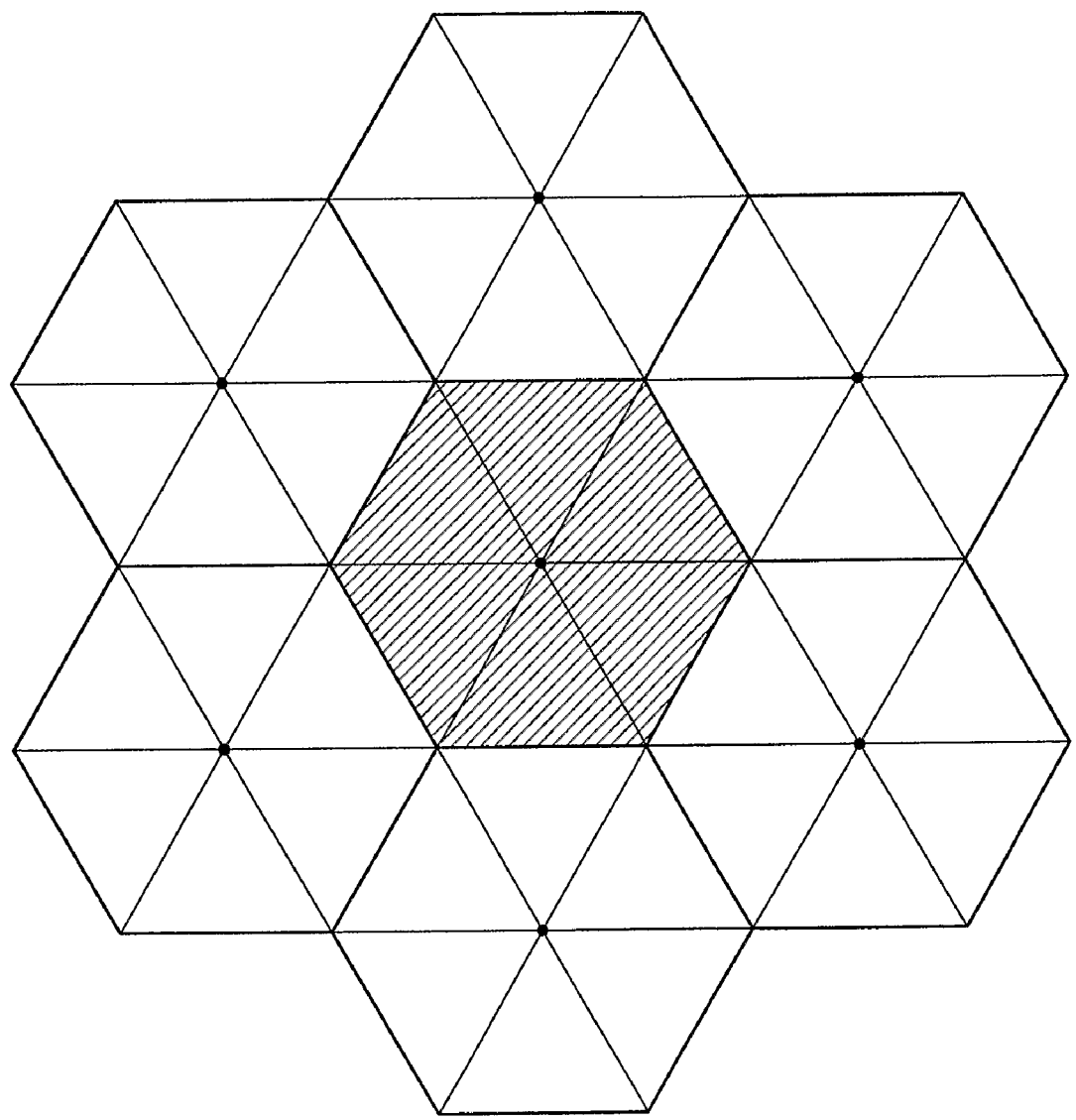
FIG. 6 illustrates a basic layout of 6-sector cells according to an exemplary embodiment of the present invention.

FIG. 6 illustrates a basic 6-sector hexagonal cell layout. In FIG. 6, a shaded cell is a center cell.

How to identify a sector to which an MS belongs will be described below.

In the case where the MS itself identifies the sector to which it belongs, i.e. its serving sector, it simultaneously receives signals from all sectors in the center of a cell. The received signals differ in strength in accordance with the antenna beam patterns of the sectors according to the locations of the MS in the sectors. The signals are preamble sequences, for example. A preamble sequence is specific to each sector. In general, the MS determines a sector from which it receives the strongest signal to be the serving sector. However, when an inter-sector DCA is needed, the strength of the signal received from the serving sector may be less than that of a signal received from a neighbor sector.

During initialization, the MS is connected to a sector that offers the strongest signal. The MS periodically measures the strengths of signals from the serving sector and neighbor sectors and determines whether it is located in a sector boundary region by comparing the strength measurements.

Meanwhile, the MS calculates the ratio $P_{sector\ boundary}$ of the power of the signal received from the serving sector to that of the strongest of the signals received from the neighbor sectors, namely an inter-sector Signal-to-Interference and Noise Ratio (SINR) by $$P_{sector\ boundary} = 10 \cdot \log_{10} \frac{|S_{sector\ a}|^2}{|S_{sector\ b}|^2} [dB] \quad (1)$$

where $S_{sector\ a}$ denotes the signal received from the serving sector, $|S_{sector\ a}|^2$ denotes the power of $S_{sector\ a}$, $S_{sector\ b}$ denotes the signal received from the comparative neighbor sector, and $|S_{sector\ b}|^2$ denotes the power of $S_{sector\ b}$.

Based on $P_{sector\ boundary}$ received from the MS, a BS determines the serving sector and decides as to whether the MS is located in the sector boundary region, whether to apply DCA, and whether to apply inter-DCA. Then the BS allocates resources according to the determination results.

In the case where the BS identifies the sector to which the MS belongs, it receives a signal transmitted by the MS simultaneously from all sectors in the cell center. The strongest of the received signals is from the serving sector of the MS. As stated before, under circumstances of applying inter-sector DCA, the BS may receive a stronger signal from a neighbor sector than from the serving sector of the MS. The BS periodically measures the strengths of signals from the serving sector and neighbor sectors and determines whether the MS is located in the sector boundary region by comparing the strength measurements.

Meanwhile, the BS calculates $P_{sector\ boundary}$ according to the comparison. Based on $P_{sector\ boundary}$, the BS selects the serving sector of the MS and decides as to whether the MS is located in a sector boundary region, whether to apply DCA, and whether to apply inter-DCA. Then the BS allocates resources according to the determination results.

Characteristics of an antenna beam pattern of a directional antenna will be described below.

A sectorized antenna forms a directional antenna beam that is steered to a predetermined range in the cell. Typically, the sector antenna beam has the highest gain at its center and a smaller gain nearer to its periphery. An antenna beam pattern generator equation defined for a 3-sector cell in $3^{rd}$ Generation Partnership Project 2 (3GPP2) is given below as an exemplary sector antenna beam pattern generator equation.

$$A(\theta) = -\min\left[12\left(\frac{\theta}{\theta_{3\ dB}}\right)^2, A_m\right] - 180 \le \theta \le 180, A_m = 20 \text{ dB} \quad (2)$$

where $A(\theta)$ denotes the gain of the sectorized antenna determined by $\theta$.

Figure 7A:
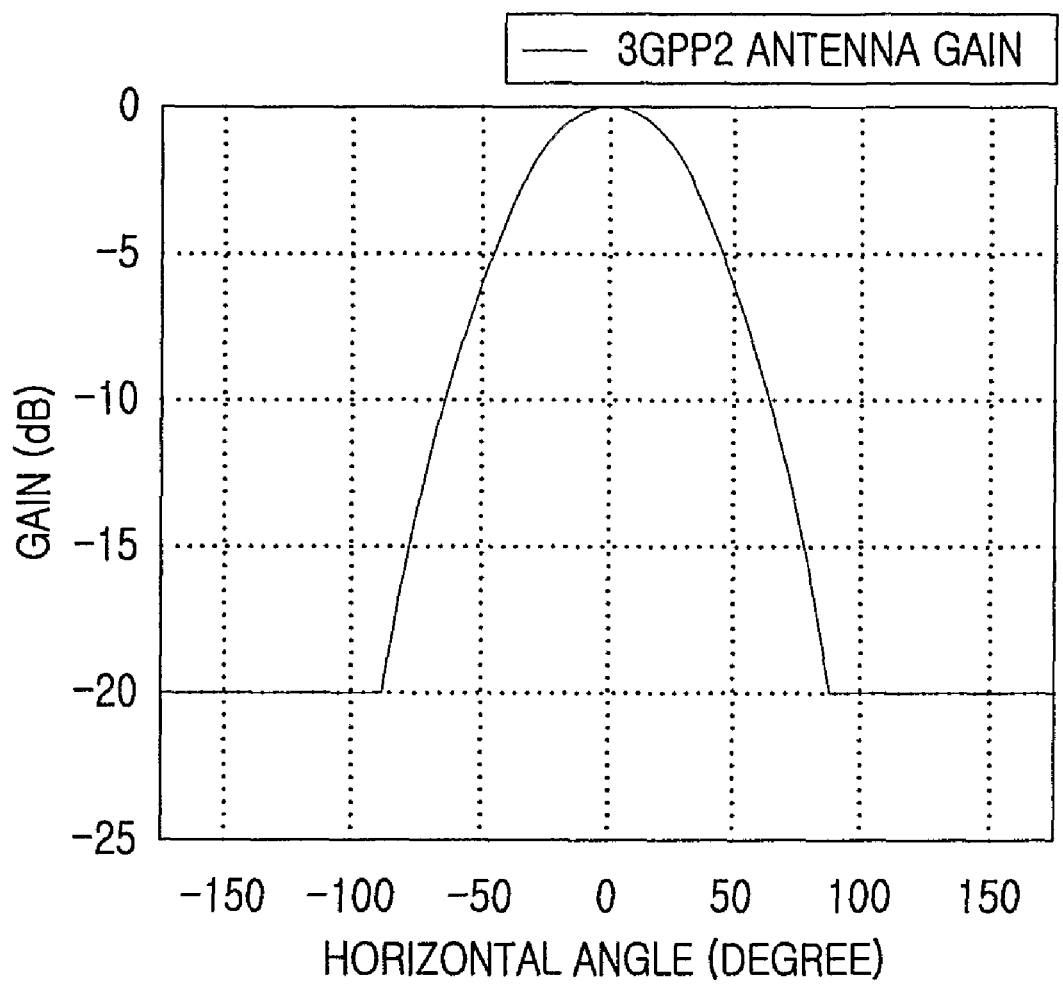
FIG. 7A is a graph illustrating antenna gains according to Equation (2)
Figure 7B:
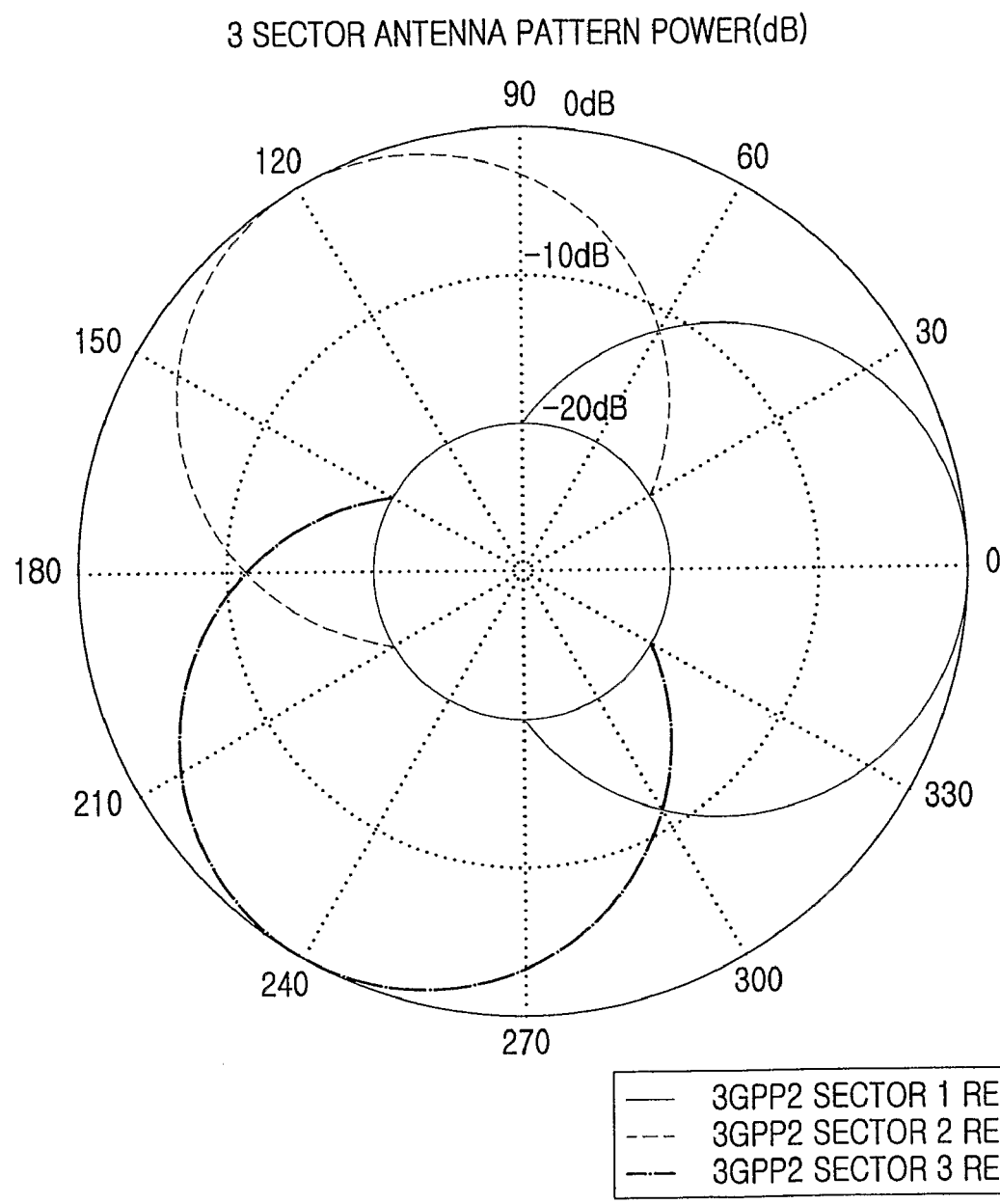
FIG. 7B illustrates 3-sector antenna beam patterns according to Equation (2)

Equation (2) leads to sectorized antenna gains illustrated in FIG. 7A and 3-sector antenna beam patterns illustrated in FIG. 7B.

Figure 8:
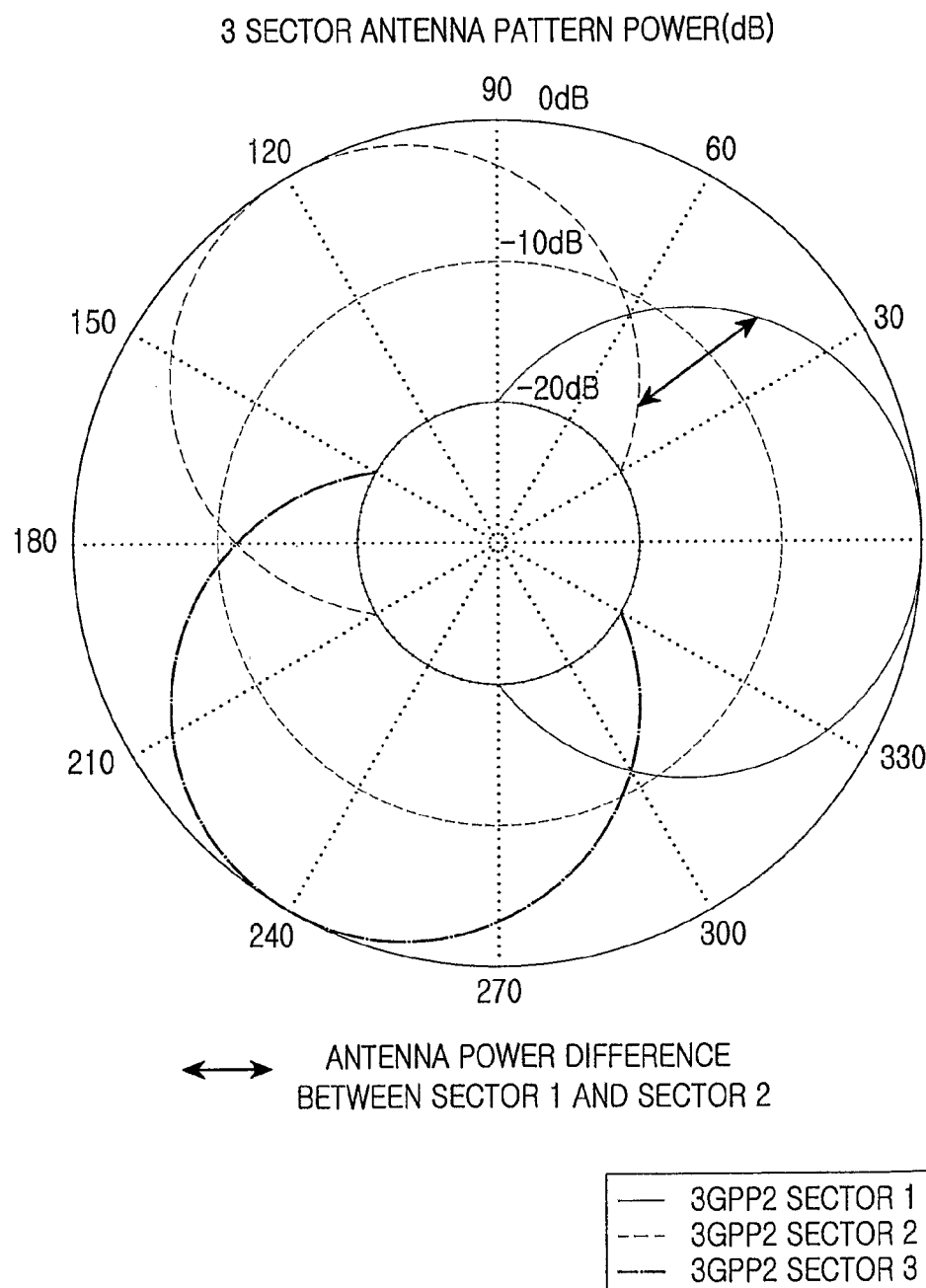
FIG. 8 is a diagram illustrating an operation for determining whether an MS is located in a sector boundary region according to an exemplary embodiment of the present invention.

With reference to FIG. 8, a method for determining whether an MS is located in a sector boundary region will be described.

FIG. 8 is a diagram illustrating an operation for determining whether an MS is located in a sector boundary region according to an exemplary embodiment of the present invention.

Before describing FIG. 8, it is made clear that the MS compares the power levels of two strongest ones of signals received from all sectors in the cell. If the ratio $P_{sector\ boundary}$ of the power of a signal received from the serving sector to that of a signal received from the comparative neighbor sector is less than a predetermined boundary threshold $\eta_{threshold}$, the MS determines that it is located in the sector boundary region.

$\eta_{threshold}$ is set according to a QoS parameter of the OFDM sectorized cellular communication system. The default value of $\eta_{threshold}$ can be set to 10[dB].

FIG. 8 illustrates a graph illustrating power differences between antenna beam patterns. The arrow ↔denotes a power difference by which it is determined whether the MS is located in the sector boundary region. Assuming that the power difference between sector 1 and sector 2 is 10[dB], the MS receives a signal from sector 1 with power 10 times higher than a signal from sector 2.

Now a resource allocation method based on the N-sectorization will be described.

Firstly, center frequency bands must be set, taking into account the following parameters.

(1) Sectorization factor
(2) Cell shape
(3) Interference requirement
(4) QoS parameter
(5) Maximum frequency efficiency A method for setting the center frequency bands and a rule of their use patterns will be described below.

Orthogonal center frequency bands are selected for as many sectors from a total frequency band and allocated to the sectors. Assuming that the bandwidths of the center frequency bands are equal, the resources of (center frequency bandwidth)×(N−1) frequency bands are unavailable to each sector. The remaining frequency bands except for the center frequency bands are designated as normal frequency bands. Since the normal frequency bands have no interference or negligibly small interference from neighbor sectors, they can be reused in all sectors, as far as they are used in sector center regions. Therefore, a maximum frequency efficiency for each sector is calculated by $$\text{maximum frequency efficiency} = \frac{(\text{total frequency bandwidth}) - \{(N-1) \times (\text{center frequency bandwidth})\}}{(\text{total frequency bandwidth})} \quad (3)$$

where N denotes a sectorization factor.

Figure 9:
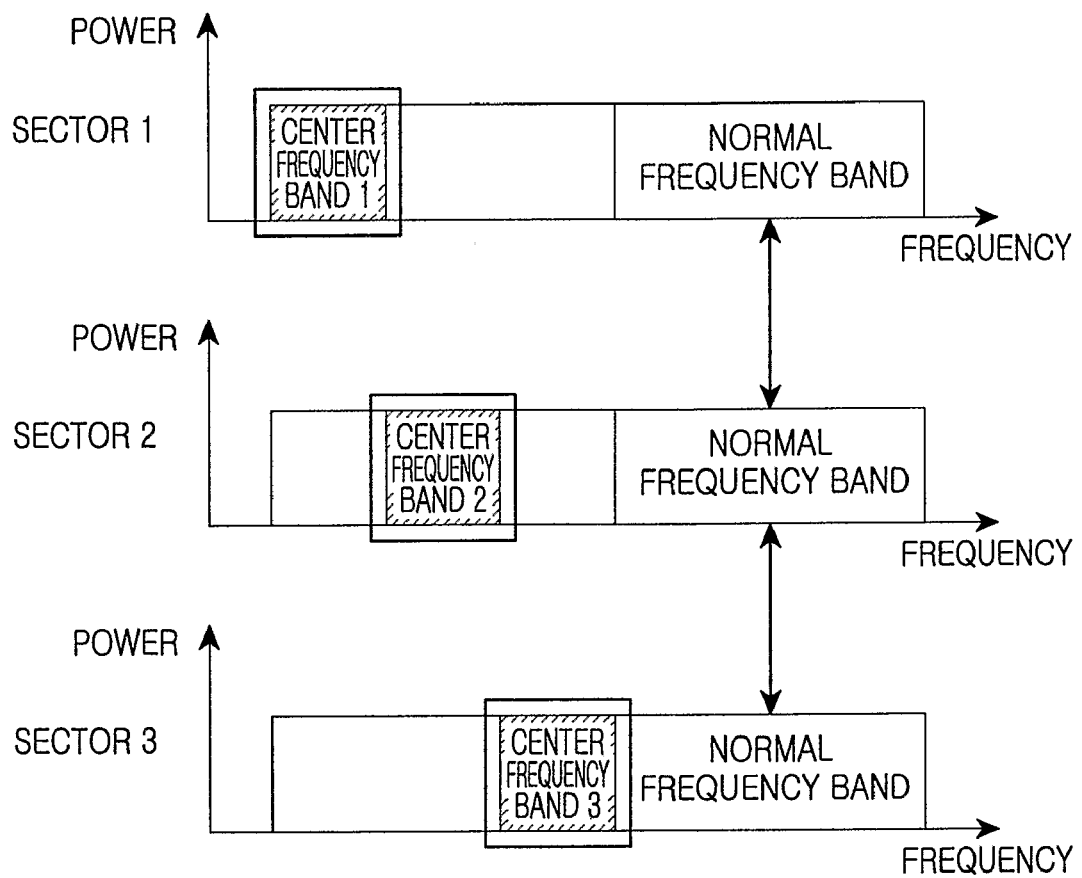
FIG. 9 illustrates an operation for setting center frequency bands and normal frequency bands for sectors in a 3-sector cell environment.
Figure 10:
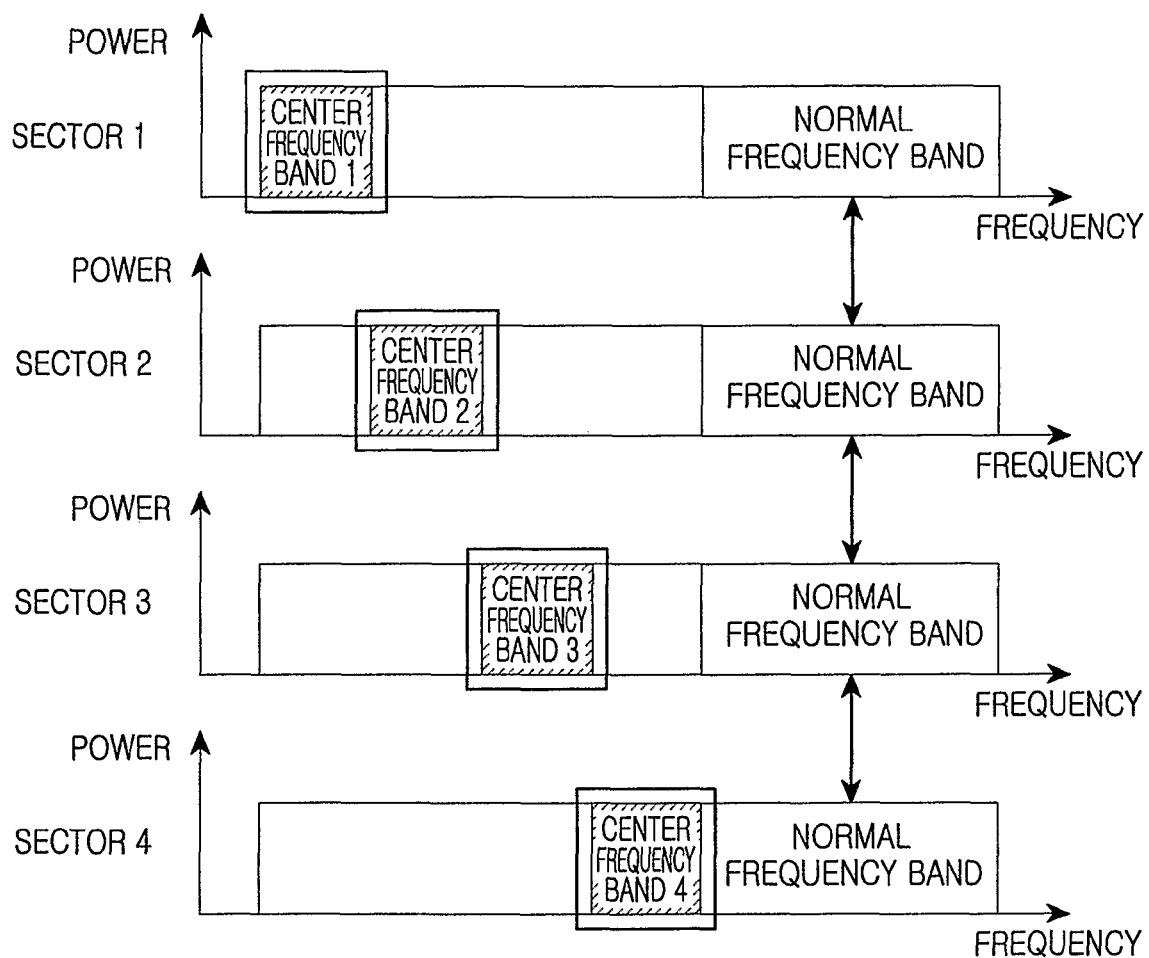
FIG. 10 illustrates an operation for setting center frequency bands and normal frequency bands for sectors in a 4-sector cell environment.
Figure 11:
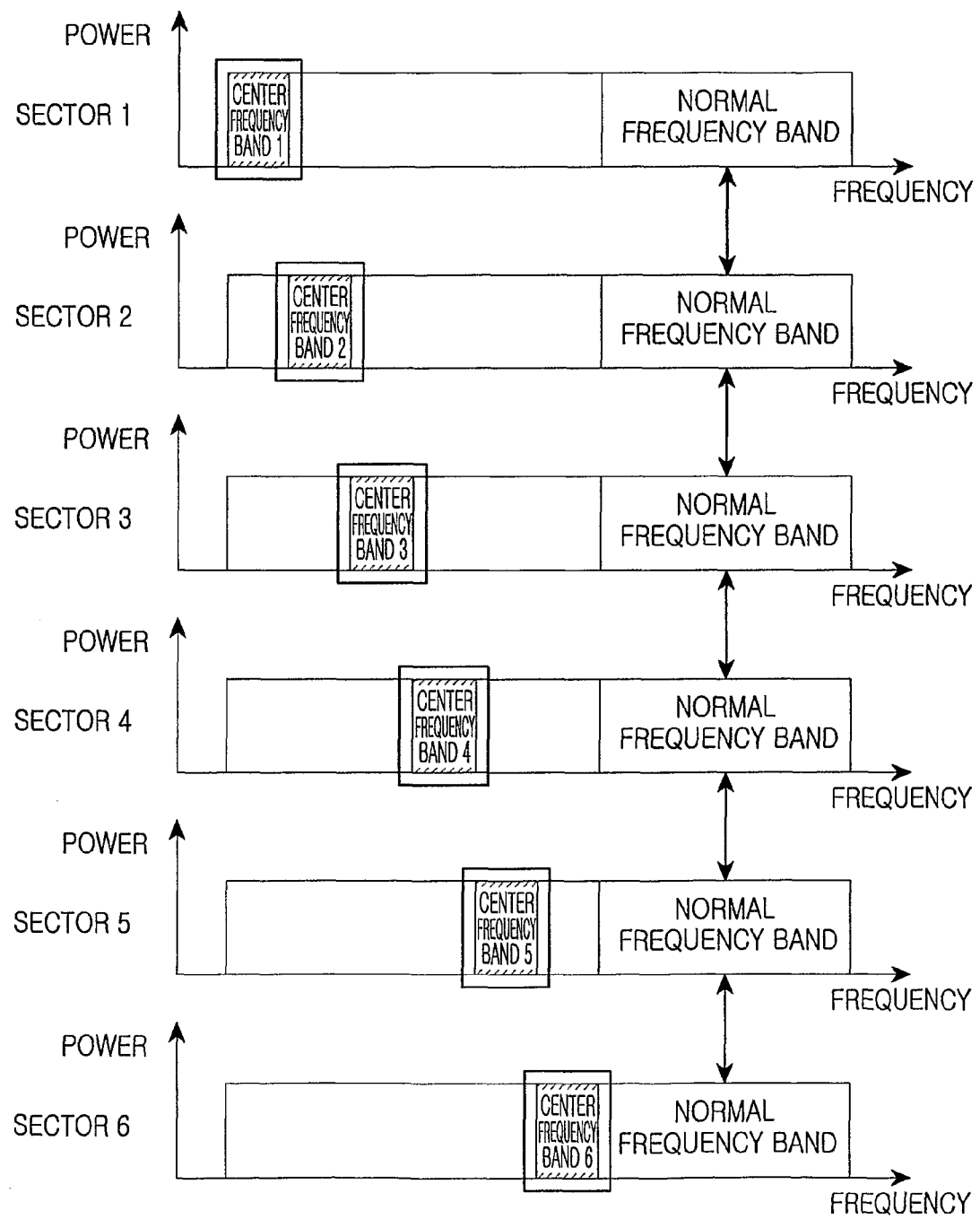
FIG. 11 illustrates an operation for setting center frequency bands and normal frequency bands for sectors in a 6-sector cell environment.

With reference to FIGS. 9, 10 and 11, how center frequency bands and normal frequency bands are set for sectors in an N-sector cell environment will be described.

FIG. 9 illustrates an operation for setting center frequency bands and normal frequency bands for sectors in a 3-sector cell environment. Referring to FIG. 9, sector 1, sector 2 and sector 3 use different center frequency bands, i.e., center frequency band 1, center frequency band 2, and center frequency band 3, but the same normal frequency band.

FIG. 10 illustrates an operation for setting center frequency bands and normal frequency bands for sectors in a 4-sector cell environment. Referring to FIG. 10, sector 1, sector 2, sector 3 and sector 4 use different center frequency bands, i.e., center frequency band 1, center frequency band 2, center frequency band 3, and center frequency band 4, but the same normal frequency band.

FIG. 11 illustrates an operation for setting center frequency bands and normal frequency bands for sectors in a 6-sector cell environment. Referring to FIG. 11, sector 1 to sector 6 use different center frequency bands, i.e., center frequency band 1 to center frequency band 6, but the same normal frequency band.

Secondly, a resource allocation method will be described.

Under a multi-cell environment, a total available frequency band of a cell is divided into unit frequency bands, for example, subcarriers or segments and a subchannel is defined by a predetermined number of unit frequency bands. Subchannels can be defined and allocated using a center frequency band and a normal frequency band.

Resources are allocated to MSs in units of subchannels. A center frequency bandwidth may vary with a target frequency efficiency of the OFDM sectorized cellular communication system. Resources of a center frequency band are allocated to MSs in a sector boundary region with sever inter-sector interference, while resources of a normal frequency band are allocated to MSs in a sector center region without inter-sector interference. Subchannel generation and allocation can be considered in various ways, which are beyond the scope of the present invention and thus will not be described in detail herein.

A resource allocation method for a 3-sector cell will first be described.

(1) Frequency Band Utilization Method

As described earlier with reference to FIG. 9, a total frequency band is divided into center frequency bands without inter-sector interference and a normal frequency band with inter-sector interference. The bandwidth of each center frequency band and the bandwidth of the normal frequency band can be adjusted according to the design purpose of the OFDM sectorized cellular communication system. Commonly for all 3-sector cells in the OFDM sectorized cellular communication system, three resource allocation patterns are defined and allocated to three sectors of each cell. For N=3, a maximum frequency efficiency without intra-cell interference is given by $$\text{maximum frequency efficiency} = \frac{(\text{total frequency bandwidth}) - \{2 \times (\text{center frequency bandwidth})\}}{(\text{total frequency bandwidth})} \quad (4)$$

Figure 12:
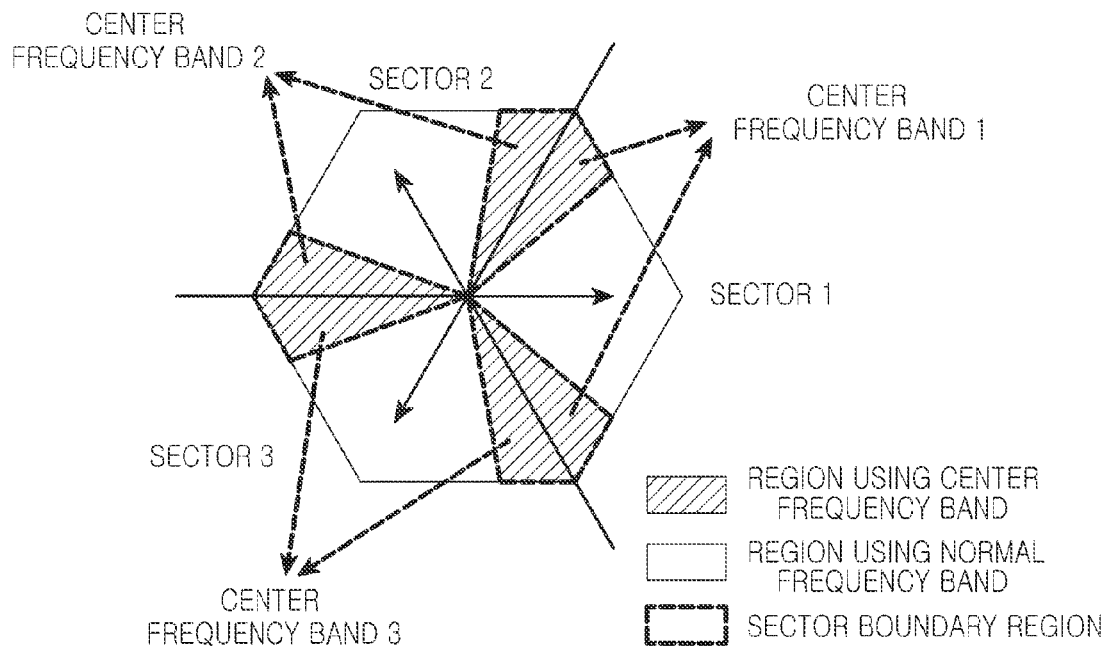
FIG. 12 illustrates a resource allocation range based on MS location in a first hexagonal cell in a 3-sector system according to an exemplary embodiment of the present invention.

(2) A center frequency band is allocated to an MS in a sector boundary region, while the normal frequency band is allocated to an MS in a sector center region. The resource allocation based on the locations of MSs is illustrated in FIG. 12.

A resource allocation method for a 4-sector cell will be described.

(1) Frequency Band Utilization Method

As described earlier with reference to FIG. 10, a total frequency band is divided into center frequency bands without inter-sector interference and a normal frequency band with inter-sector interference. The bandwidth of each center frequency band and the bandwidth of the normal frequency band can be adjusted according to the design purpose of the OFDM sectorized cellular communication system. Commonly for all 4-sector cells in the OFDM sectorized cellular communication system, four resource allocation patterns are defined and allocated to four sectors of each cell. For N=4, a maximum frequency efficiency without intra-cell interference is given by $$\text{maximum frequency efficiency} = \frac{(\text{total frequency bandwidth}) - \{3 \times (\text{center frequency bandwidth})\}}{(\text{total frequency bandwidth})} \quad (5)$$

Figure 13:
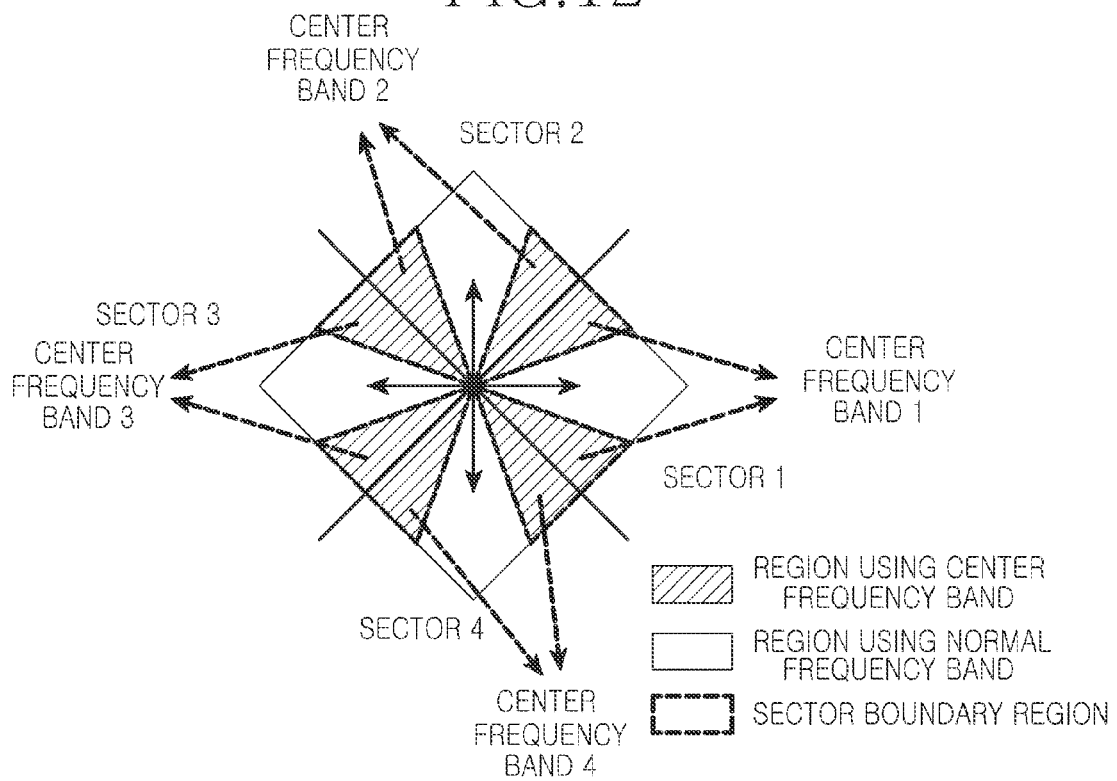
FIG. 13 illustrates a resource allocation range based on MS location in a first 4-sector square cell according to an exemplary embodiment of the present invention.

(2) A center frequency band is allocated to an MS in a sector boundary region, while the normal frequency band is allocated to an MS in a sector center region. The resource allocation based on the locations of MSs is illustrated in FIG. 13.

A resource allocation method for a 6-sector cell will be described.

(1) Method of Utilizing Frequency Band

As described earlier with reference to FIG. 11, a total frequency band is divided into center frequency bands without inter-sector interference and a normal frequency band with inter-sector interference. The bandwidth of each center frequency band and the bandwidth of the normal frequency band can be adjusted according to the design purpose of the OFDM sectorized cellular communication system. Commonly for all 6-sector cells in the OFDM sectorized cellular communication system, six resource allocation patterns are defined and allocated to six sectors of each cell. For N=6, a maximum frequency efficiency without intra-cell interference is given by $$\text{maximum frequency efficiency} = \frac{(\text{total frequency bandwidth}) - \{5 \times (\text{center frequency bandwidth})\}}{(\text{total frequency bandwidth})} \quad (6)$$

Figure 14:
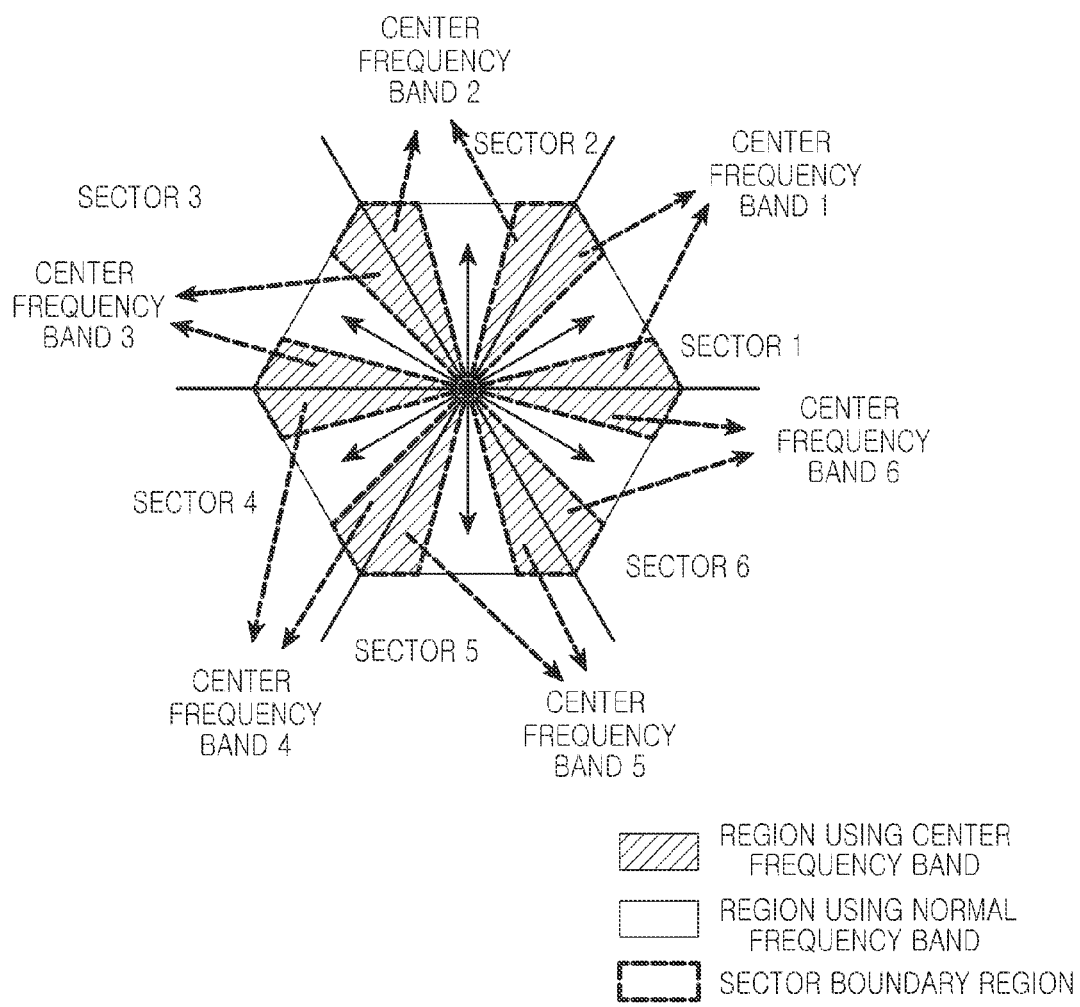
FIG. 14 illustrates a resource allocation range based on MS location in a 6-sector hexagonal cell according to an exemplary embodiment of the present invention.
Figure 15A:
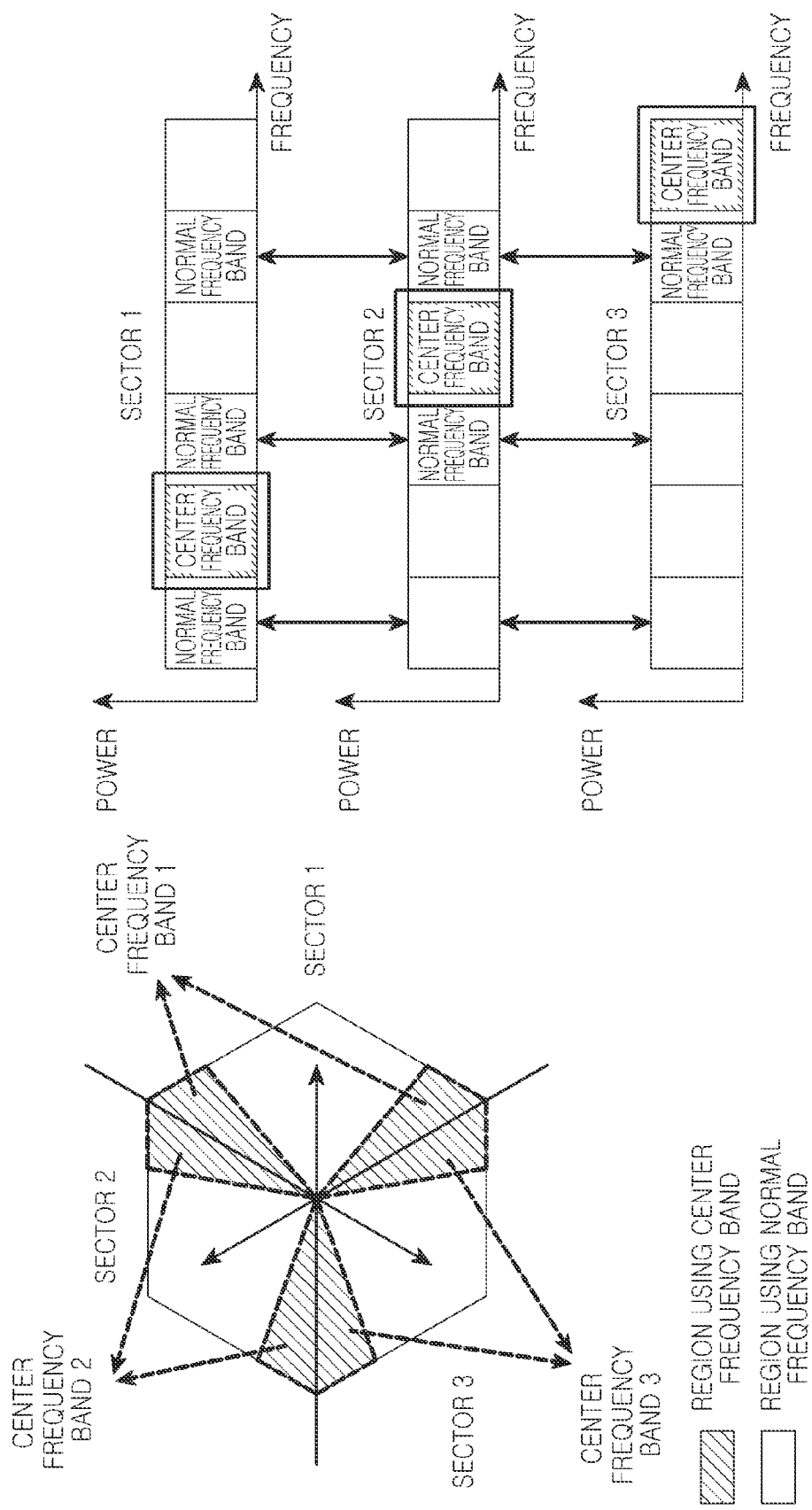
FIGS. 15A to 15F illustrate patterns of dividing a total frequency band into center frequency bands and normal frequency bands in a 3-sector cell according to an exemplary embodiment of the present invention.
Figure 15B:
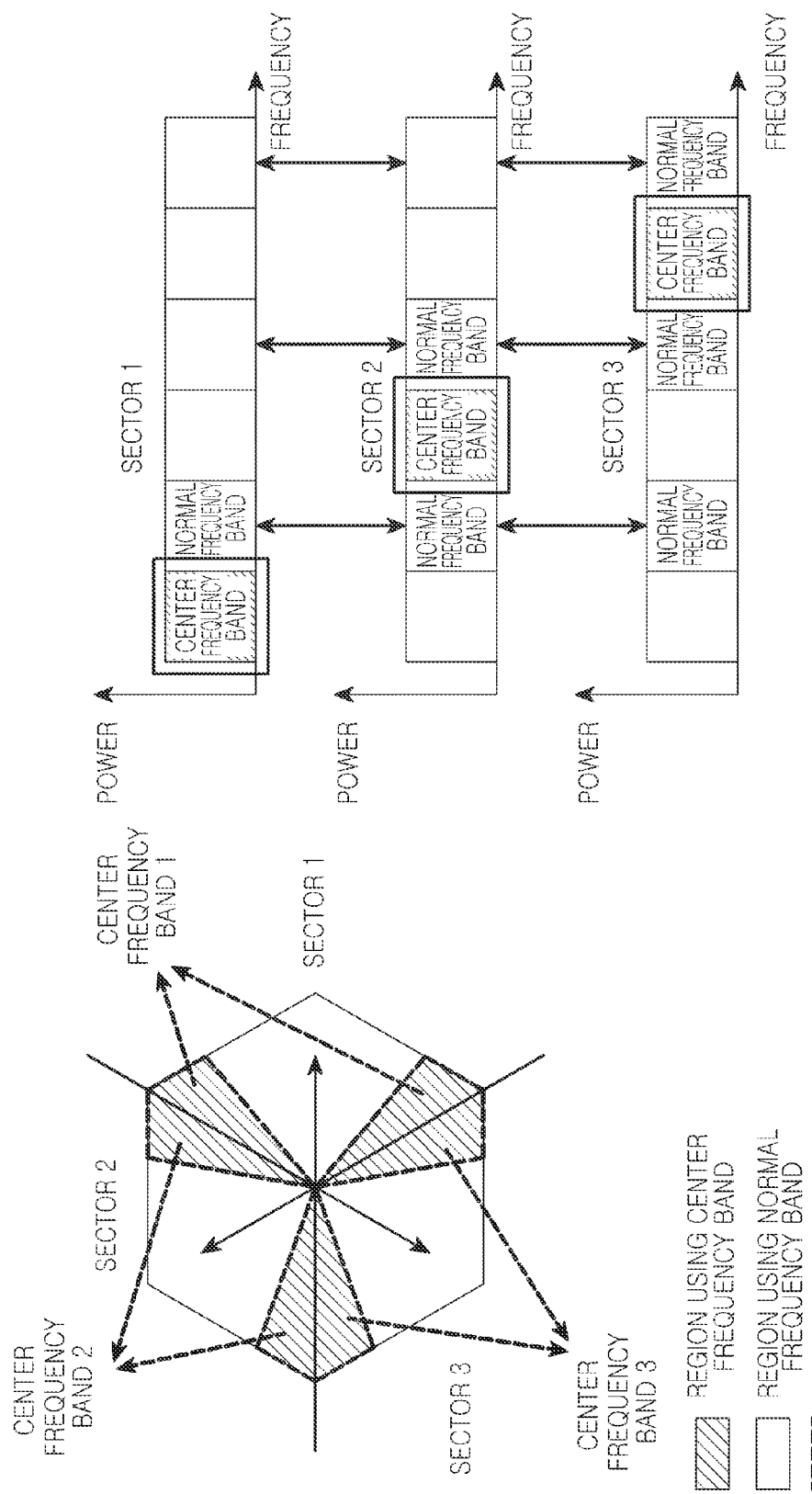
Figure 15C:
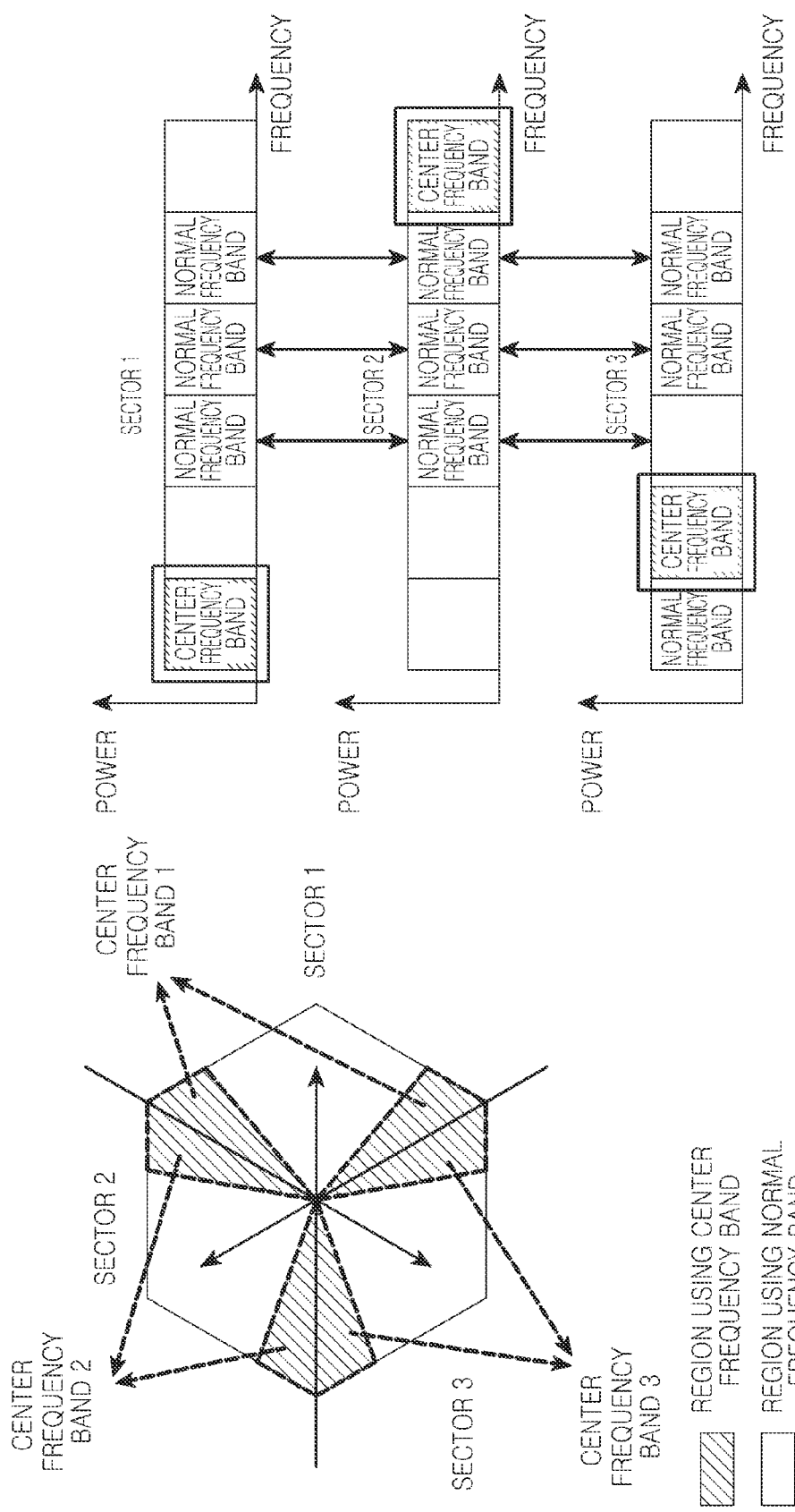
Figure 15D:
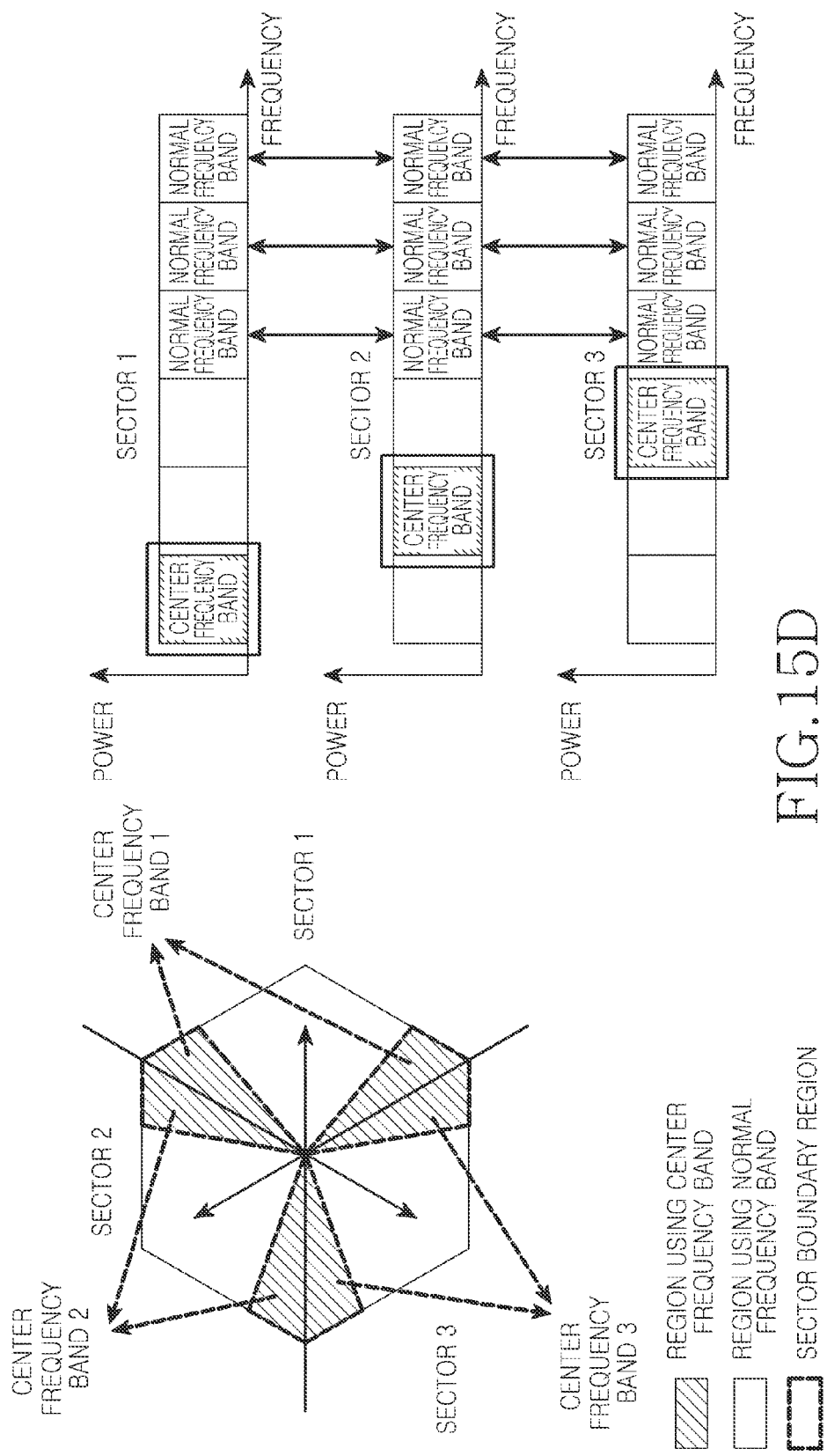
Figure 15E:
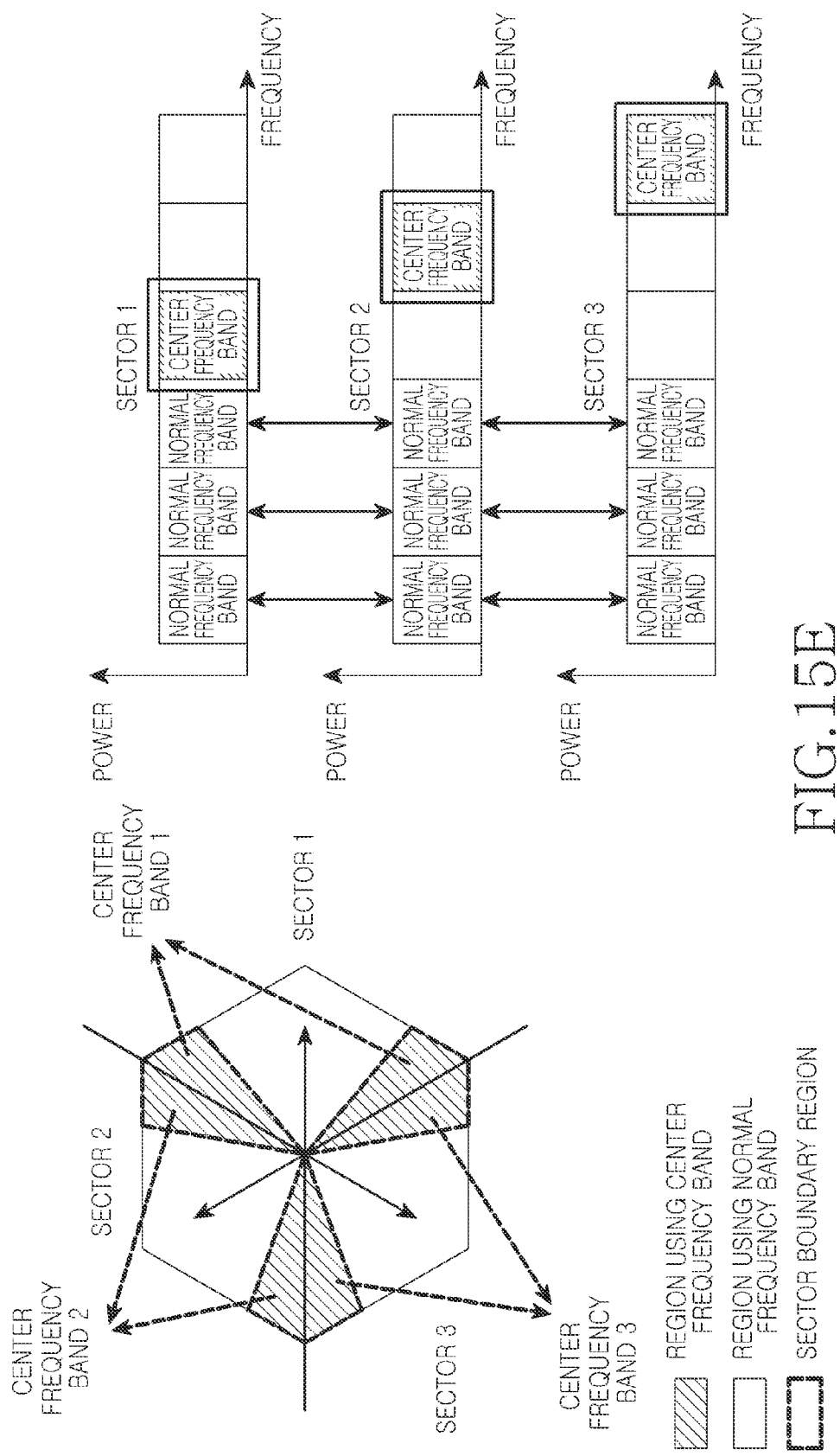
Figure 15F:
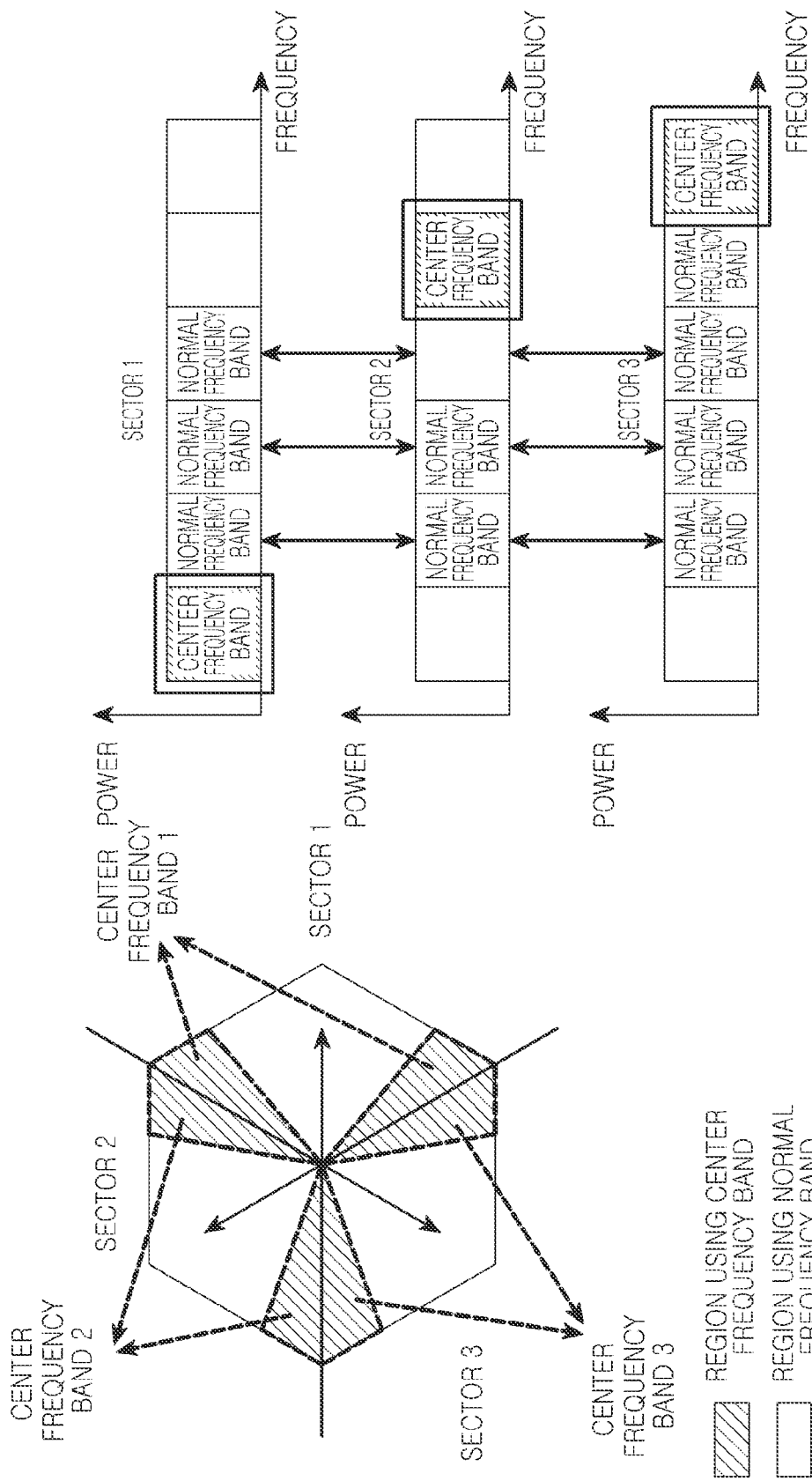

(2) A center frequency band is allocated to an MS in a sector boundary region, while the normal frequency band is allocated to an MS in a sector center region. The resource allocation based on the locations of MSs is illustrated in FIG. 14.

If a center frequency bandwidth is ⅙ of a total frequency bandwidth for a 3-sector cell, the resources is allocated in the following manner.

Because the center frequency bandwidth is ⅙ of the total frequency bandwidth, a maximum frequency efficiency for each sector is ⅔ and a normal frequency bandwidth is computed by $$\text{normal frequency bandwidth} = (\text{total frequency bandwidth}) - \{N \times (\text{center frequency bandwidth})\} \quad (7)$$

Therefore, the normal frequency bandwidth is ½ of the total frequency bandwidth.

Using the center frequency bands and the normal frequency band, resources are allocated as follows.

(1) For each sector of the cell, ⅙ of the total frequency band is allocated as a center frequency band and ½ of the total frequency band is allocated as a normal frequency band.

(2) The center frequency band is allocated to MSs in a sector boundary region, while the normal frequency band is allocated to MSs in a sector center region.

(3) The other two sectors do not use the center frequency band of a serving sector of an MS. Thus, no interference occurs among the center frequency bands of the sectors.

(4) The center frequency bands and the normal frequency band can be generated in various ways for the 3-sector cell. For example, the center frequency bands can be successive or scattered.

Patterns of dividing the total frequency band into the center frequency bands and the normal frequency band according to the resource allocation method involving the above steps (1) to (4) are illustrated in FIGS. 15A to 15F.

Meanwhile, resources can be allocated using an available frequency band for each sector.

Figure 16:
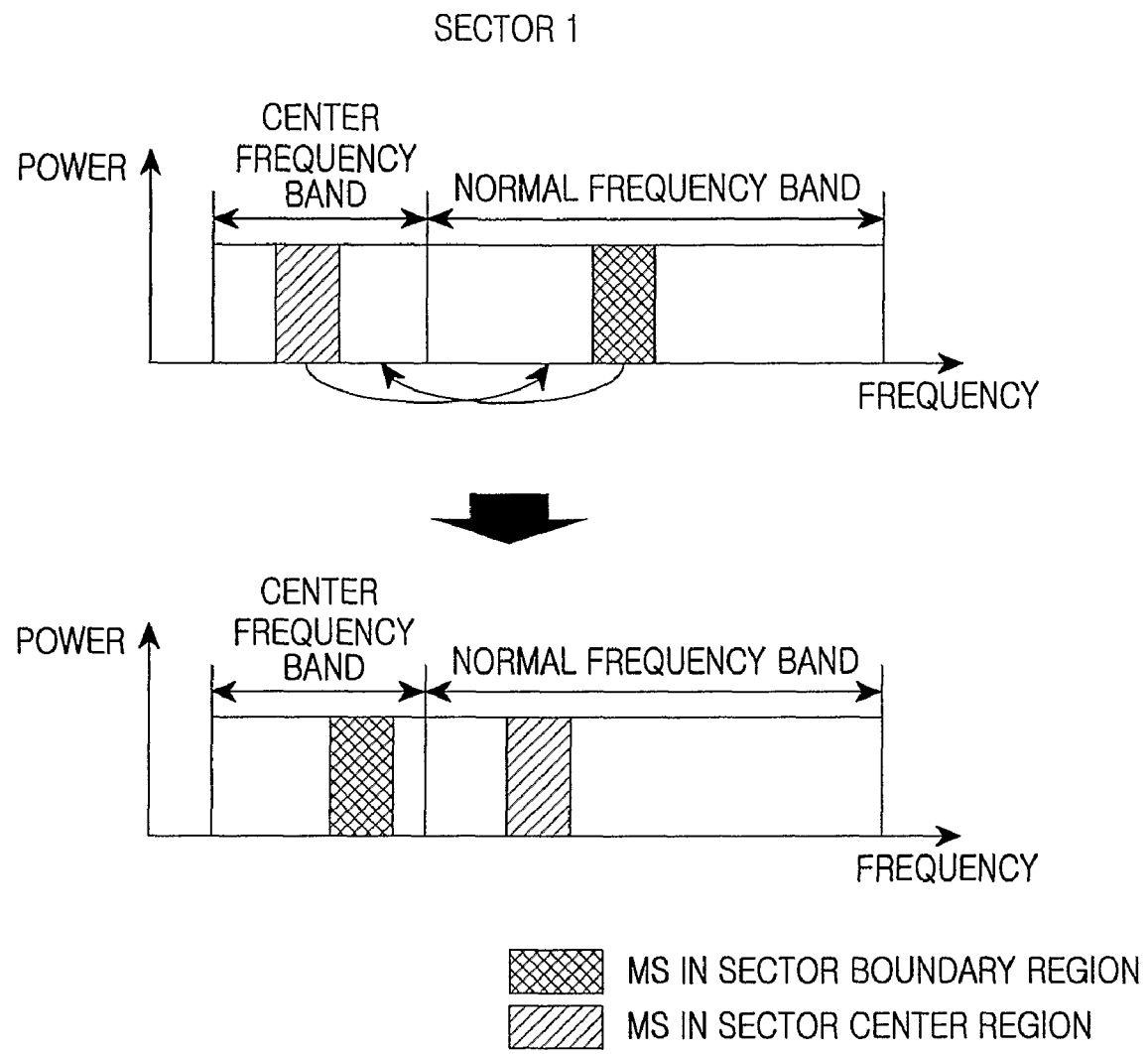
FIG. 16 illustrates a resource allocation method using an available frequency band according to an exemplary embodiment of the present invention.

As in a Frequency Reuse Factor (FRF) of 1, resources can be allocated freely within the available frequency band in each sector. Resources of a center frequency band are allocated to an MS in a sector boundary region, while resources of a normal frequency band are allocated to an MS in a sector center region. If the location of an MS changes within a sector and thus resources are to be re-allocated to the MS, resources are re-allocated to the MS by DCA on a frame basis or on a resource allocation period basis. The resource allocation using the available frequency band is illustrated in FIG. 16.

As described above, the resource utilization system and method in the OFDM sectorized cellular communication system according to the present invention are designed in the first design step or the second design step.

The case where the resource utilization system and method are designed in the first design step will first be described below.

(1) Determine $\eta_{threshold}$

A sector center region and a sector boundary region are defined, taking into account a sectorization factor, a cell shape, an interference criterion, and a QoS parameter. Herein, it is assumed that the sectorization factor is 3. Then $\eta_{threshold}$ is determined, herein in accordance with the QoS parameter.

A region where the power difference between signals from two sectors is less than $\eta_{threshold}$ is determined to be the sector boundary region. It is assumed that an antenna beam pattern is generated by Equation (2), $\theta_{3dB}=70°$, and $\eta_{threshold}=10$ [dB]. In this case, Equation (2) is expressed as $$A_{sector}(\theta) = -\min\left[12\left(\frac{\theta}{\theta_{3\,dB}}\right)^2, A_m\right] - 180 \le \theta \le 180, \quad (8)$$

$$A_m = 20 \text{ dB}$$

$$D_{sector\ boundary} = A_{sector\ a} - A_{sector\ b}$$

where $\theta$ that satisfies $D_{sector\ boundary}=\eta_{threshold}$ is 43.8° ($\theta=43.8°$).

(2) Decide Center Frequency Bandwidth and Normal Frequency Bandwidth

The bandwidth of a center frequency band that can be used in the sector boundary region is set according to $\eta_{threshold}$. Since the shape and position of the sector boundary region are different according to $\eta_{threshold}$ and the cell shape, the center frequency bandwidth, the normal frequency bandwidth, and an antenna beam pattern design should be set, taking into account various cell shapes.

For a 3-sector cell, a center frequency bandwidth and a normal frequency bandwidth are set according to the determined $\eta_{threshold}$. As described above, since $\theta$ satisfying $D_{sector\ boundary}=\eta_{threshold}$ is 43.8° ($\theta=43.8°$), the sizes of a sector center region and a sector boundary region can be calculated. For example, the center frequency bandwidth and the normal frequency bandwidth are determined in proportion to the sizes of the sector boundary region and the sector center region in the sector, but not always. Also, the center frequency bandwidth and the normal frequency bandwidth can be determined according to the sizes of the sector boundary region and the sector center region, and MS distribution. A maximum frequency efficiency is computed using the center frequency bandwidth and the normal frequency bandwidth by $$\text{center frequency bandwidth} = \frac{\text{size of sector boundary region}}{\text{size of sector boundary region} \times 3 + \text{size of sector center region}} \quad (9)$$

$$\text{normal frequency bandwidth} = \frac{\text{size of sector center region}}{\text{size of sector boundary region} \times 3 + \text{size of sector center region}}$$

$$\text{maximum frequency efficiency} = $$
$$\text{center frequency bandwidth} + \text{normal frequency bandwidth}$$

Figure 17A:
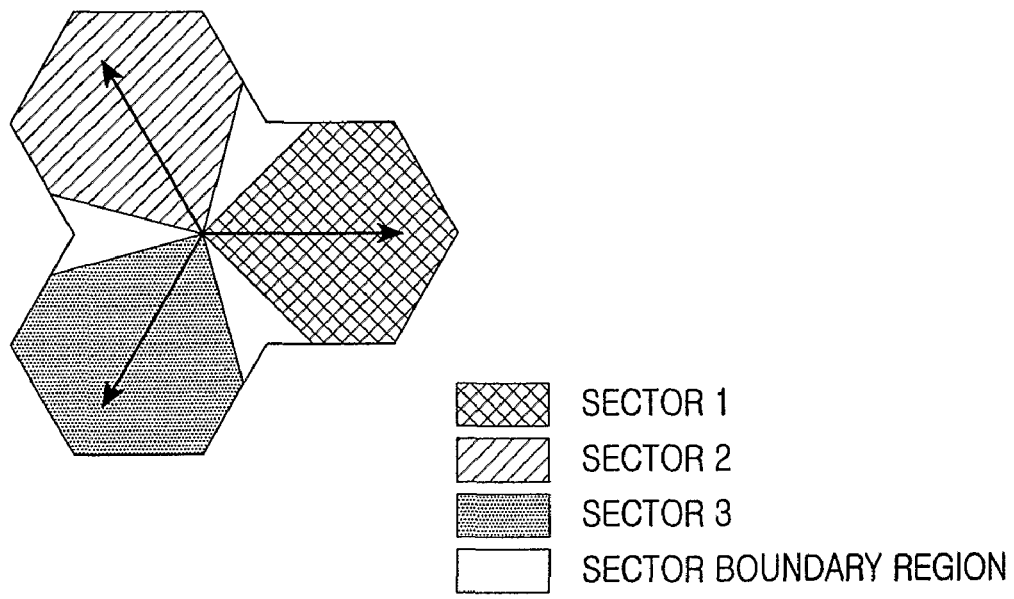
FIG. 17A illustrates sector boundary regions in a 3-sector clover cell when it is designed in a first design step according to the present invention.
Figure 17B:
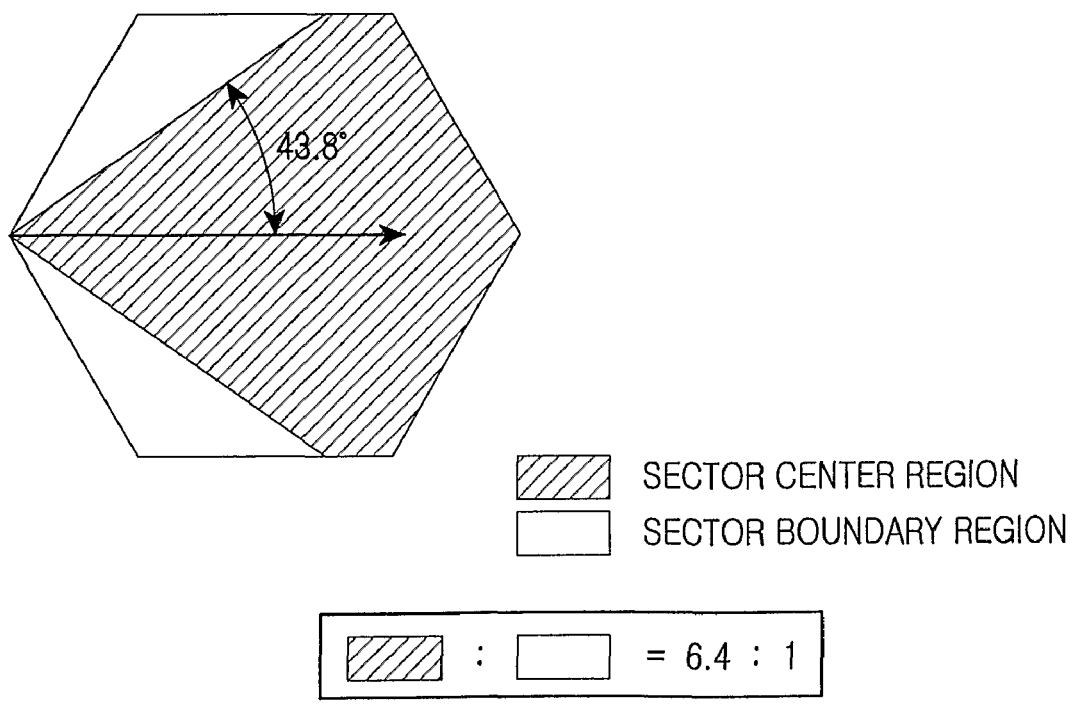
FIG. 17B illustrates sector division in the 3-sector clover cell when it is designed in the first design step according to the present invention.
Figure 17C:
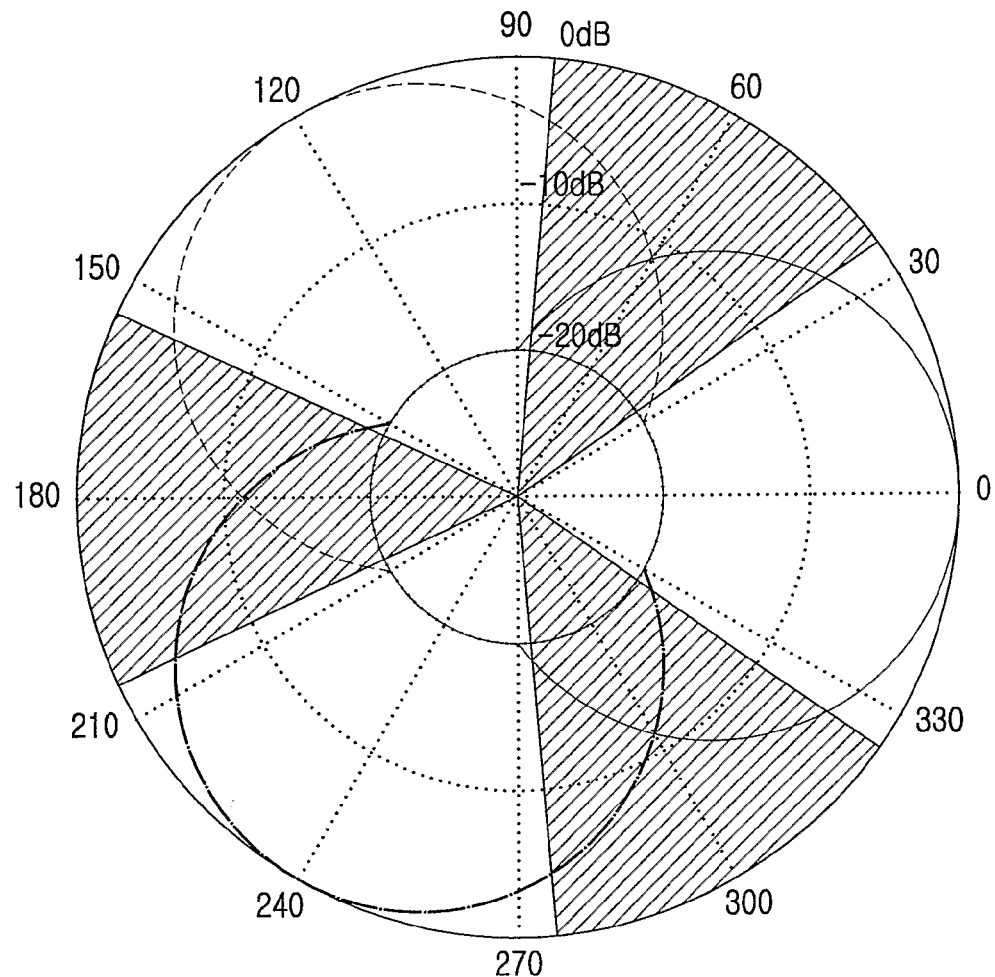
FIG. 17C illustrates antenna beam patterns in the 3-sector clover cell when it is designed in the first design step according to the present invention.
Figure 17C:
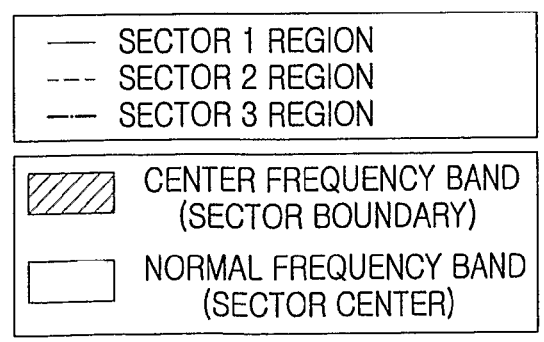

With reference to FIGS. 17A, 17B and 17C, an antenna beam pattern for a 3-sector clover cell according to the first design step will be described.

FIG. 17A illustrates sector boundary regions in a 3-sector clover cell according to the first design step of the present invention, FIG. 17B illustrates the size of a sector center region and the size of a sector boundary region in the 3-sector clover cell according to the first design step of the present invention, and FIG. 17C illustrates antenna beam patterns for the 3-sector clover cell according to the first design step of the present invention. As illustrated in FIG. 17B, for a total sector range of 120°, the ratio between a center frequency bandwidth and a normal frequency bandwidth is 1:6.4. Thus, the center frequency bandwidth is 10.6% of a total frequency bandwidth, the normal frequency bandwidth is 68% of the total frequency bandwidth. The maximum frequency efficiency is 78.6%.

Figure 18A:
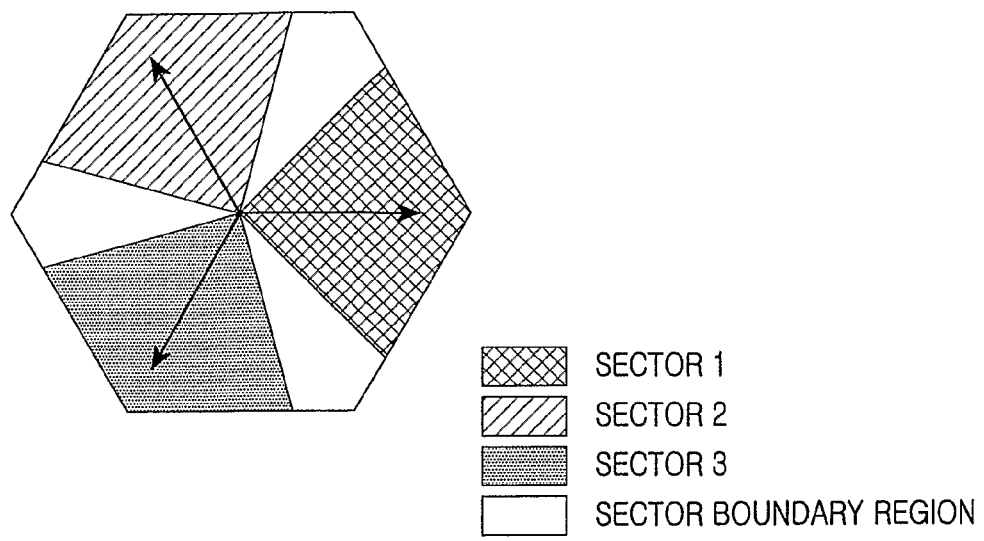
FIG. 18A illustrates sector boundary regions of a first hexagonal cell in a 3-sector system when it is designed in the first design step according to the present invention.
Figure 18B:
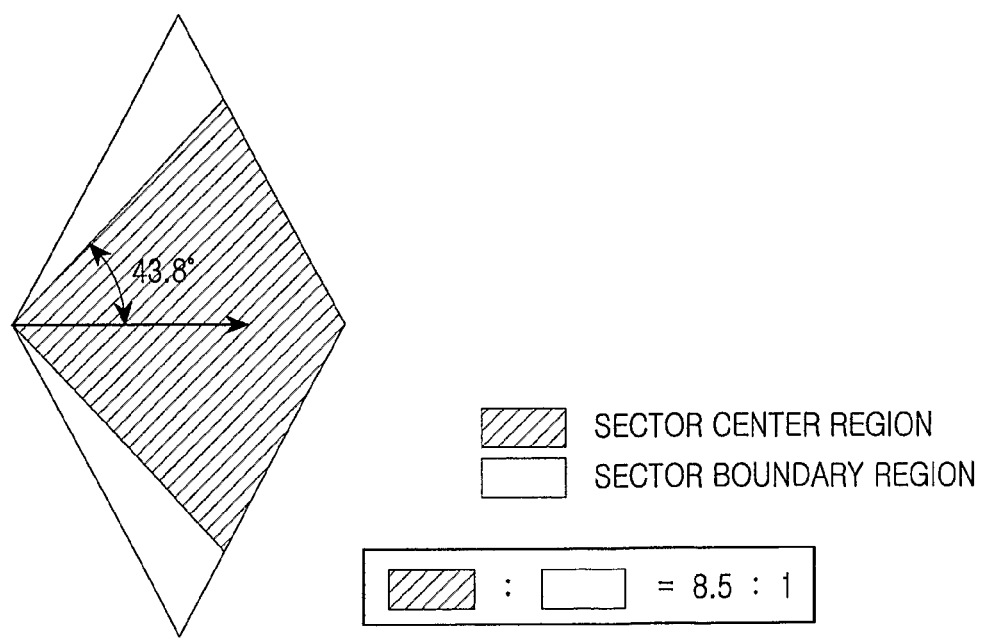
FIG. 18B illustrates sector division for the first hexagonal cell in a 3-sector system when it is designed in the first design step according to the present invention.
Figure 18C:
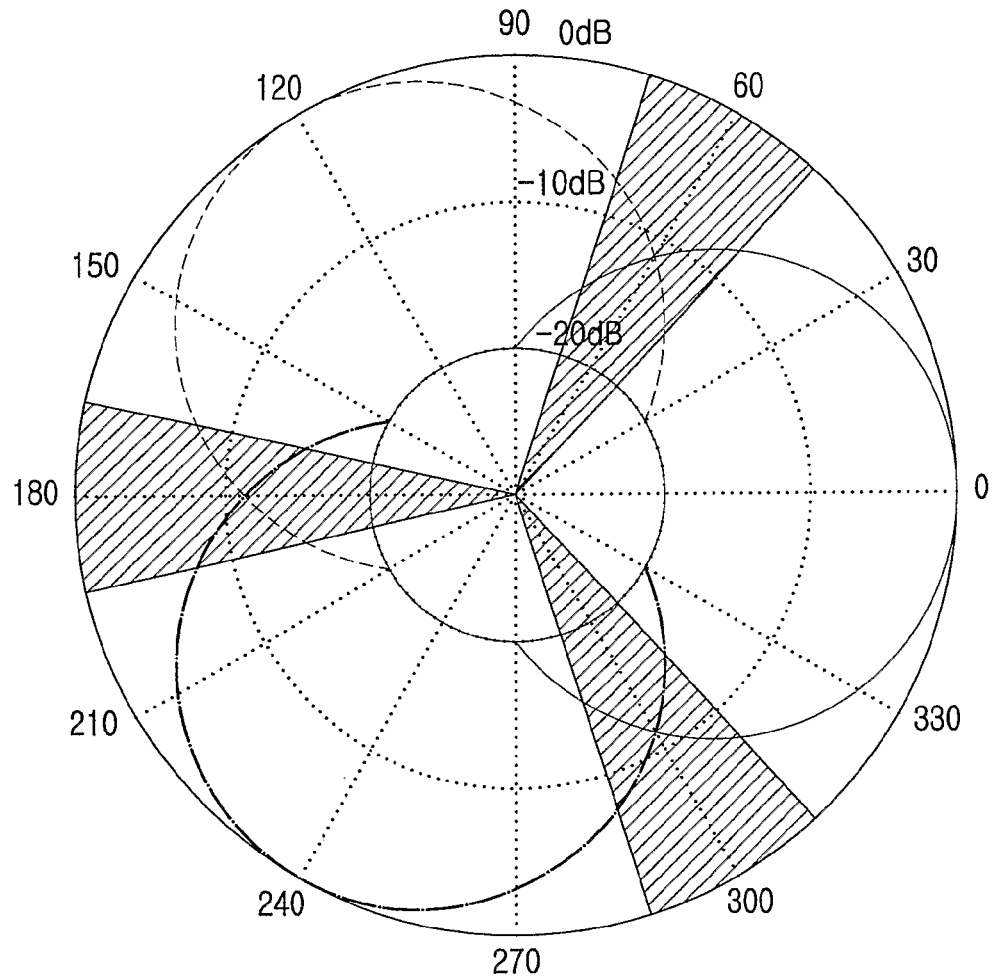
FIG. 18C illustrates antenna beam patterns for the first hexagonal cell in a 3-sector system when it is designed in the first design step according to the present invention.
Figure 18C:
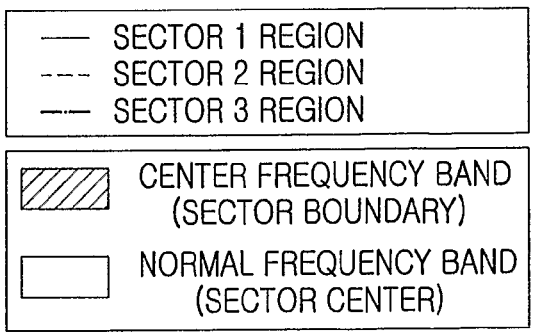

With reference to FIGS. 18A, 18B and 18C, antenna beam patterns for a first hexagonal cell in a 3-sector system according to the first design step will be described.

FIG. 18A illustrates sector boundary regions of a first hexagonal cell in a 3-sector system according to the first design step of the present invention, FIG. 18B illustrates the size of a sector center region and the size of a sector boundary region of the first hexagonal cell in a 3-sector system according to the first design step of the present invention, and FIG. 18C illustrates antenna beam patterns for the first hexagonal cell in a 3-sector system according to the first design step of the present invention. As illustrated in FIG. 18B, for a total sector range of 120°, the ratio between a center frequency bandwidth and a normal frequency bandwidth is 1:8.5. Thus, the center frequency bandwidth is 8.7% of a total frequency bandwidth, the normal frequency bandwidth is 73.9% of the total frequency bandwidth. The maximum frequency efficiency is 82.6%.

Figure 19A:
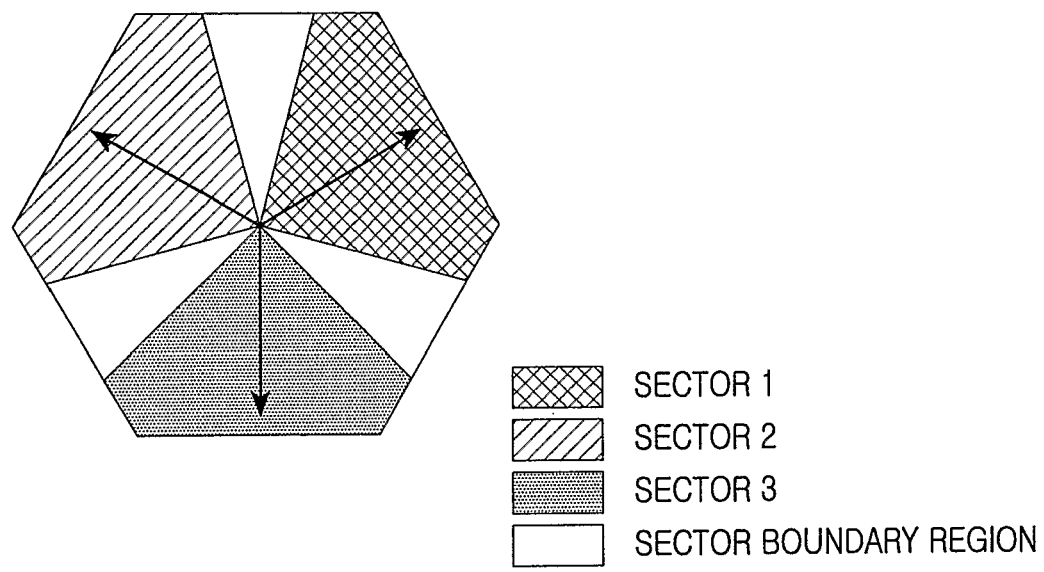
FIG. 19A illustrates sector boundary regions of a second hexagonal cell in a 3-sector system when it is designed in the first design step according to the present invention.
Figure 19B:
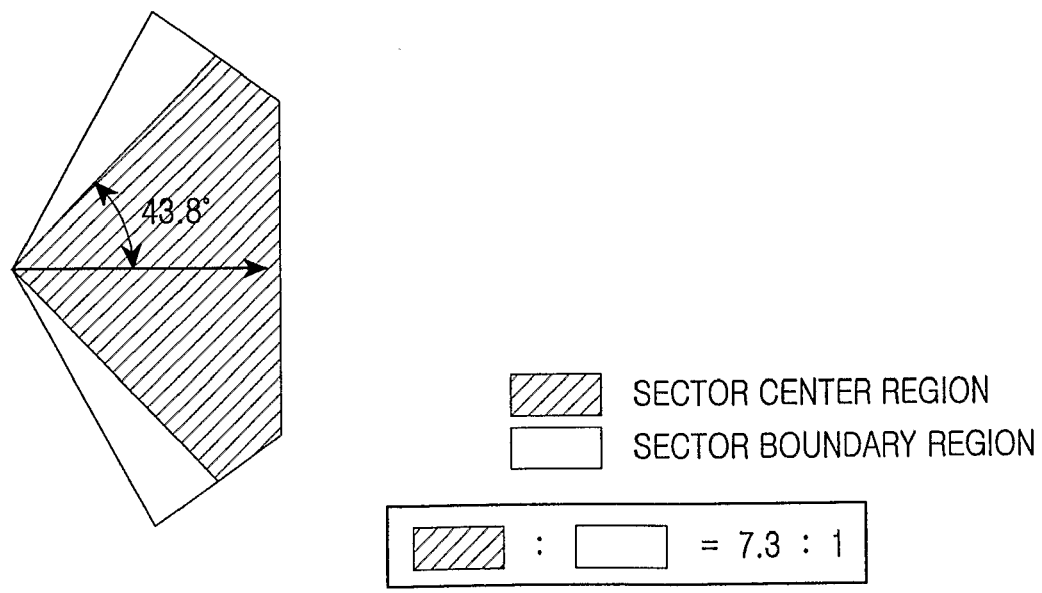
FIG. 19B illustrates sector division for the second hexagonal cell in a 3-sector system when it is designed in the first design step according to the present invention.
Figure 19C:
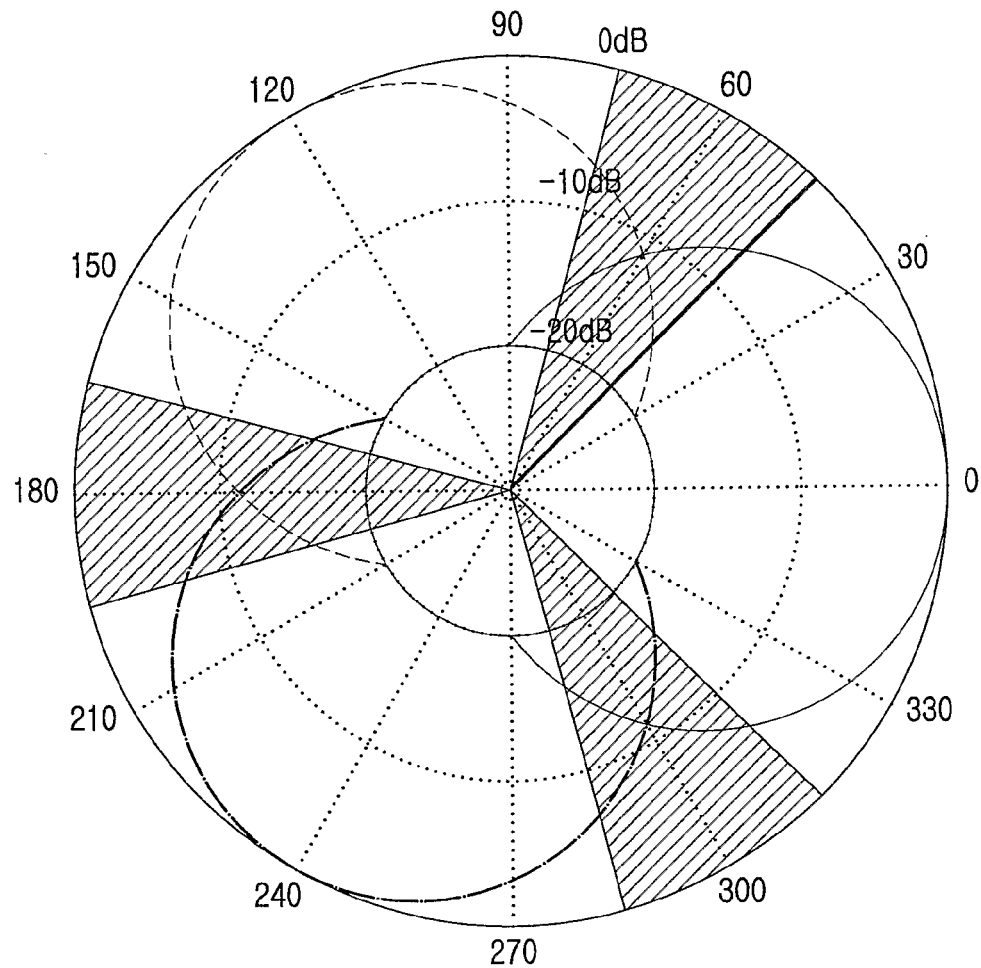
FIG. 19C illustrates antenna beam patterns for the second hexagonal cell in a 3-sector system when it is designed in the first design step according to the present invention.
Figure 19C:
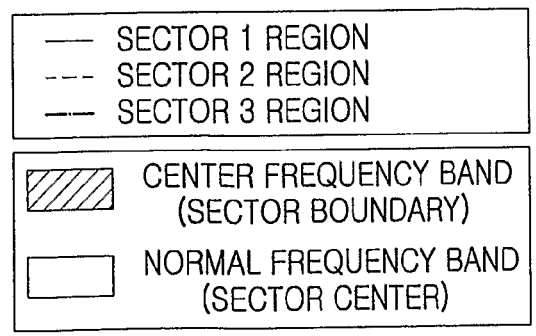

With reference to FIGS. 19A, 19B and 19C, antenna beam patterns for a second hexagonal cell in a 3-sector system according to the first design step will be described.

FIG. 19A illustrates sector boundary regions of a second hexagonal cells in a 3-sector system according to the first design step of the present invention, FIG. 19B illustrates the size of a sector center region and the size of a sector boundary region of the second hexagonal cell in a 3-sector system according to the first design step of the present invention, and FIG. 19C illustrates antenna beam patterns for the second hexagonal cell in a 3-sector system according to the first design step of the present invention. As illustrated in FIG. 19B, for a total sector range of 120°, the ratio between a center frequency bandwidth and a normal frequency bandwidth is 1:7.3. Thus, the center frequency bandwidth is 9.7% of a total frequency bandwidth, the normal frequency bandwidth is 70.8% of the total frequency bandwidth. The maximum frequency efficiency is 80.5%.

Now the case where the resource utilization system and method are designed in the second design step will be described below.

(1) Decide Center Frequency Bandwidth and Normal Frequency Bandwidth

A system-required center frequency bandwidth and a normal frequency bandwidth are decided for each sector. The sizes of a sector center region and a sector boundary region are determined in proportion to the normal frequency bandwidth and the center frequency bandwidth (but not always, and they can be determined considering the center frequency bandwidth, the normal frequency bandwidth, and MS distribution), as follows.

$$\text{size of region for center frequency band in sector} = \frac{\text{center frequency bandwidth}}{\text{maximum frequency efficiency}}$$

$$\text{size of region for normal frequency band in sector} = \frac{\text{normal frequency bandwidth}}{\text{maximum frequency efficiency}}$$

After the sizes of the sector center region and the sector boundary region are decided, an antenna beam pattern is determined according to the shape of the sector center region.

(2) Determine $\eta_{threshold}$ $\eta_{threshold}$ is determined, taking into account a sectorization factor, a cell shape, an interference requirement, overlapping characteristics, a ratio between a center frequency bandwidth and a normal frequency bandwidth in each sector, and a QoS parameter.

(3) Design Antenna Beam Pattern

An antenna beam pattern is designed, considering the decided center frequency bandwidth and normal frequency bandwidth and the determined $\eta_{threshold}$.

For example, for a 3-sector cell, assuming that the center frequency bandwidth is 1/6 of a total frequency bandwidth, the maximum frequency efficiency is 2/3 of the total frequency band. Since 1/4 of the maximum frequency efficiency corresponds to the center frequency band and 3/4 of the maximum frequency efficiency corresponds to the normal frequency band, the ratio between a sector boundary region and a sector center region is 1:3. $\eta_{threshold}$ is determined according to a QoS parameter. Herein, $\eta_{threshold}$ is assumed to be 10[dB]. $\theta_{3dB}$ is set so that the power difference $D_{sector\ boundary}$ between a serving sector and a comparative sector, i.e. the nearest neighbor sector is 10[dB] at a position that divides the sector into a 4/1 region and a 3/4 region. This is described in Equation (8).

With reference to FIGS. 20A to 20D, antenna beam patterns for a 3-sector clover cell according to the second design step will be described.

Figure 20A:
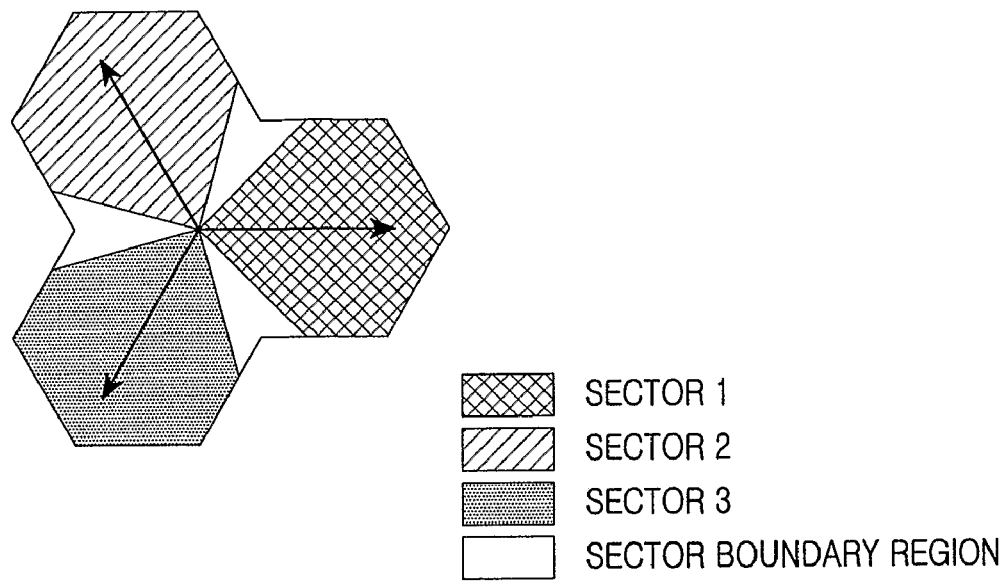
FIG. 20A illustrates sector boundary regions in a 3-sector clover cell when it is designed in a second design step according to the present invention.
Figure 20B:
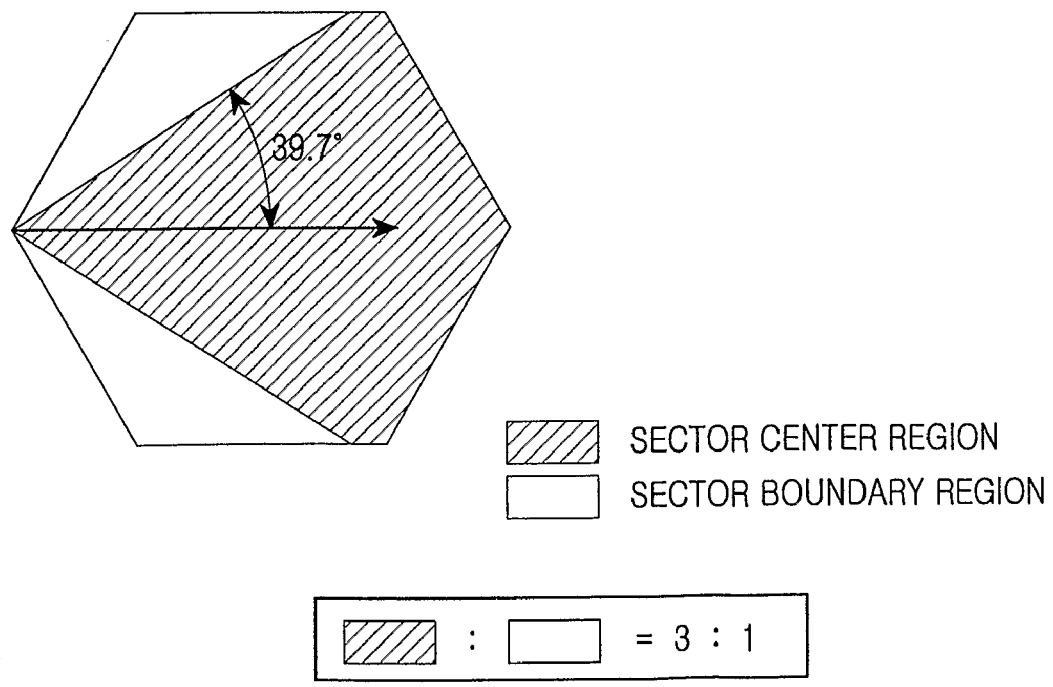
FIG. 20B illustrates sector division in the 3-sector clover cell when it is designed in the second design step according to the present invention.
Figure 20C:
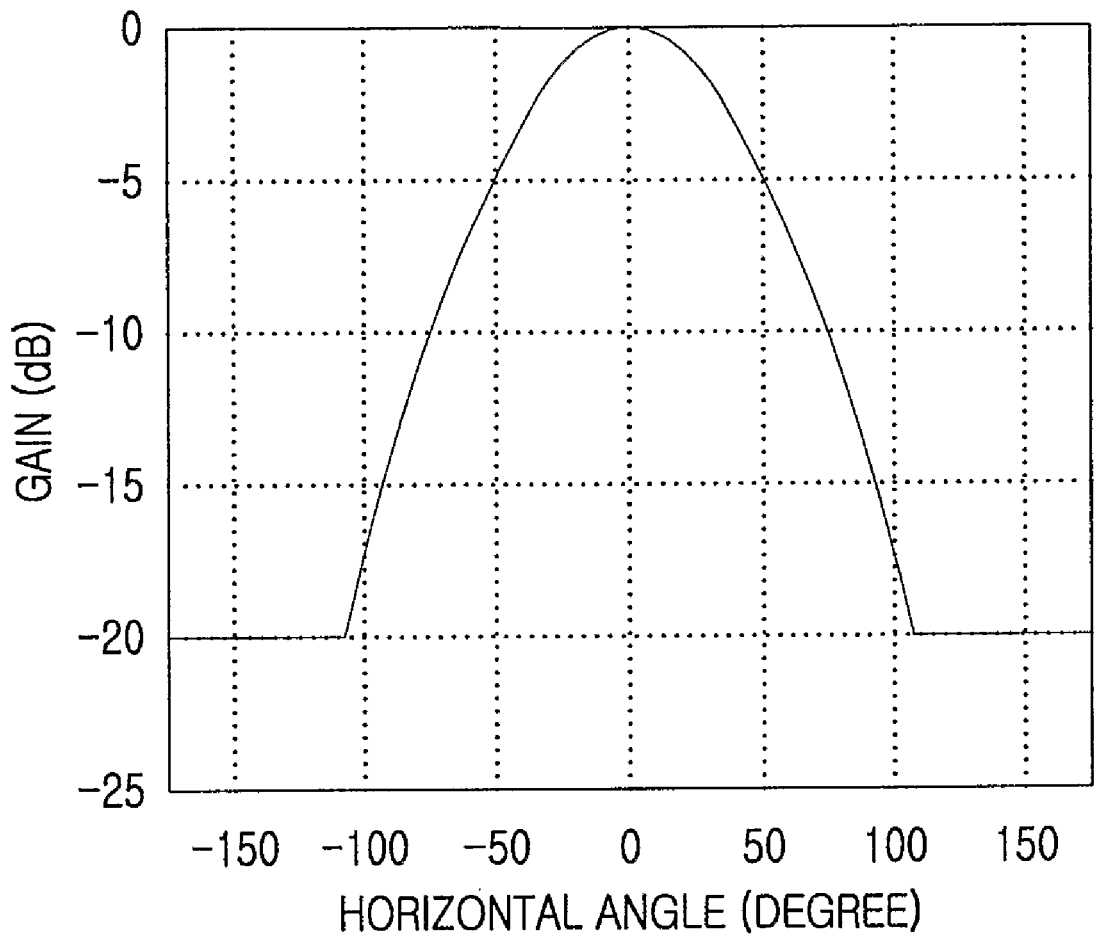
FIG. 20C is a graph illustrating the gains of sectorized antennas in the 3-sector clover cell when it is designed in the second design step according to the present invention.
Figure 20D:
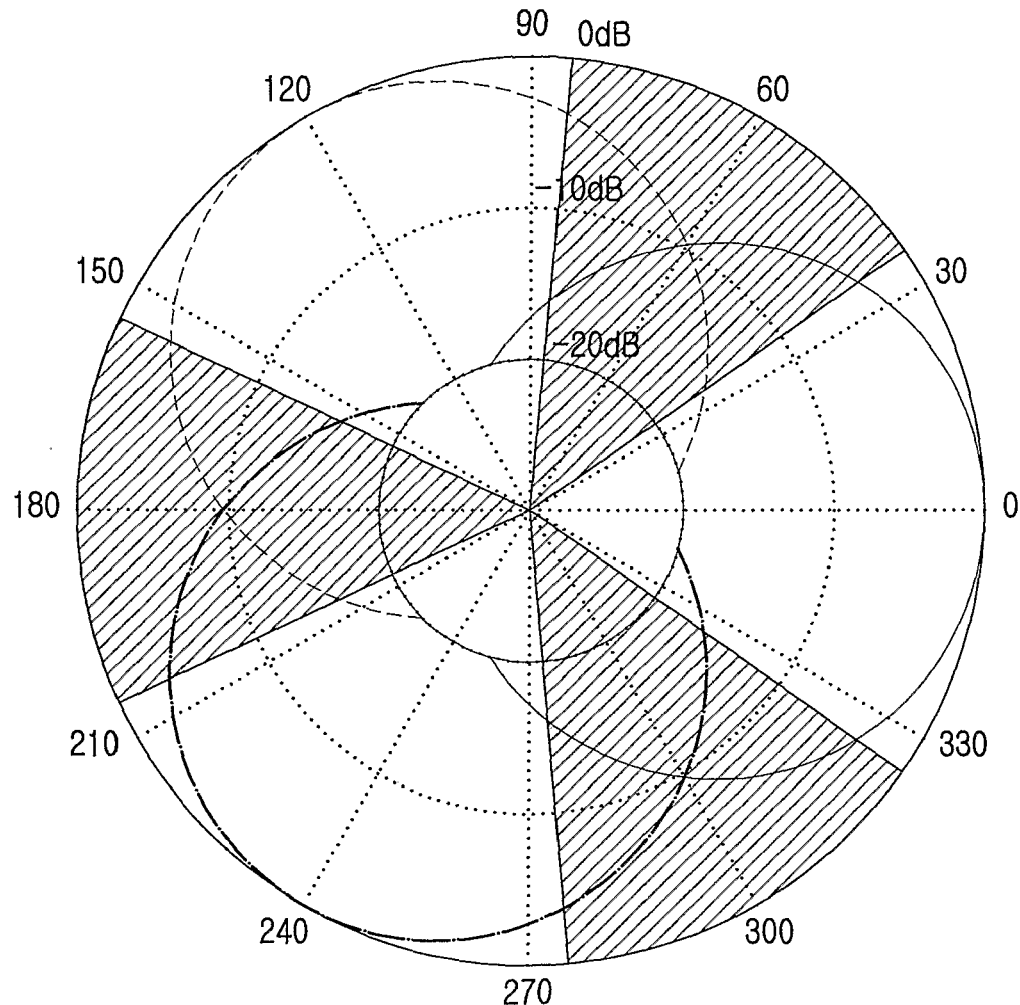
FIG. 20D illustrates antenna beam patterns in the 3-sector clover cell when it is designed in the second design step according to the present invention.
Figure 20D:
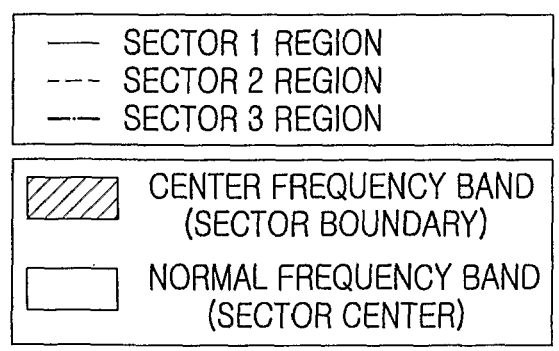

FIG. 20A illustrates sector boundary regions in a 3-sector clover cell according to the second design step of the present invention, FIG. 20B illustrates the size of a sector center region and the size of a sector boundary region in the 3 sector clover cell according to the second design step of the present invention, FIG. 20C is a graph illustrating antenna gains for the 3-sector clover cell according to the second design step of the present invention, and FIG. 20D illustrates antenna beam patterns for the 3-sector clover cell according to the second design step of the present invention. As illustrated in FIG. 20B, the ratio between the size of the sector boundary regions and the size of the sector center region proportional to a center frequency bandwidth and a normal frequency bandwidth is 1:3. For $\eta_{threshold}$=10[dB], an angle that divides a sector into a sector center region and a sector boundary region at a ratio of 1:3 in size is 39.7° (at which the size of the sector boundary region is 1/4 of the total sector size). $\theta_{3dB}$ that satisfies $D_{sector\ boundary}=\eta_{threshold}$=10[dB] is 82.25°.

With reference to FIGS. 21A to 21D, antenna beam patterns for a first hexagonal cell in a 3-sector system according to the second design step will be described.

Figure 21A:
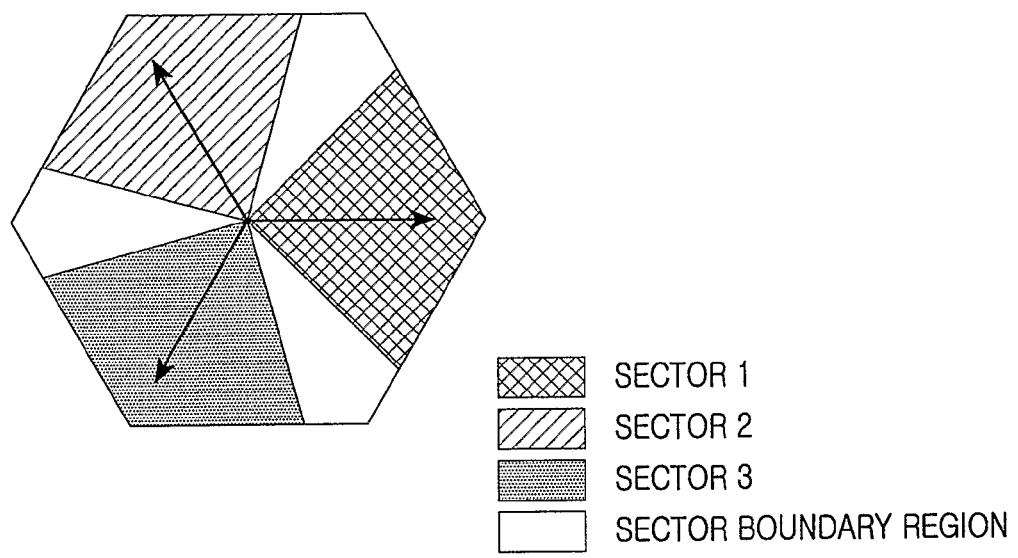
FIG. 21A illustrates sector boundary regions of a first hexagonal cell in a 3-sector system when it is designed in the second design step according to the present invention.
Figure 21B:
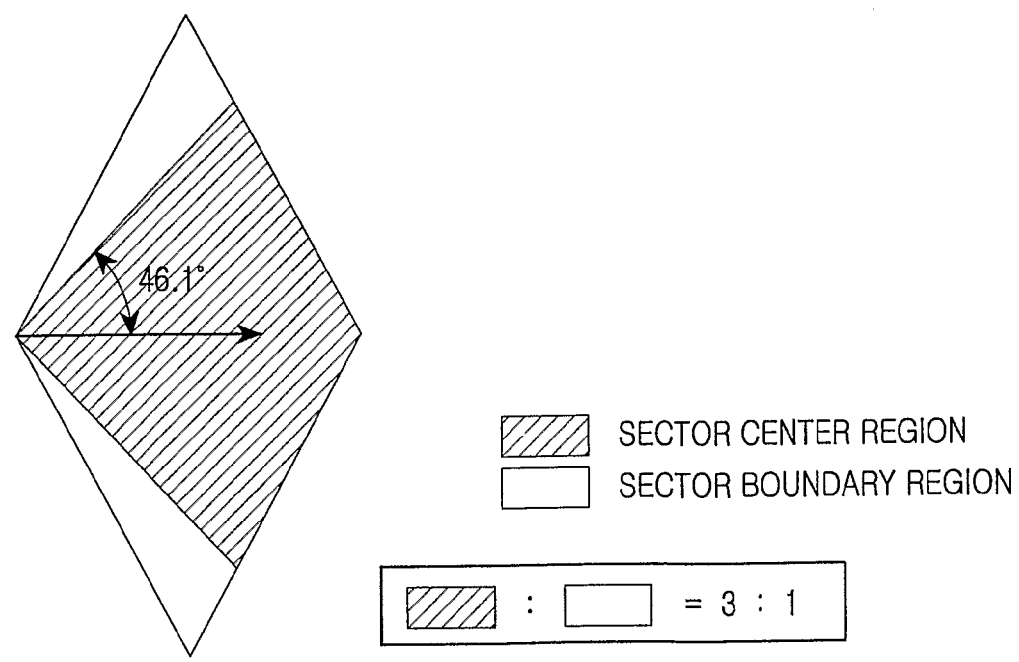
FIG. 21B illustrates sector division for the first hexagonal cell in a 3-sector system when it is designed in the second design step according to the present invention.
Figure 21C:
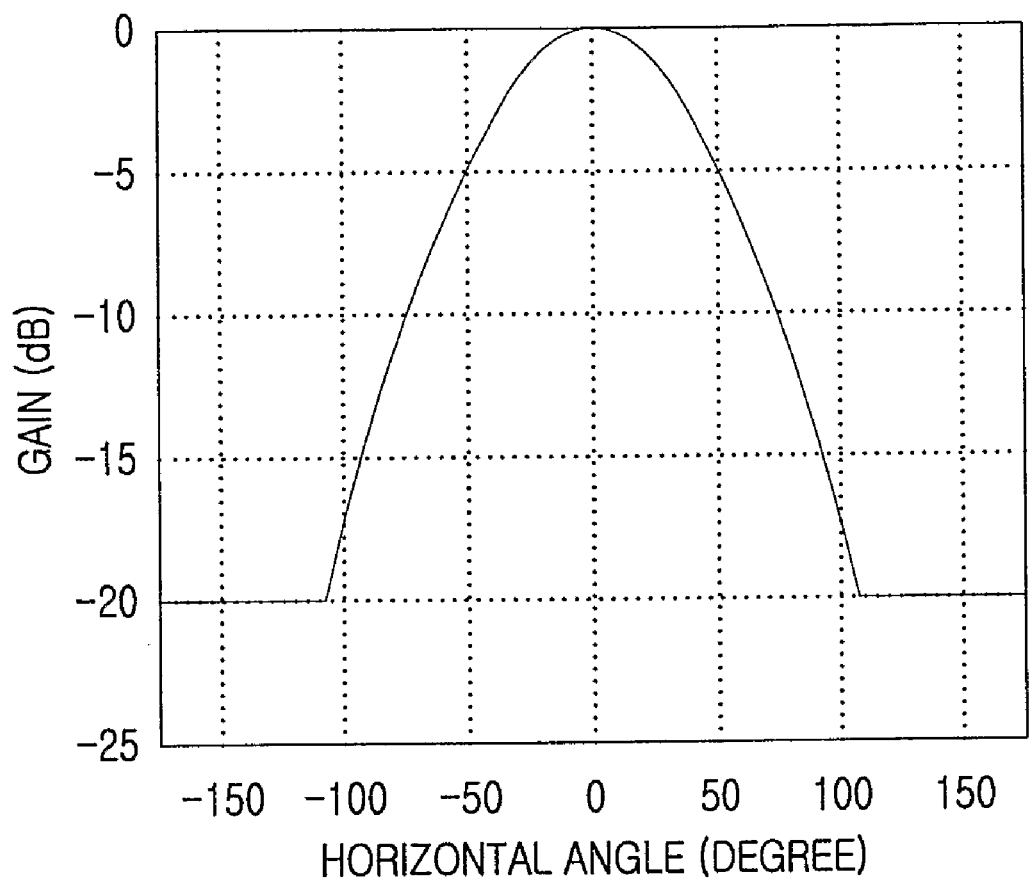
FIG. 21C is a graph illustrating the gains of sectorized antennas for the first hexagonal cell in a 3-sector system when it is designed in the second design step according to the present invention.
Figure 21D:
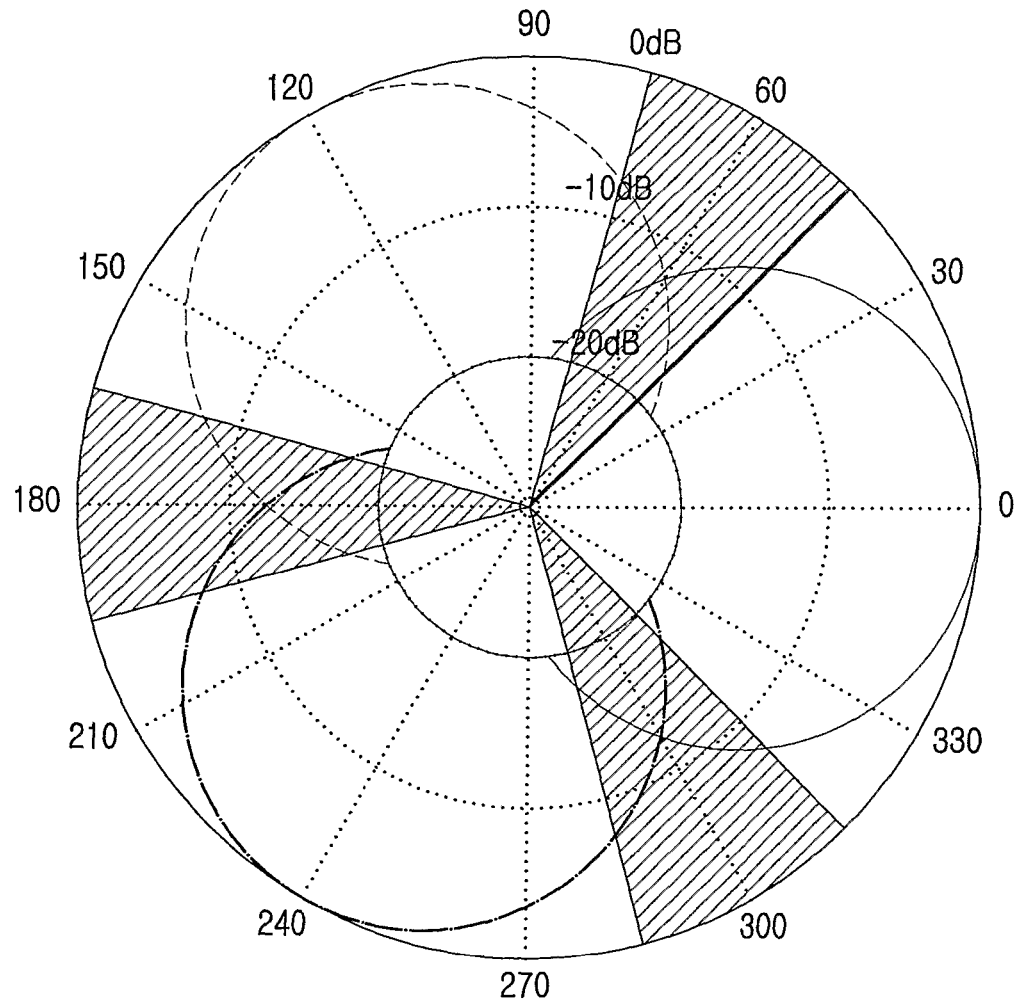
FIG. 21D illustrates antenna beam patterns for the first hexagonal cell in a 3-sector system when it is designed in the second design step according to the present invention.
Figure 21D:
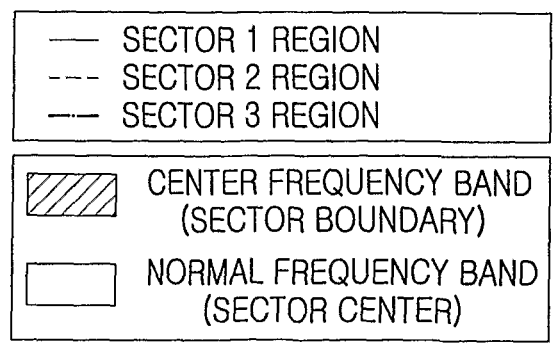

FIG. 21A illustrates sector boundary regions of a first hexagonal cell in a 3-sector system according to the second design step of the present invention, FIG. 21B illustrates the size of a sector center region and the size of a sector boundary region of the first hexagonal cell in a 3-sector system according to the second design step of the present invention, FIG. 21C is a graph illustrating antenna gains for the first hexagonal cell in a 3-sector system according to the second design step of the present invention, and FIG. 21D illustrates antenna beam patterns for the first hexagonal cell in a 3-sector system according to the second design step of the present invention. As illustrated in FIG. 21B, the ratio between the size of the sector boundary regions and the size of the sector center region proportional to a center frequency bandwidth and a normal frequency bandwidth is 1:3. For $\eta_{threshold}$=10[dB], an angle that divides a sector into a sector center region and sector boundary regions at a ratio of 1:3 in size is 46.1° (at which the size of the sector boundary regions is ¼ of the total sector size). $\theta_{3dB}$ that satisfies $D_{sector\ boundary}=\eta_{threshold}=10$ [dB] is 57.9°.

With reference to FIGS. 22A to 22D, antenna beam patterns for a second hexagonal cell in a 3-sector system according to the second design step will be described.

Figure 22A:
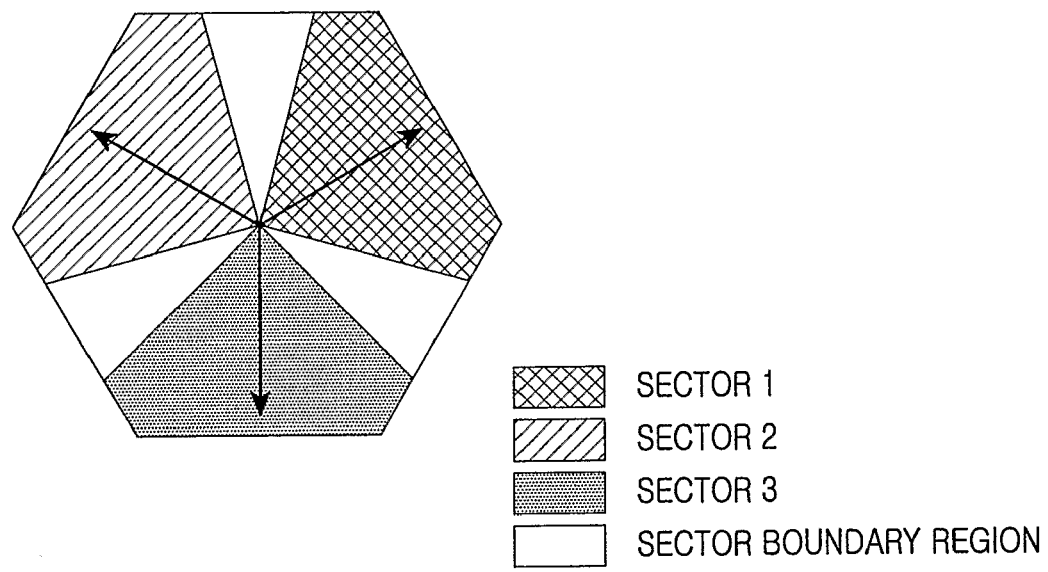
FIG. 22A illustrates sector boundary regions of a second hexagonal cell in a 3-sector system when it is designed in the second design step according to the present invention.
Figure 22B:
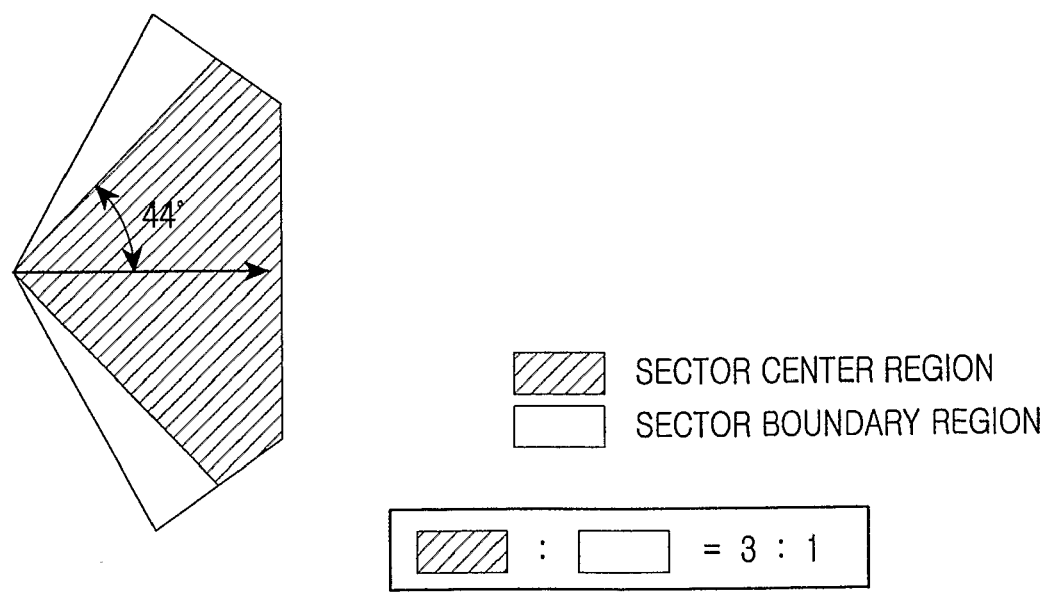
FIG. 22B illustrates sector division for the second hexagonal cell in a 3-sector system when it is designed in the second design step according to the present invention.
Figure 22C:
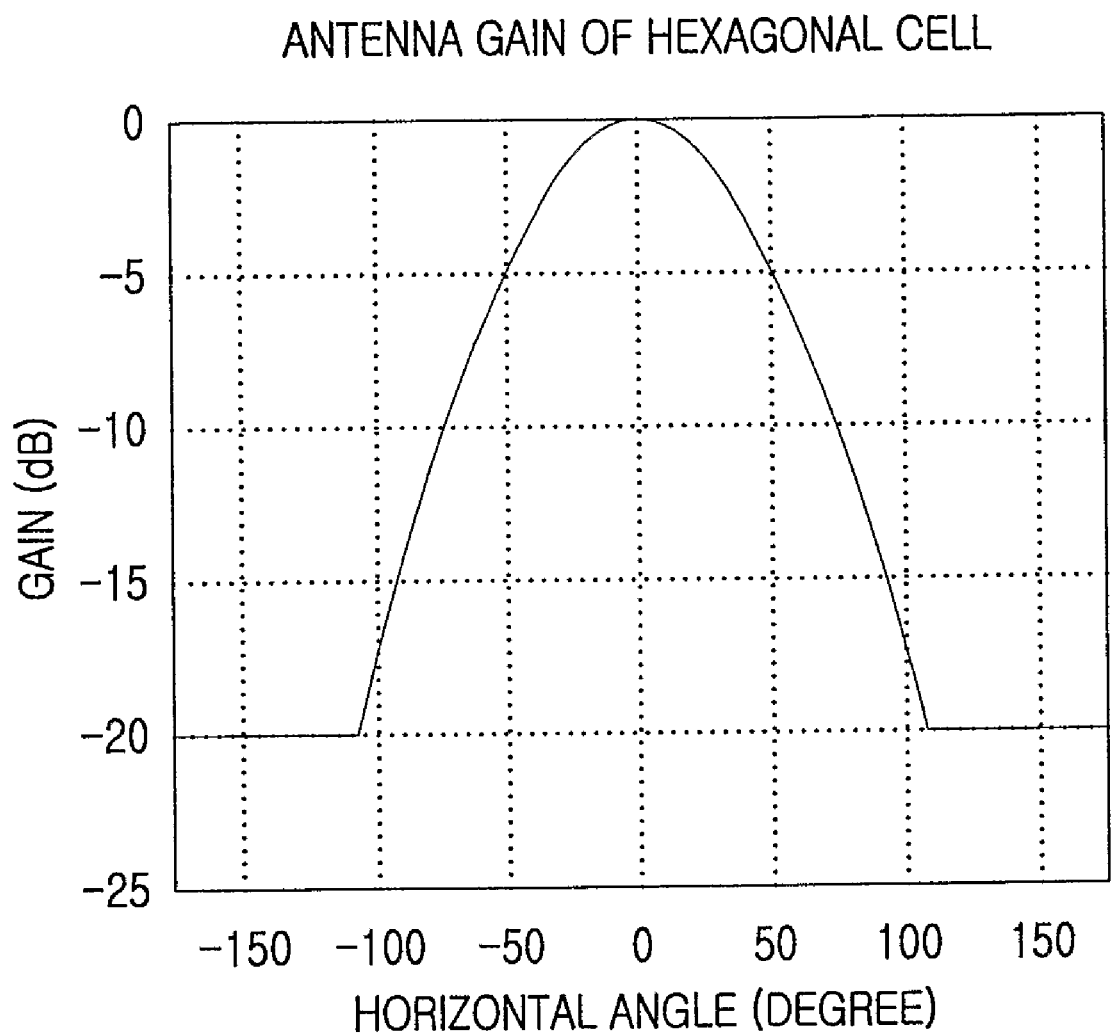
FIG. 22C is a graph illustrating the gains of sectorized antennas for the second hexagonal cell in a 3-sector system when it is designed in the second design step according to the present invention.
Figure 22D:
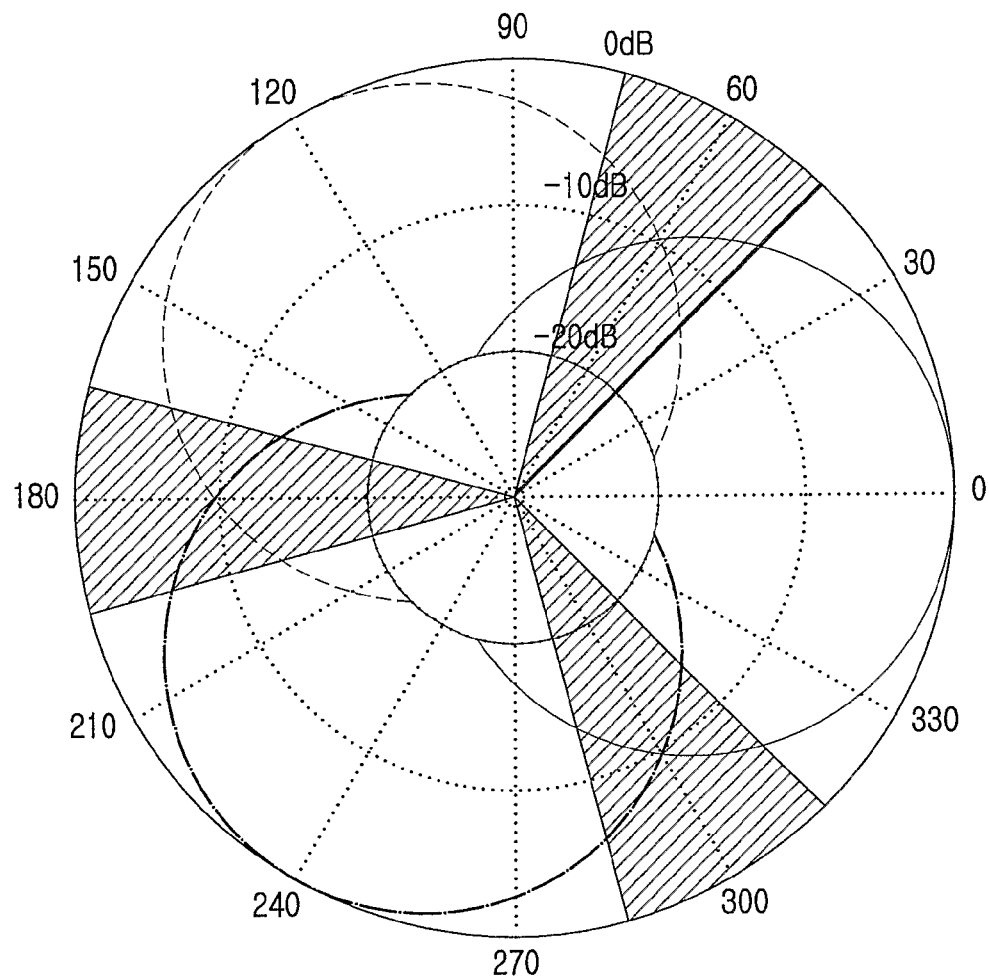
FIG. 22D illustrates antenna beam patterns for the second hexagonal cell in a 3-sector system when it is designed in the second design step according to the present invention.
Figure 22D:
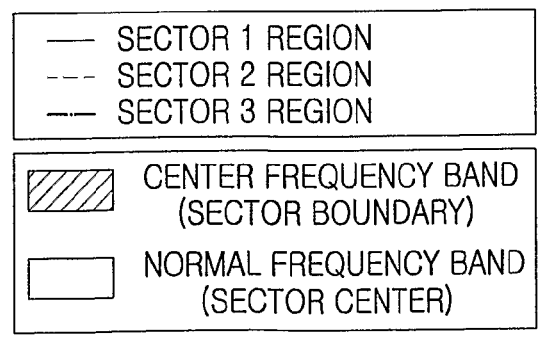

FIG. 22A illustrates sector boundary regions of a second hexagonal cell in a 3-sector system according to the second design step of the present invention, FIG. 22B illustrates the size of sector center regions and the size of a sector boundary region of the second hexagonal cell in a 3-sector system cell according to the second design step of the present invention, FIG. 22C is a graph illustrating antenna gains for the second hexagonal cell in a 3-sector system according to the second design step of the present invention, and FIG. 22D illustrates antenna beam patterns for the second hexagonal cell in a 3-sector system cell according to the second design step of the present invention. As illustrated in FIG. 21B, the ratio between the size of the sector boundary region and the size of the sector center region proportional to a center frequency bandwidth and a normal frequency bandwidth is 1:3. For $\eta_{threshold}=10[dB]$, an angle that divides a sector into a sector center region and sector boundary regions at a ratio of 1:3 in size is 44° (at which the size of the sector boundary region is ¼ of the total sector size). $\theta_{3dB}$ that satisfies $D_{sector\ boundary}=\eta_{threshold}=10[dB]$ is 59.7°.

A DCA method according to an exemplary embodiment of the present invention will be described.

Parameters used for DCA are $P_{sector\ boundary}$ described in Equation (1) and $SINR_{user}$ expressed as $$SINR_{user} = 10 \cdot \log_{10} \frac{|S_{sector\ a}|^2}{I_{intracell} + I_{intercell} + N_o} (dB) \quad (11)$$

where $I_{int\ racell}$ denotes the power of inter-sector interference within the cell, $I_{int\ ercell}$ denotes the power of interference from neighbor cells, $N_o$ denotes the power of Additive White Gaussian Noise (AWGN). Herein, $I_{int\ racell}=|S_{sector\ b}|^2+|S_{sector\ c}|^2+\ldots$.

A description will be made of a method for allocating resources so that an MS switches from a normal frequency band to a center frequency band according to the DCA scheme according to an exemplary embodiment of the present invention.

Firstly, when MSs are uniformly distributed in a sector, i.e. under an environment where the locations of MSs are not concentrated but equidistantly spaced in a sector, resources are re-allocated to MSs so that the MSs switch from a normal frequency band to a center frequency band.

Figure 23:
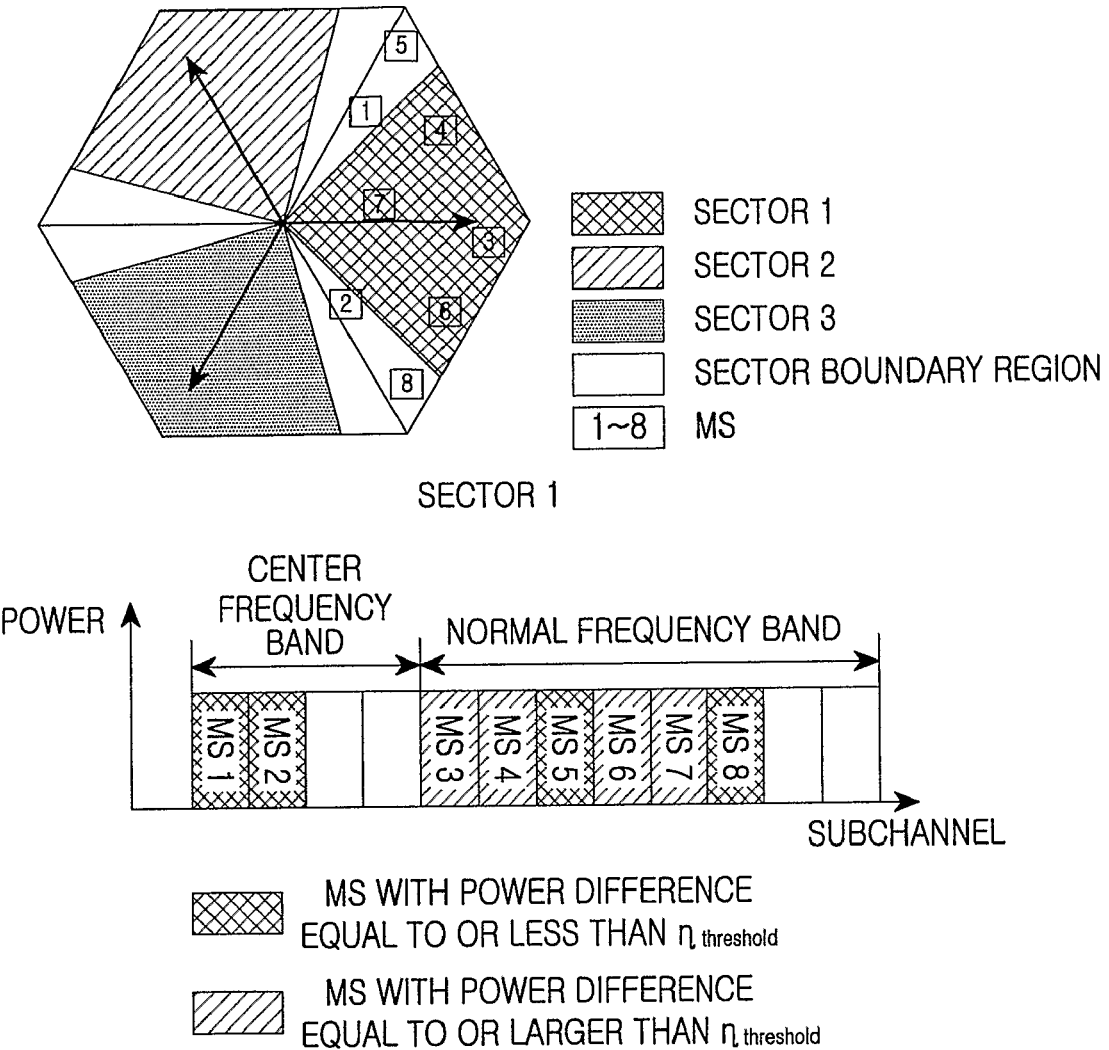
FIG. 23 illustrates an operation for detecting MSs with $P_{sector\ boundary}$ less than $\eta_{threshold}$ among MSs using a normal frequency band, when MSs are uniformly distributed within a sector according to an exemplary embodiment of the present invention.

With reference to FIG. 23, a description will be made of an operation for detecting MSs with $P_{sector\ boundary}$ less than $\eta_{threshold}$ among MSs using a normal frequency band when MSs are uniformly distributed in a sector according to an exemplary embodiment of the present invention.

FIG. 23 illustrates an operation for detecting MSs with $P_{sector\ boundary}$ less than $\eta_{threshold}$ among MSs using a normal frequency band when MSs are uniformly distributed in a sector according to an exemplary embodiment of the present invention.

Referring to FIG. 23, MSs with $P_{sector\ boundary}$ less than $\eta_{threshold}$ are detected among MS using the normal frequency band. Specifically, the power difference between a signal received at an MS from a serving sector and the strongest of signals received at the MS from neighbor sectors is calculated and if the power difference is below $\eta_{threshold}$, the MS is considered to be located in a sector boundary region.

Figure 24:
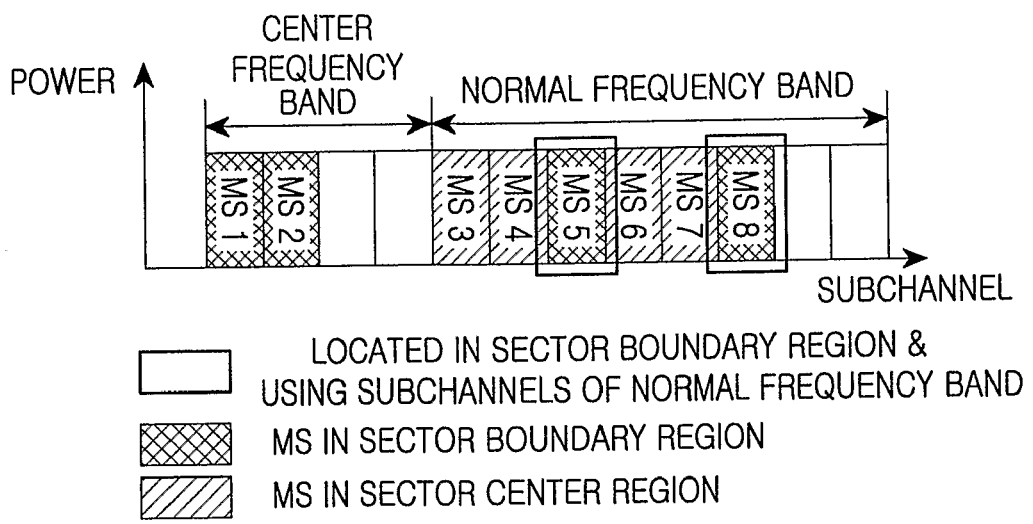
FIG. 24 illustrates an operation for detecting MSs to which resources of the normal frequency band have been allocated among the MSs with $P_{sector\ boundary}$ less than $\eta_{threshold}$ illustrated in FIG. 23.

With reference to FIG. 24, an operation for detecting an MS with resources of the normal frequency band among the MSs with $P_{sector\ boundary}$ less than $\eta_{threshold}$ illustrated in FIG. 23 will be described below.

FIG. 24 illustrates an operation for detecting MSs with resources of the normal frequency band among the MSs with $P_{sector\ boundary}$ less than $\eta_{threshold}$ illustrated in FIG. 23.

Referring to FIG. 24, MSs with resources of the normal frequency band are MS 5 and MS 8 among the MSs with $P_{sector\ boundary}$ less than $\eta_{threshold}$.

An operation for re-allocating resources of the center frequency band to the MSs using resources of the normal frequency band in the sector boundary region illustrated in FIG. 24 will be described with reference to FIG. 25.

Figure 25:
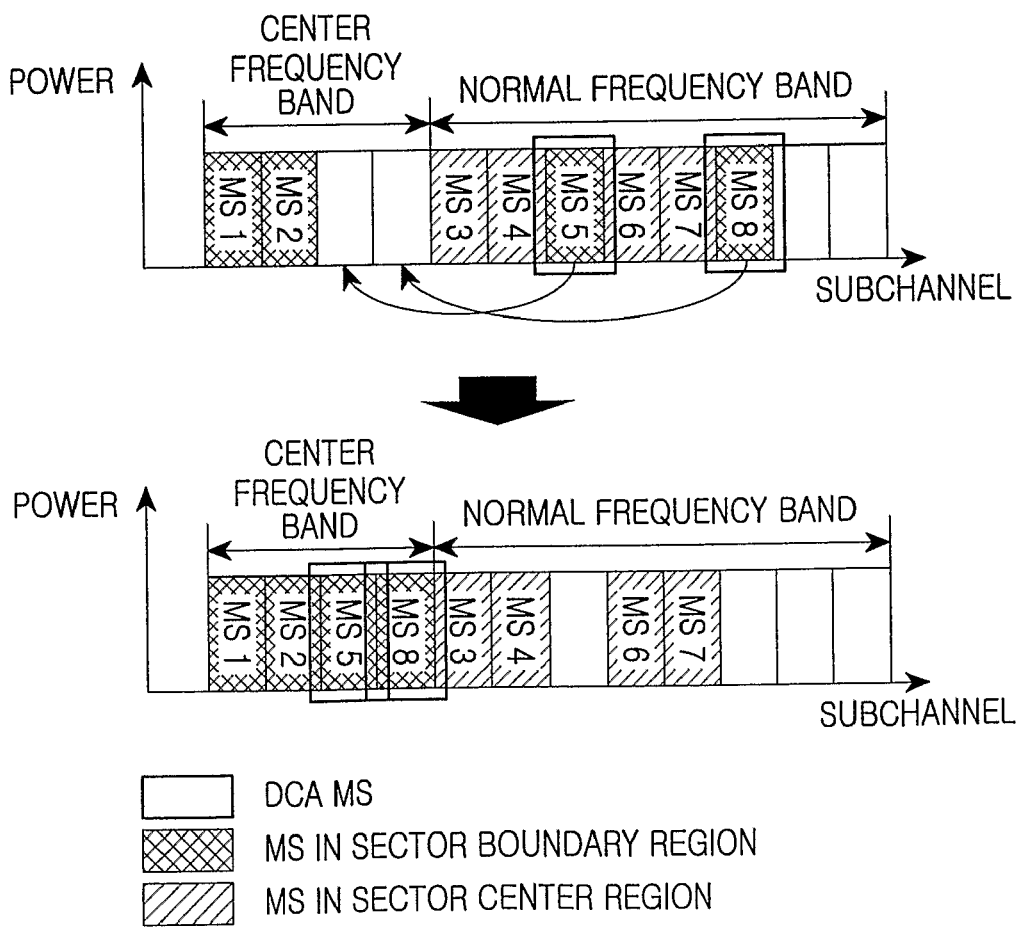
FIG. 25 illustrates an operation for re-allocating resources of a center frequency band to the MSs illustrated in FIG. 24 to which the resources of the normal frequency band have been allocated but are located in a sector boundary region.

FIG. 25 illustrates an operation for re-allocating resources of the center frequency band to the MSs using resources of the normal frequency band in the sector boundary region illustrated in FIG. 24.

Referring to FIG. 25, MS 5 and MS 8 were allocated resources of the normal frequency band. As they are now located in the sector boundary region, resources of the center frequency band are re-allocated to them.

Secondly, when MSs are non-uniformly distributed in a sector, i.e. under an environment where the locations of MSs are concentrated and thus their resource requirement exceeds the total resources of a frequency band corresponding to their locations, resources are reallocated to MSs so that the MSs switch from a normal frequency band to a center frequency band.

Figure 26:
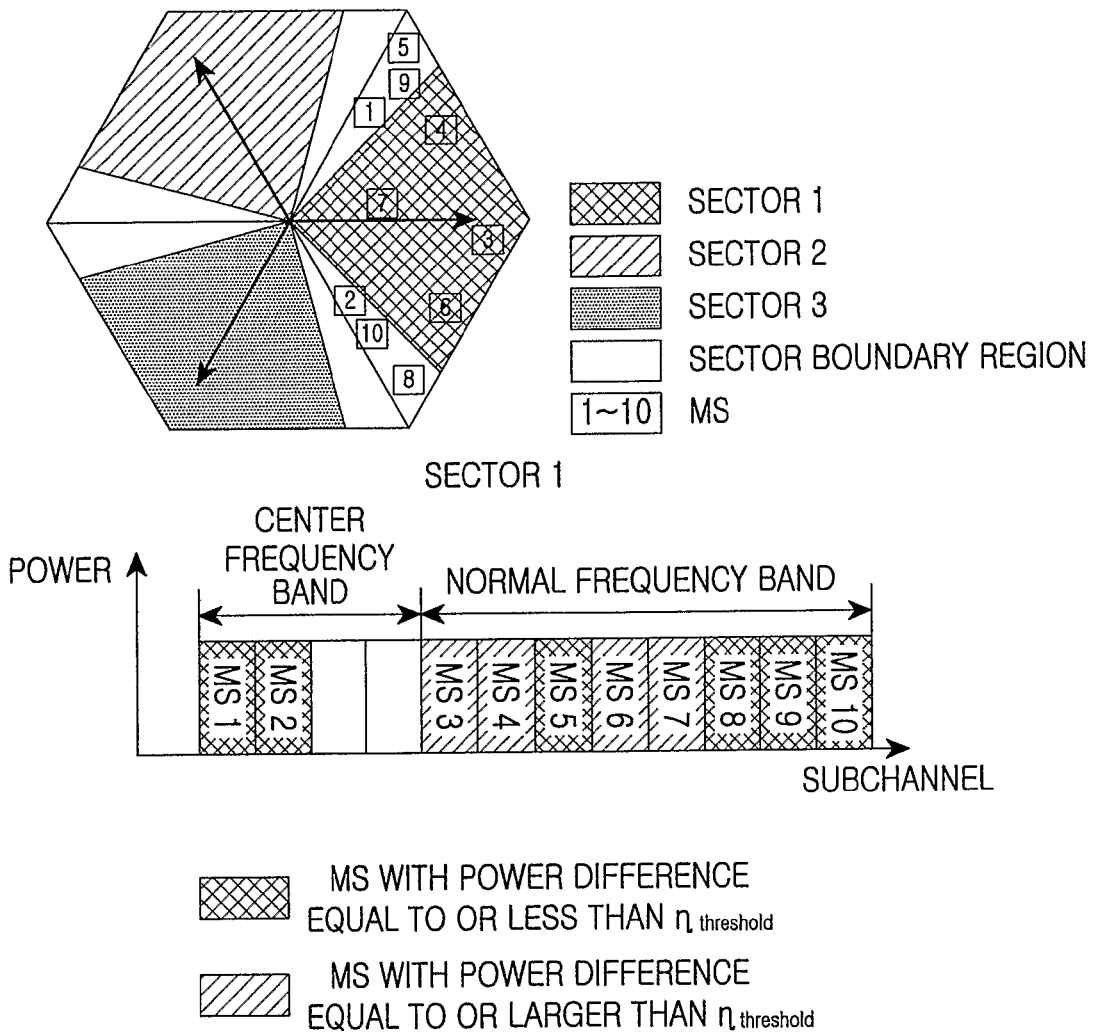
FIG. 26 illustrates an operation for detecting MSs with $P_{sector\ boundary}$ less than $\eta_{threshold}$ among MSs using a normal frequency band, when MSs are non-uniformly distributed within a sector according to an exemplary embodiment of the present invention.

FIG. 26 illustrates an operation for searching for MSs with $P_{sector\ boundary}$ less than $\eta_{threshold}$ among MSs using a normal frequency band when MSs are non-uniformly distributed in a sector according to an exemplary embodiment of the present invention.

Referring to FIG. 26, MSs with $P_{sector\ boundary}$ less than $\eta_{threshold}$ are detected among MSs using the normal frequency band. Specifically, the power difference between a signal received at an MS from a serving sector and the strongest of signals received at the MS from neighbor sectors is calculated and if the power difference is below $\eta_{threshold}$, the MS is considered to be located in the sector boundary region.

Figure 27:
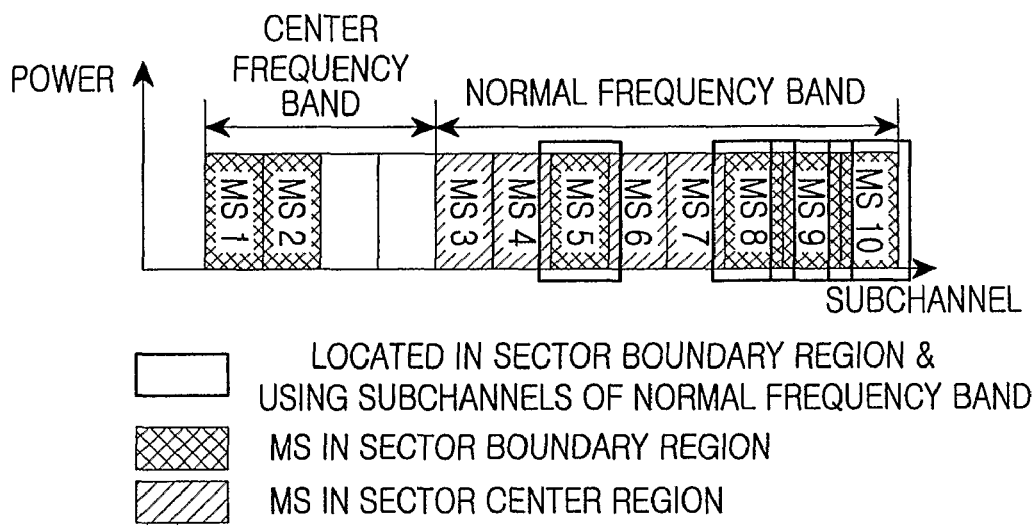
FIG. 27 illustrates an operation for detecting MSs to which resources of the normal frequency band have been allocated among the MSs with $P_{sector\ boundary}$ less than $\eta_{threshold}$ illustrated in FIG. 26.

With reference to FIG. 27, an operation for detecting MSs with resources of the normal frequency band among the MSs with $P_{sector\ boundary}$ less than $\eta_{threshold}$ illustrated in FIG. 26 will be described below.

FIG. 27 illustrates an operation for detecting MSs with resources of the normal frequency band among the MSs with $P_{sector\ boundary}$ less than $\eta_{threshold}$ illustrated in FIG. 26.

Referring to FIG. 27, MSs with resources of the normal frequency band are MS 5, MS 8, MS 9 and MS 10 among the MSs with $P_{sector\ boundary}$ less than $\eta_{threshold}$.

Figure 28:
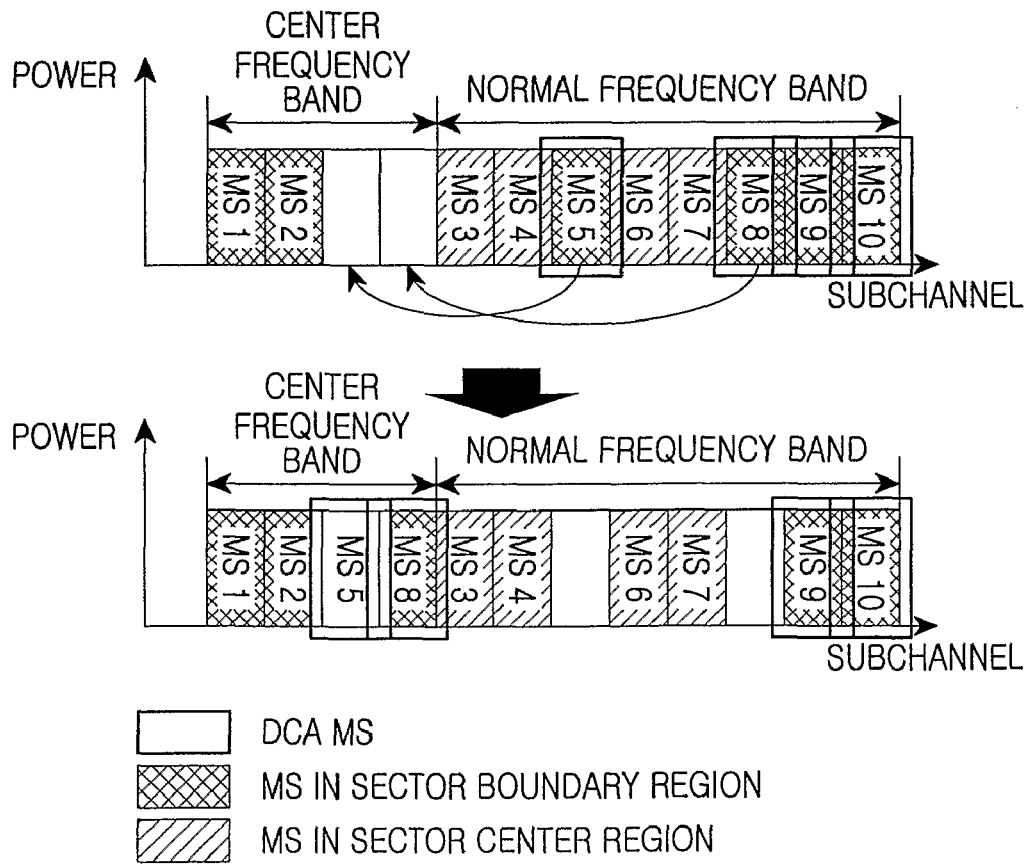
FIG. 28 illustrates an operation for re-allocating resources of a center frequency band to MS 5 and MS 8 with the lowest $P_{sector\ boundary}$ with priority among the MSs with $P_{sector\ boundary}$ less than $\eta_{threshold}$ illustrated in FIG. 27.
Figure 29:
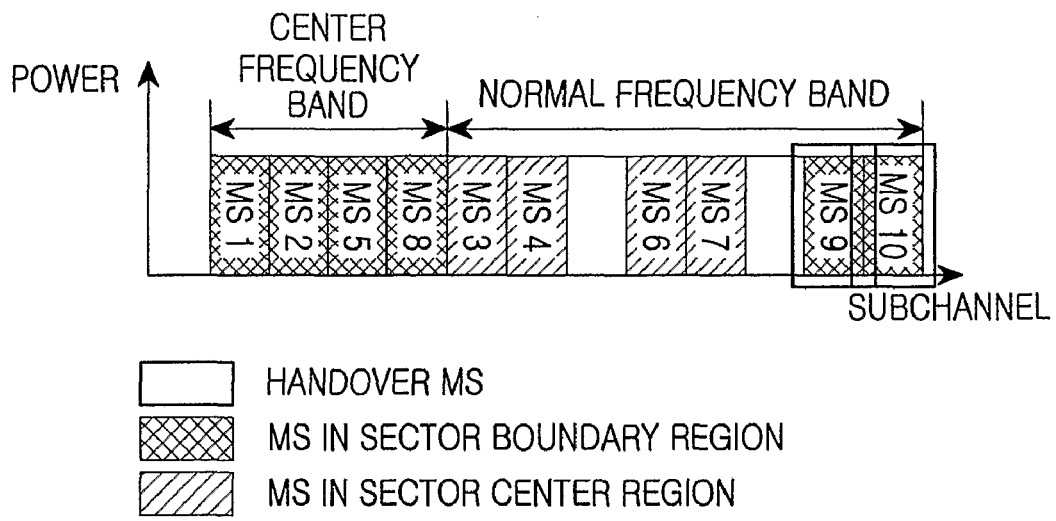
FIG. 29 illustrates an operation for classifying MS 9 and MS 10 except MS 5 and MS 8 with the lowest $P_{sector\ boundary}$ as handover MS candidates among the MSs with $P_{sector\ boundary}$ less than $\eta_{threshold}$ illustrated in FIG. 27.

An operation for re-allocating resources of the center frequency band to the MSs using resources of the normal frequency band in the sector boundary region illustrated in FIG. 27 will be described with reference to FIGS. 28 and 29.

When MSs are non-uniformly distributed in a sector, resource reallocation to MSs to which resources of the normal frequency band were allocated and which are now located in the sector boundary region can be considered in two ways.

One is to prioritize the MSs for DCA according to $P_{sector\ boundary}$. Due to the non-uniform distribution of the MSs, it may occur that more MSs that can be accommodated in the center frequency band exist. Therefore, an MS with the lowest $P_{sector\ boundary}$, i.e. an MS influenced by inter-sector interference most significantly takes the highest priority in re-allocation of resources of the center frequency band, among DCA MSs. Assuming that MS 5 and MS 8 have the lowest $P_{sector\ boundary}$ in FIG. 27, resources of the center frequency band are re-allocated to MS 5 and MS 8 with priority, as illustrated in FIG. 28. That is, FIG. 28 illustrates an operation for re-allocating resources of the center frequency band to MS 5 and MS 8 with the lowest $P_{sector\ boundary}$ with priority.

MS 9 and MS 10 beyond the capacity of the center frequency band are allowed to keep using resources of the normal frequency band. When their $SINR_{user}$ becomes equal to or less than a handover threshold, MS 9 and MS 10 are classified as handover MS candidates, as illustrated in FIG. 29. FIG. 29 illustrates an operation for classifying MS 9 and MS 10 other than MS 5 and MS 8 with the lowest $P_{sector\ boundary}$ among the MSs with $P_{sector\ boundary}$ less than $\eta_{threshold}$ illustrated in FIG. 27 as handover MS candidates, when their $SINR_{user}$ becomes equal to or less than a handover threshold.

Figure 30:
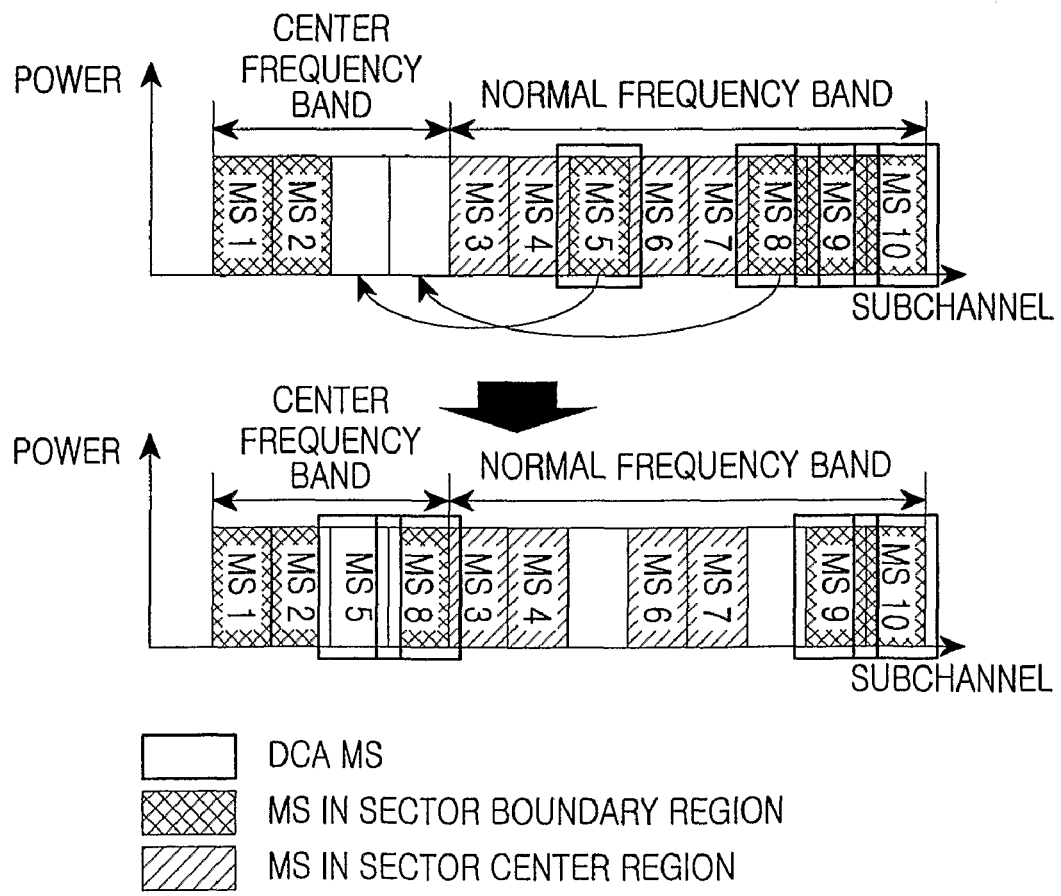
FIG. 30 illustrates an operation for re-allocating resources of the center frequency band to MS 5 and MS 8 with the lowest $SINR_{user}$ with priority among the MSs with $P_{sector\ boundary}$ less than $\eta_{threshold}$ illustrated in FIG. 27.

The other way is to prioritize the MSs for DCA, according to $SINR_{user}$. Due to the non-uniform distribution of the MSs, it may occur that more MSs that can be accommodated in the center frequency band exist. Therefore, an MS with the lowest $SINR_{user}$, i.e. an MS influenced by inter-sector interference most significantly takes the highest priority in allocation of resources of the center frequency band, among MSs for which DCA should be performed. Assuming that MS 5 and MS 8 have the lowest $SINR_{user}$ in FIG. 27, resources of the center frequency band are re-allocated to them with priority, as illustrated in FIG. 30. That is, FIG. 30 illustrates an operation for re-allocating resources of the center frequency band to MS 5 and MS 8 with the lowest $SINR_{user}$ with priority among the MSs with $P_{sector\ boundary}$ less than $\eta_{threshold}$. Since the center frequency band is immune from intra-cell interference, $SINR_{user}$ of MS 5 and MS 8 is improved.

Figure 31:
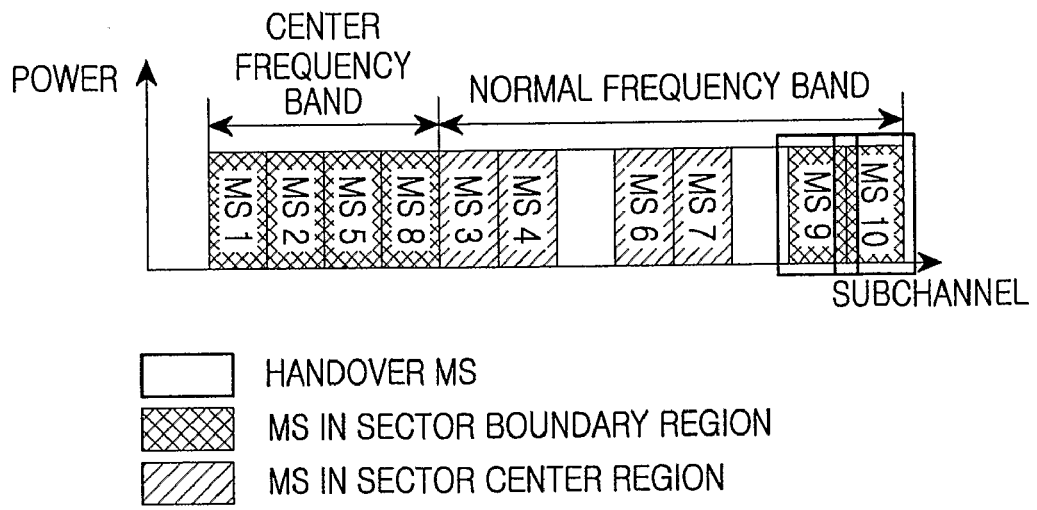
FIG. 31 illustrates an operation for classifying MS 9 and MS 10 except MS 5 and MS 8 with the lowest $SINR_{user}$ as handover MS candidates among the MSs with $P_{sector\ boundary}$ less than $\eta_{threshold}$ illustrated in FIG. 27.

MS 9 and MS 10 beyond the capacity of the center frequency band are allowed to keep using resources of the normal frequency band. When their $SINR_{user}$ becomes equal to or less than a handover threshold, MS 9 and MS 10 are classified as handover MS candidates, as illustrated in FIG. 31. FIG. 31 illustrates an operation for classifying MS 9 and MS 10 other than MS 5 and MS 8 with the lowest $SINR_{user}$ among the MSs with $P_{sector\ boundary}$ less than $\eta_{threshold}$ illustrated in FIG. 27 as handover MS candidates, when their $SINR_{user}$ becomes equal to or less than a handover threshold.

Meanwhile, when MSs are non-uniformly distributed in a sector, all MSs in the sector boundary region can be set as DCA MSs, for resource re-allocation to them. In this case, the resource re-allocation can be considered in two ways.

Figure 32:
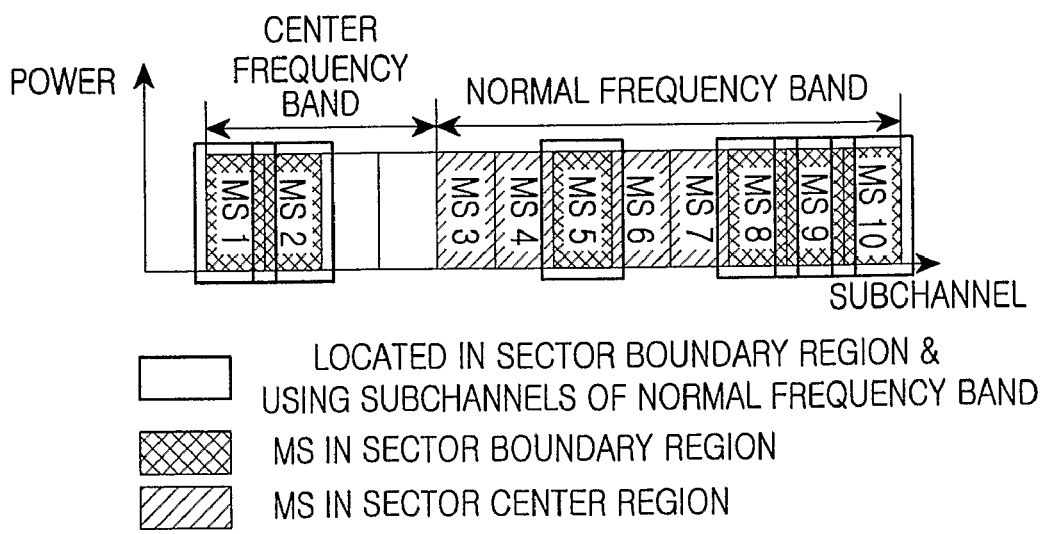
FIG. 32 illustrates an operation for detecting all MSs with $P_{sector\ boundary}$ less than $\eta_{threshold}$.
Figure 33:
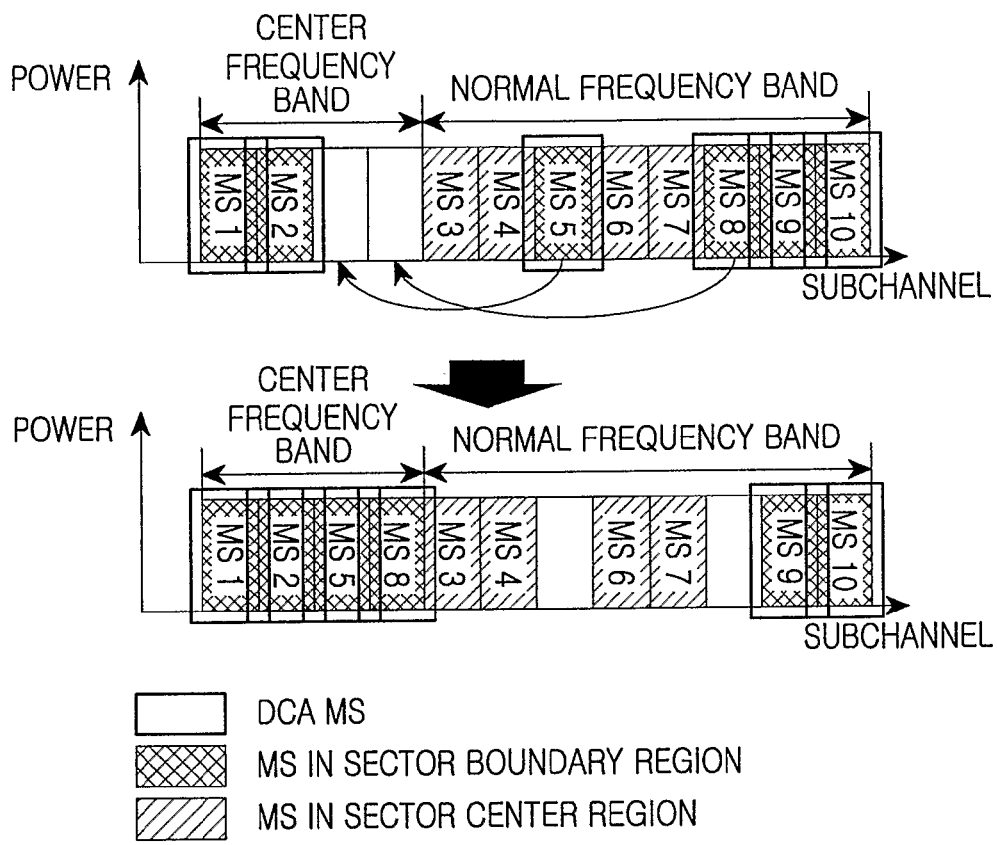
FIG. 33 illustrates an operation for re-allocating resources of a center frequency band to MS 1, MS 2, MS 5 and MS 8 with the lowest $P_{sector\ boundary}$ with priority among the MSs with $P_{sector\ boundary}$ less than $\eta_{threshold}$ illustrated in FIG. 32.

One is to prioritize the DCA MSs according to $P_{sector\ boundary}$. All MSs with $P_{sector\ boundary}$ less than $\eta_{threshold}$ are detected, as illustrated in FIG. 32. That is, FIG. 32 illustrates an operation for detecting all MSs with $P_{sector\ boundary}$ less than $\eta_{threshold}$. Due to the non-uniform distribution of MSs located in the sector boundary region, it may occur that more MSs that can be accommodated in the center frequency band exist. Therefore, an MS with the lowest $P_{sector\ boundary}$, i.e. an MS influenced by inter-sector interference most significantly takes the highest priority in re-allocation of resources of the center frequency band, among the DCA MSs. Assuming that MS1, MS 2, MS 5 and MS 8 have the lowest $P_{sector\ boundary}$ in FIG. 32, resources of the center frequency band are re-allocated to them with priority, as illustrated in FIG. 33. That is, FIG. 33 illustrates an operation for re-allocating resources of the center frequency band to MS 1, MS 2, MS 5 and MS 8 with the lowest $P_{sector\ boundary}$ with priority.

Figure 34:
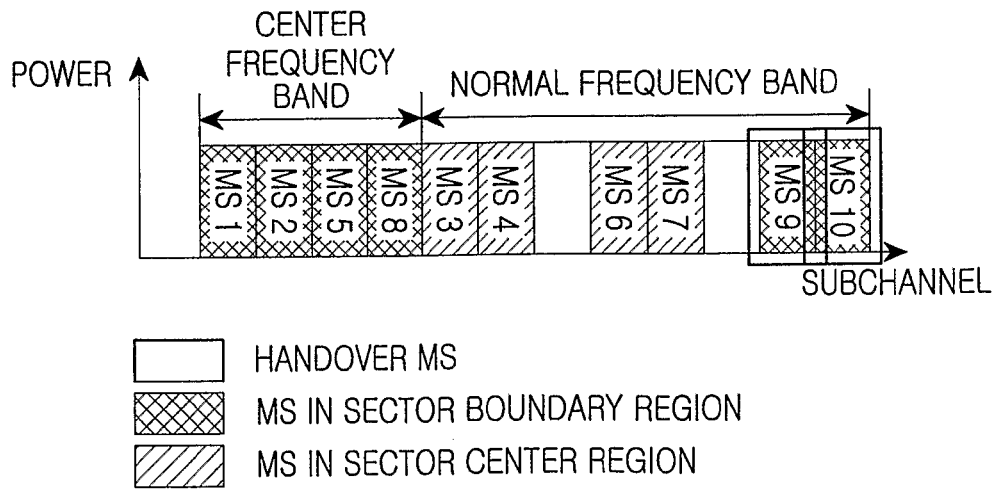
FIG. 34 illustrates an operation for classifying MS 9 and MS 10 except MS 1, MS 2, MS 5 and MS 8 with the lowest $P_{sector\ boundary}$ as handover MS candidates among the MSs with $P_{sector\ boundary}$ less than $\eta_{threshold}$ illustrated in FIG. 32.

MS 9 and MS 10 beyond the capacity of the center frequency band are allowed to keep using resources of the normal frequency band. When their $SINR_{user}$ becomes equal to or less than a handover threshold, MS 9 and MS 10 are classified as handover MS candidates, as illustrated in FIG. 34. FIG. 34 illustrates an operation for classifying MS 9 and MS 10 other than MS 1, MS 2, MS 5 and MS 8 with the lowest $P_{sector\ boundary}$ among the MSs with $P_{sector\ boundary}$ less than $\eta_{threshold}$ illustrated in FIG. 32 as handover MS candidates, when their $SINR_{user}$ becomes equal to or less than a handover threshold.

Figure 35:
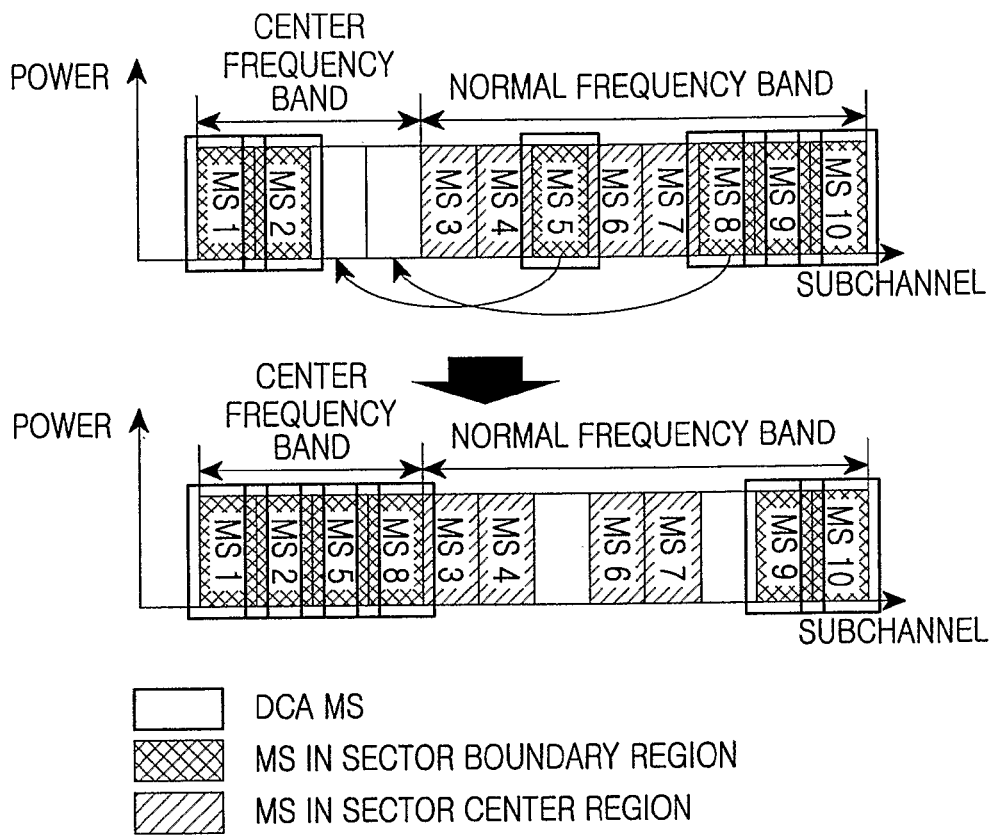
FIG. 35 illustrates an operation for re-allocating resources of the center frequency band to MS 1, MS 2, MS 5 and MS 8 with the lowest $SINR_{user}$ with priority among the MSs with $P_{sector\ boundary}$ less than $\eta_{threshold}$ illustrated in FIG. 32.

The other way is to prioritize the DCA MSs according to $SINR_{user}$. Due to the non-uniform distribution of the MSs, it may occur that more MSs that can be accommodated in the center frequency band exist. Therefore, an MS with the lowest $SINR_{user}$, i.e. an MS influenced by inter-sector interference most significantly takes the highest priority in re-allocation of resources of the center frequency band, among the DCA MSs. Assuming that MS 1, MS 2, MS 5 and MS 8 have the lowest $SINR_{user}$ in FIG. 32, resources of the center frequency band are re-allocated to them first of all, as illustrated in FIG. 35. That is, FIG. 35 illustrates an operation for re-allocating resources of the center frequency band to MS 1, MS 2, MS 5, and MS 8 with the lowest $SINR_{user}$ with priority. Since the center frequency band is immune from intra-cell interference, $SINR_{user}$ of MS 5 and MS 8 is improved.

Figure 36:
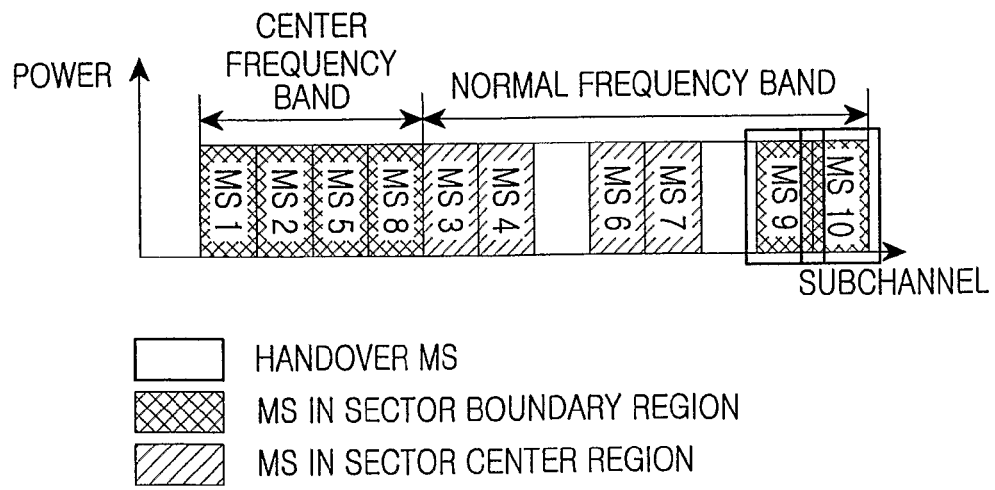
FIG. 36 illustrates an operation for classifying MS 9 and MS 10 except MS 1, MS 2, MS 5 and MS 8 with the lowest $SINR_{user}$ as handover MS candidates among the MSs with $P_{sector\ boundary}$ less than $\eta_{threshold}$ illustrated in FIG. 32.

MS 9 and MS 10 beyond the capacity of the center frequency band are allowed to keep using resources of the normal frequency band. When their $SINR_{user}$ becomes equal to or less than a handover threshold, MS 9 and MS 10 are classified as handover MS candidates, as illustrated in FIG. 36. FIG. 36 illustrates an operation for classifying MS 9 and MS 10 other than MS 1, MS 2, MS 5 and MS 8 with the lowest $SINR_{user}$ among the MSs with $P_{sector\ boundary}$ less than $\eta_{threshold}$ illustrated in FIG. 32 as handover MS candidates, when their $SINR_{user}$ becomes equal to or less than a handover threshold.

A description will be made of a method for allocating resources so that an MS switches from a center frequency band to a normal frequency band according to the DCA scheme according to an exemplary embodiment of the present invention.

Firstly, when MSs are uniformly distributed in a sector, i.e. under an environment where the locations of MSs are not concentrated but equidistantly spaced in a sector, resources are reallocated to MSs so that the MSs switch from a center frequency band to a normal frequency band.

Figure 37:
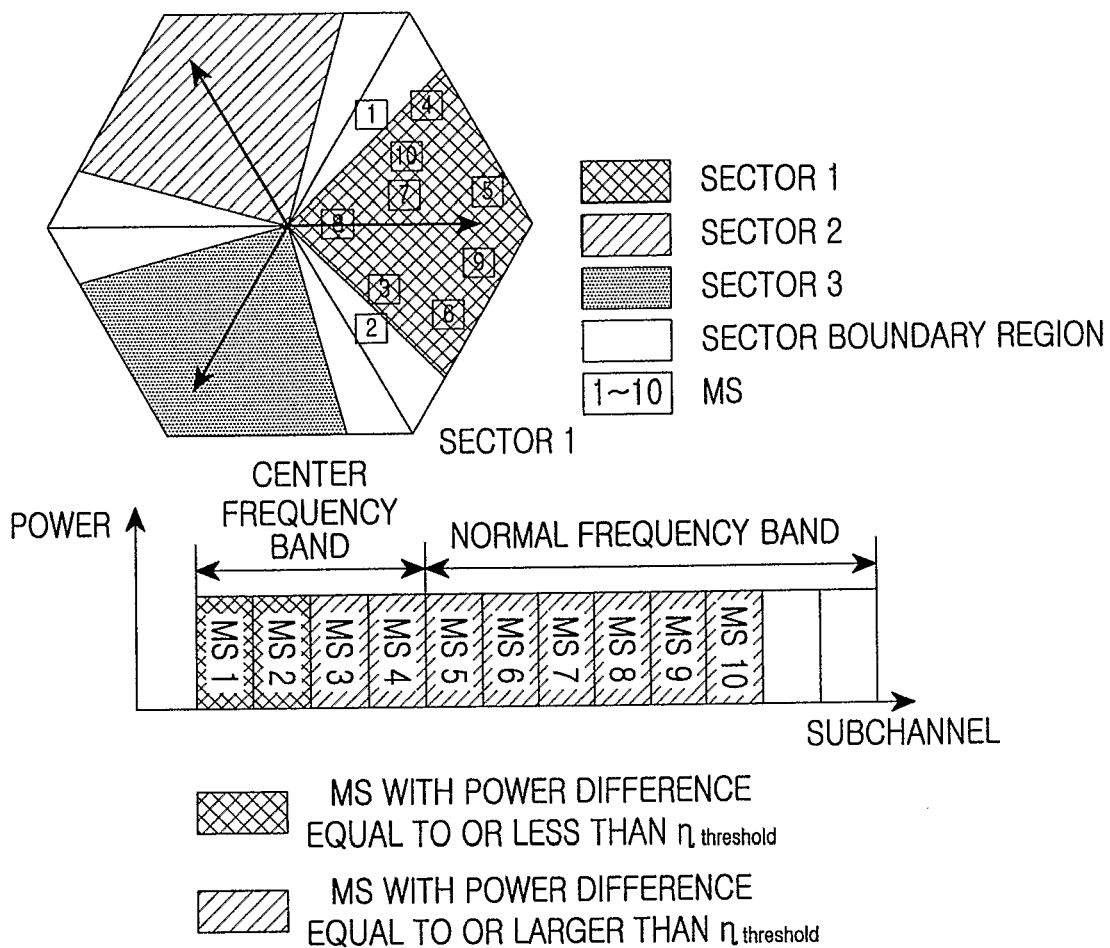
FIG. 37 illustrates an operation for detecting MSs with $P_{sector\ boundary}$ equal to or larger than $\eta_{threshold}$ among MSs using a center frequency band, when MSs are uniformly distributed within a sector according to an exemplary embodiment of the present invention.

With reference to FIG. 37, an operation for detecting MSs with $P_{sector\ boundary}$ equal to or larger than $\eta_{threshold}$ among MSs using a center frequency band when MSs are uniformly distributed in a sector according to an exemplary embodiment of the present invention will be described below.

FIG. 37 illustrates an operation for detecting MSs with $P_{sector\ boundary}$ equal to or larger than $\eta_{threshold}$ among MSs using a center frequency band when MSs are uniformly distributed in a sector according to an exemplary embodiment of the present invention.

Referring to FIG. 37, MSs with $P_{sector\ boundary}$ equal to or larger than $\eta_{threshold}$ are detected among MSs using the center frequency band. Specifically, the power difference between a signal received at an MS from a serving sector and the strongest of signals received at the MS from neighbor sectors is calculated and if the power difference is equal to or larger than $\eta_{threshold}$, the MS is considered to be located in a sector center region.

Figure 38:
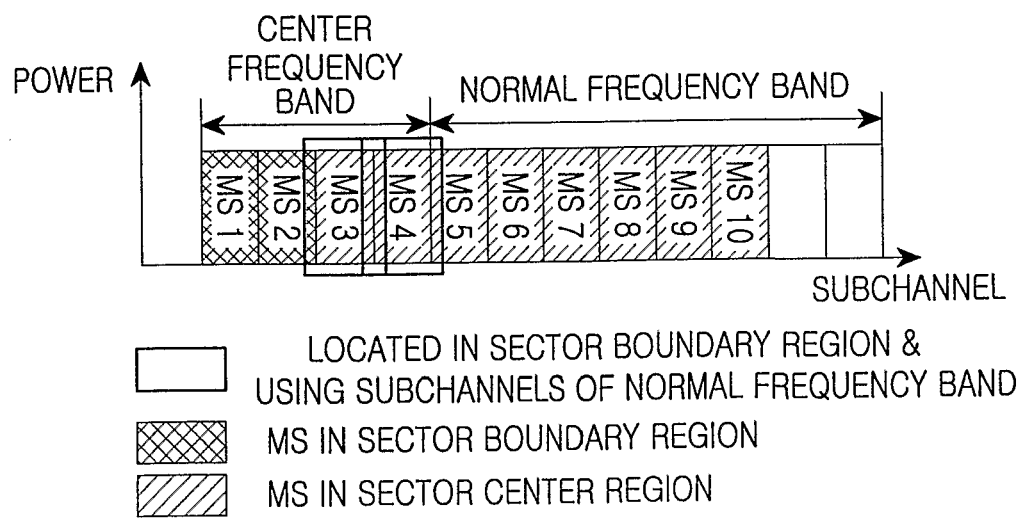
FIG. 38 illustrates an operation for detecting MSs to which resources of the center frequency band have been allocated among the MSs with $P_{sector\ boundary}$ equal to or larger than $\eta_{threshold}$ illustrated in FIG. 37.

With reference to FIG. 38, an operation for detecting MSs with resources of the center frequency band among the MSs with $P_{sector\ boundary}$ equal to or larger than $\eta_{threshold}$ illustrated in FIG. 37 will be described below.

FIG. 38 illustrates an operation for detecting MSs with resources of the center frequency band among the MSs with $P_{sector\ boundary}$ equal to or larger than $\eta_{threshold}$ illustrated in FIG. 37.

Referring to FIG. 37, MSs with resources of the center frequency band are MS 3 and MS 4 among the MSs with $P_{sector\ boundary}$ equal to or larger than $\eta_{threshold}$.

An operation for re-allocating resources of the normal frequency band to the MSs using resources of the center frequency band in the sector center region illustrated in FIG. 38 will be described with reference to FIG. 39.

Figure 39:
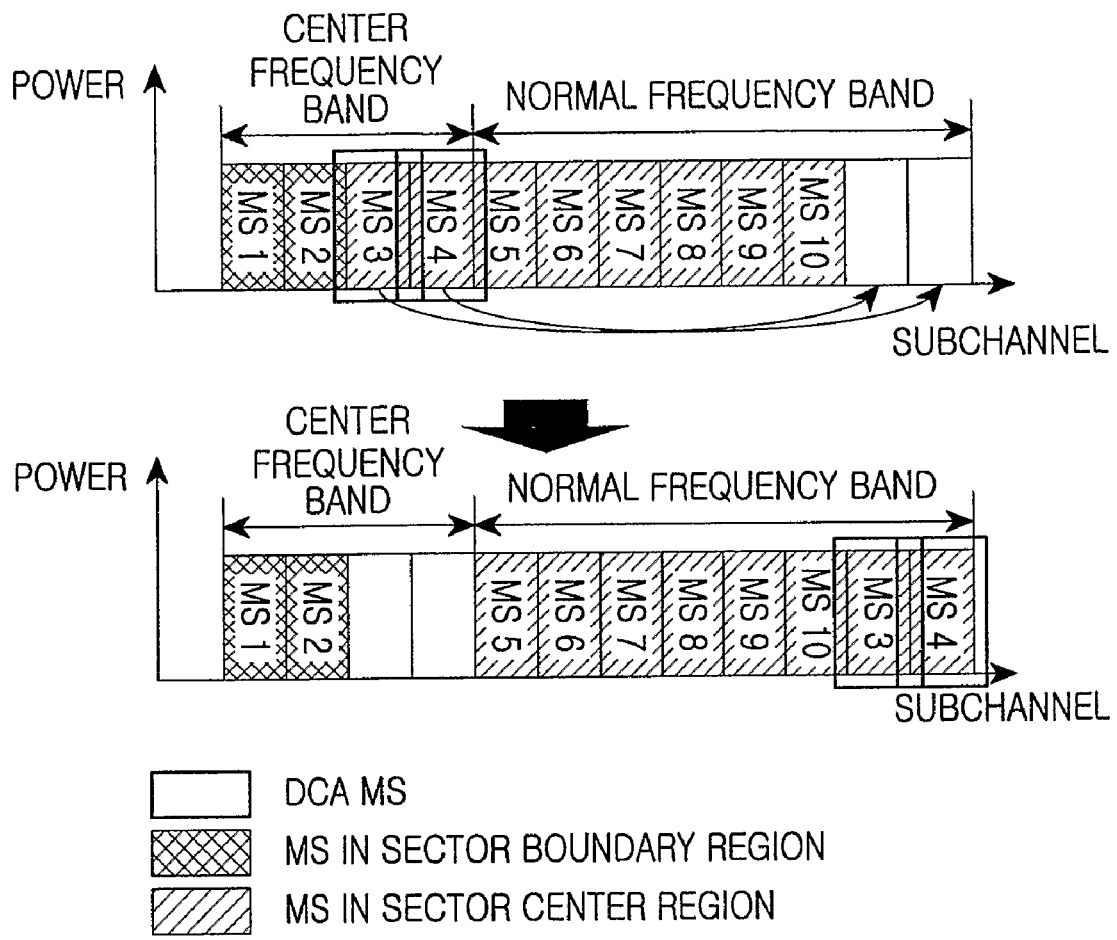
FIG. 39 illustrates an operation for re-allocating resources of a normal frequency band to the MSs illustrated in FIG. 38 to which the resources of the center frequency band have been allocated but are located in a sector center region.

FIG. 39 illustrates an operation for re-allocating resources of the normal frequency band to the MSs using resources of the center frequency band in the sector center region illustrated in FIG. 38.

Referring to FIG. 39, MS 3 and MS 4 were allocated resources of the center frequency band. As they are now located in the sector center region, resources of the normal frequency band are re-allocated to them.

Secondly, when MSs are non-uniformly distributed in a sector, resources are reallocated to MSs so that the MSs switch from a center frequency band to a normal frequency band.

Figure 40:
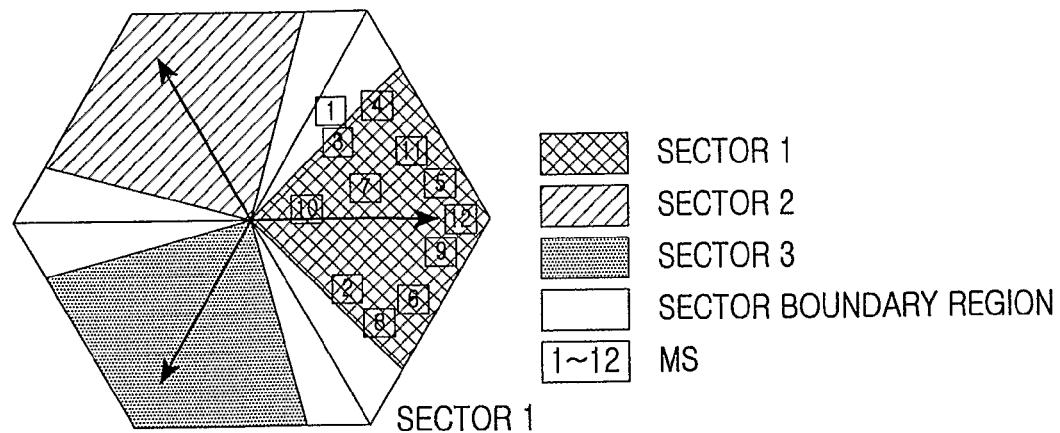
FIG. 40 illustrates an operation for detecting MSs with $P_{sector\ boundary}$ equal to or larger than $\eta_{threshold}$ among MSs using a center frequency band, when MSs are non-uniformly distributed within a sector according to an exemplary embodiment of the present invention.
Figure 40:
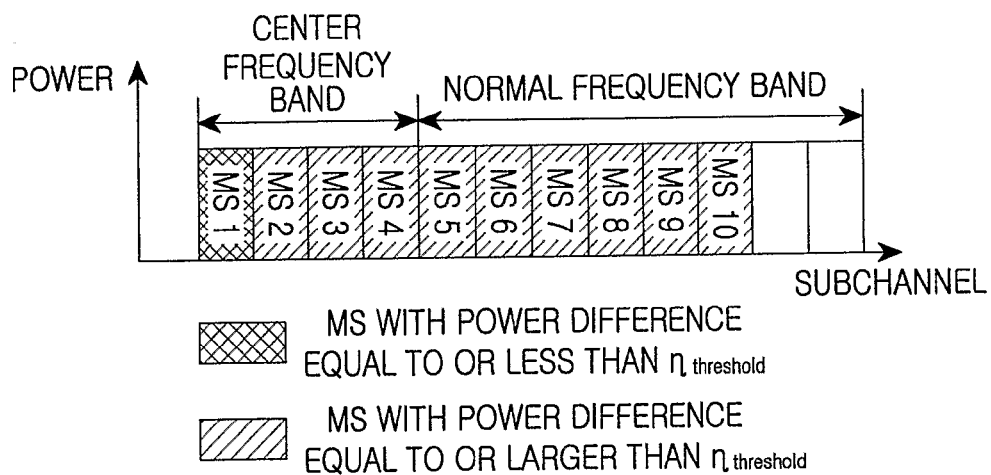

FIG. 40 illustrates an operation for detecting MSs with $P_{sector\ boundary}$ equal to or larger than $\eta_{threshold}$ among MSs using a center frequency band when MSs are non-uniformly distributed in a sector according to an exemplary embodiment of the present invention.

Referring to FIG. 40, MSs with $P_{sector\ boundary}$ equal to or larger than $\eta_{threshold}$ are detected among MSs using a center frequency band. Specifically, the power difference between a signal received at an MS from a serving sector and the strongest of signals received at the MS from neighbor sectors is calculated and if the power difference is equal to or larger than $\eta_{threshold}$, the MS is considered to be located in the sector center region.

Figure 41:
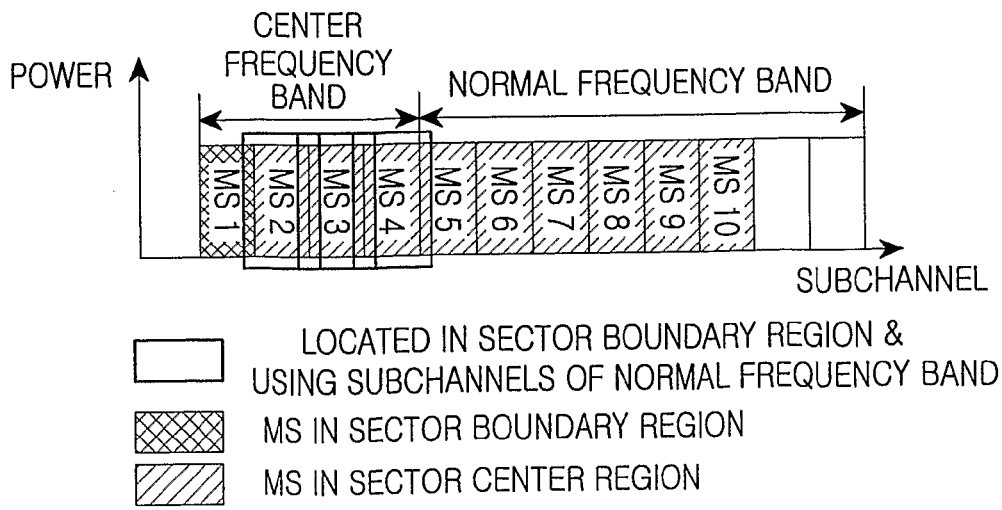
FIG. 41 illustrates an operation for detecting MSs to which resources of the center frequency band have been allocated among the MSs with $P_{sector\ boundary}$ equal to or larger than $\eta_{threshold}$ illustrated in FIG. 40.

With reference to FIG. 41, an operation for detecting MSs with resources of the normal frequency band among the MSs with $P_{sector\ boundary}$ equal to or larger than $\eta_{threshold}$ illustrated in FIG. 40 will be described below.

FIG. 41 illustrates an operation for detecting MSs with resources of the center frequency band among the MSs with $P_{sector\ boundary}$ equal to or larger than $\eta_{threshold}$ illustrated in FIG. 40.

Referring to FIG. 41, MSs with resources of the center frequency band are MS 2, MS 3 and MS 4 among the MSs with $P_{sector\ boundary}$ equal to or larger than $\eta_{threshold}$.

An operation for re-allocating resources of the normal frequency band to the MSs using resources of the center frequency band in the sector center region illustrated in FIG. 41 will be described with reference to FIGS. 42 and 43.

When MSs are non-uniformly distributed in a sector, resource reallocation to MSs to which resources of the center frequency band were allocated and which are now located in the sector center region can be considered in two ways.

One is to prioritize the MSs for DCA, according to $P_{sector\ boundary}$. Due to the non-uniform distribution of the MSs, it may occur that more MSs that can be accommodated in the normal frequency band exist. Therefore, an MS with the highest $P_{sector\ boundary}$ takes the highest priority in re-allocation of resources of the normal frequency band, among the DCA MSs, because the normal frequency band has small intra-cell interference but large inter-cell interference.

Figure 42:
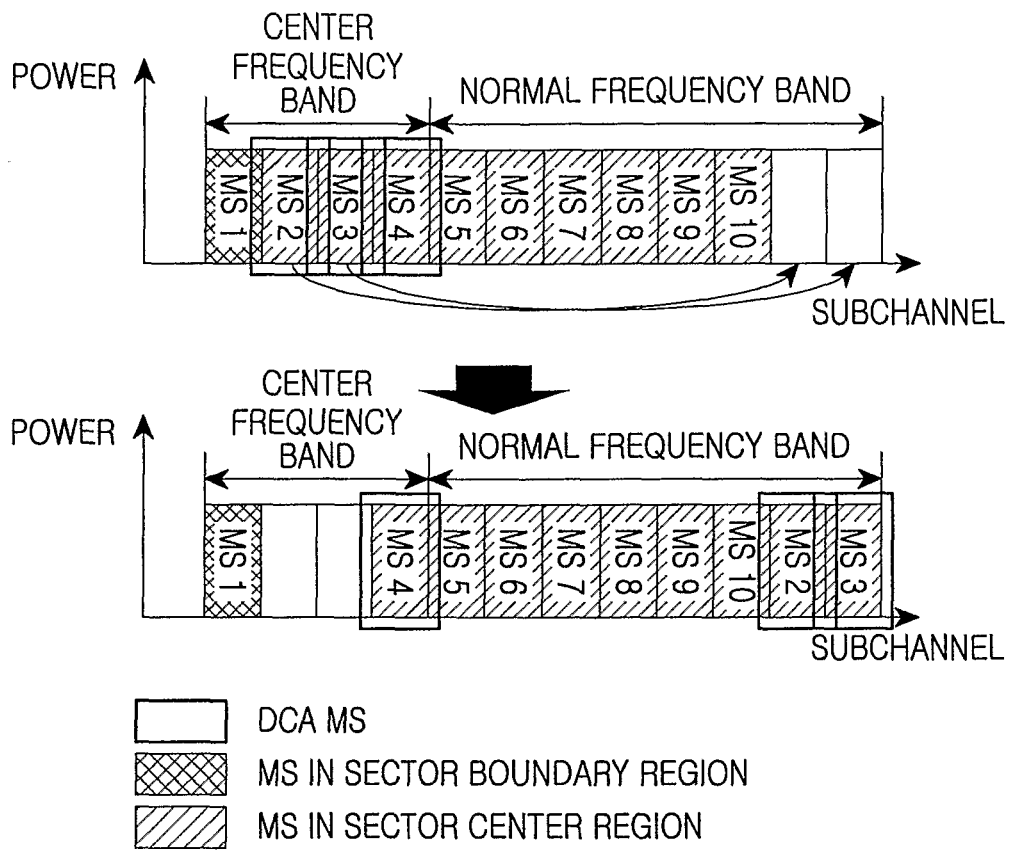
FIG. 42 illustrates an operation for re-allocating resources of a normal frequency band to MS 2 and MS 3 with higher $P_{sector\ boundary}$ with priority among the MSs with $P_{sector\ boundary}$ equal to or larger than $\eta_{threshold}$ illustrated in FIG. 41.
Figure 43:
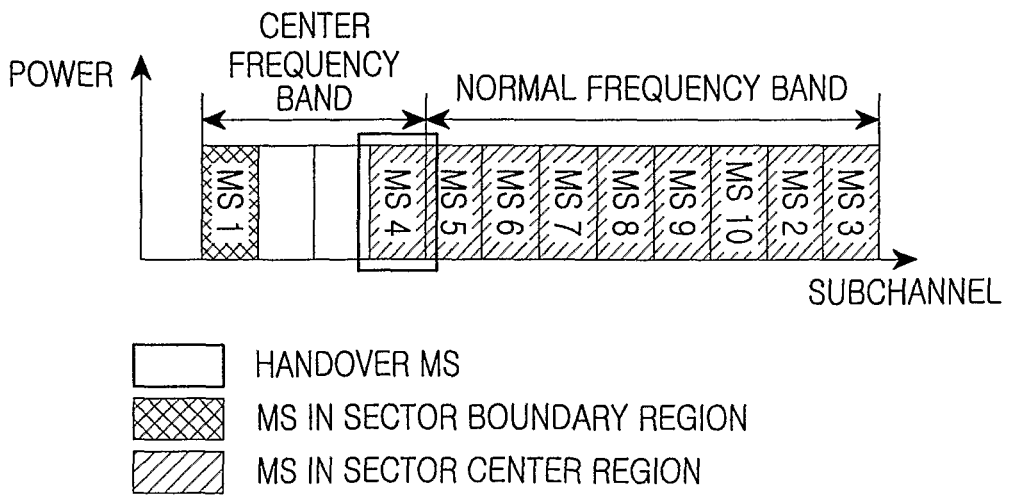
FIG. 43 illustrates an operation for classifying MS 4 except MS 2 and MS 3 with higher $P_{sector\ boundary}$ as a handover MS candidate among the MSs with $P_{sector\ boundary}$ equal to or larger than $\eta_{threshold}$ illustrated in FIG. 41.

Assuming that $P_{sector\ boundary}$ of MS 2 and MS 3 exceed that of MS 4 in FIG. 42, resources of the normal frequency band are re-allocated to MS 2 and MS 3 first of all, as illustrated in FIG. 42. That is, FIG. 42 illustrates an operation for re-allocating resources of the normal frequency band to MS 2 and MS 3 with higher $P_{sector\ boundary}$ with priority.

MS 4 beyond the capacity of the normal frequency band is allowed to keep using resources of the center frequency band. When its $SINR_{user}$ becomes equal to or less than a handover threshold, MS 4 is classified as a handover MS candidate, as illustrated in FIG. 43. FIG. 43 illustrates an operation for classifying MS 4 other than MS 2 and MS 3 with higher $P_{sector\ boundary}$ among the MSs with $P_{sector\ boundary}$ equal to or larger than $\eta_{threshold}$ illustrated in FIG. 41 as a handover MS candidate, when its $SINR_{user}$ becomes equal to or less than a handover threshold.

Figure 44:
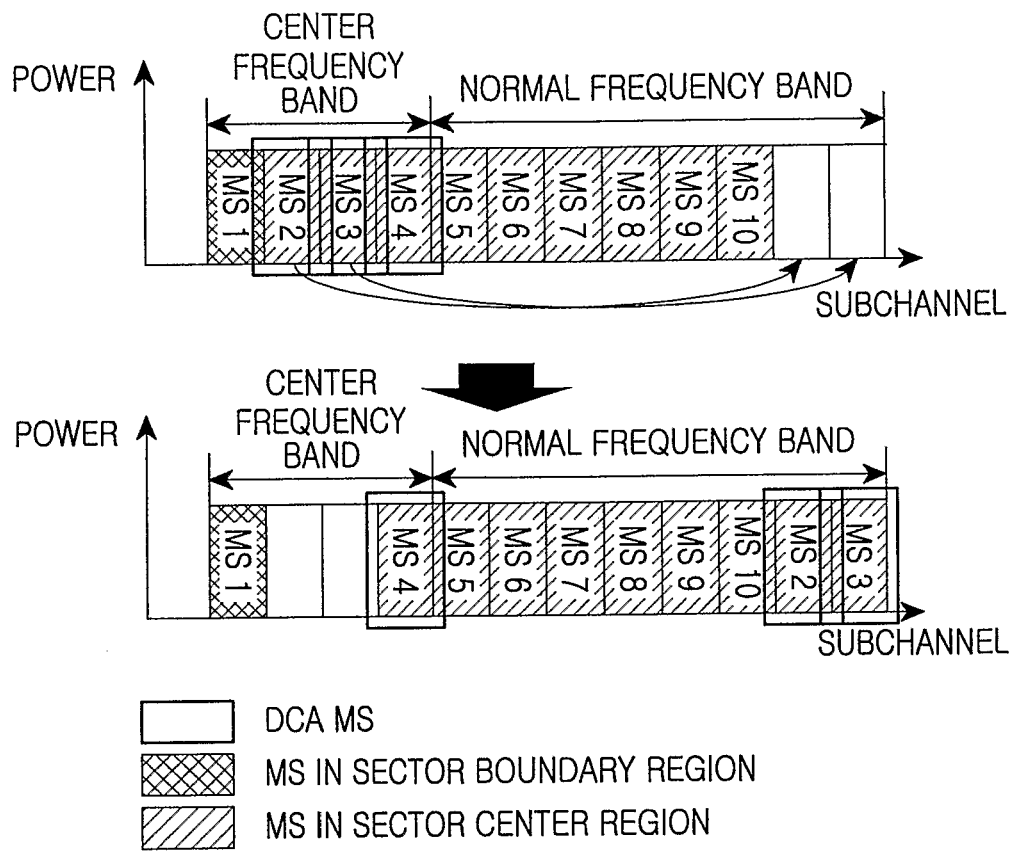
FIG. 44 illustrates an operation for re-allocating resources of the normal frequency band to MS 2 and MS 3 with higher $SINR_{user}$ with priority among the MSs with $P_{sector\ boundary}$ equal to or larger than $\eta_{threshold}$ illustrated in FIG. 41.

The other way is to prioritize the MSs for DCA, according to $SINR_{user}$. Due to the non-uniform distribution of the MSs, it may occur that more MSs that can be accommodated in the normal frequency band exist. Therefore, an MS with the highest $SINR_{user}$ takes the highest priority in re-allocation of resources of the normal frequency band, among the DCA MSs, because the normal frequency band has small intra-cell interference but large inter-cell interference. Assuming that $SINR_{user}$ of MS 2 and MS 3 exceed that of MS 4 in FIG. 41, resources of the normal frequency band are re-allocated to MS 2 and MS 3, first of all, as illustrated in FIG. 44. That is, FIG. 44 illustrates an operation for re-allocating resources of the normal frequency band to MS 2 and MS 3 with higher $SINR_{user}$ with priority.

Figure 45:
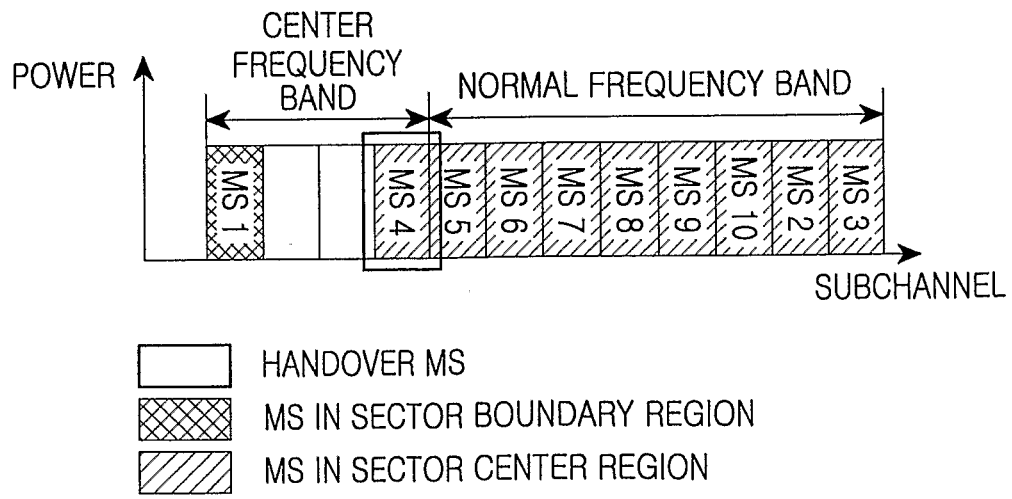
FIG. 45 illustrates an operation for classifying MS 4 except MS 2 and MS 3 with higher $SINR_{user}$ as a handover MS candidate among the MSs with $P_{sector\ boundary}$ equal to or larger than $\eta_{threshold}$ illustrated in FIG. 41.

MS 4 beyond the capacity of the normal frequency band is allowed to keep using resources of the center frequency band. When its $SINR_{user}$ becomes equal to or less than a handover threshold, MS 4 is classified as a handover MS candidate, as illustrated in FIG. 45. FIG. 45 illustrates an operation for classifying MS 4 other than MS 2 and MS 3 with higher $SINR_{user}$ among the MSs with $P_{sector\ boundary}$ equal to or larger than $\eta_{threshold}$ illustrated in FIG. 41 as a handover MS candidate, when its $SINR_{user}$ becomes equal to or less than a handover threshold.

Meanwhile, when MSs are non-uniformly distributed in a sector, all MSs in a sector boundary region can be set as DCA MSs, for resource re-allocation to them. In this case, the resource re-allocation can be considered in two ways.

Figure 46:
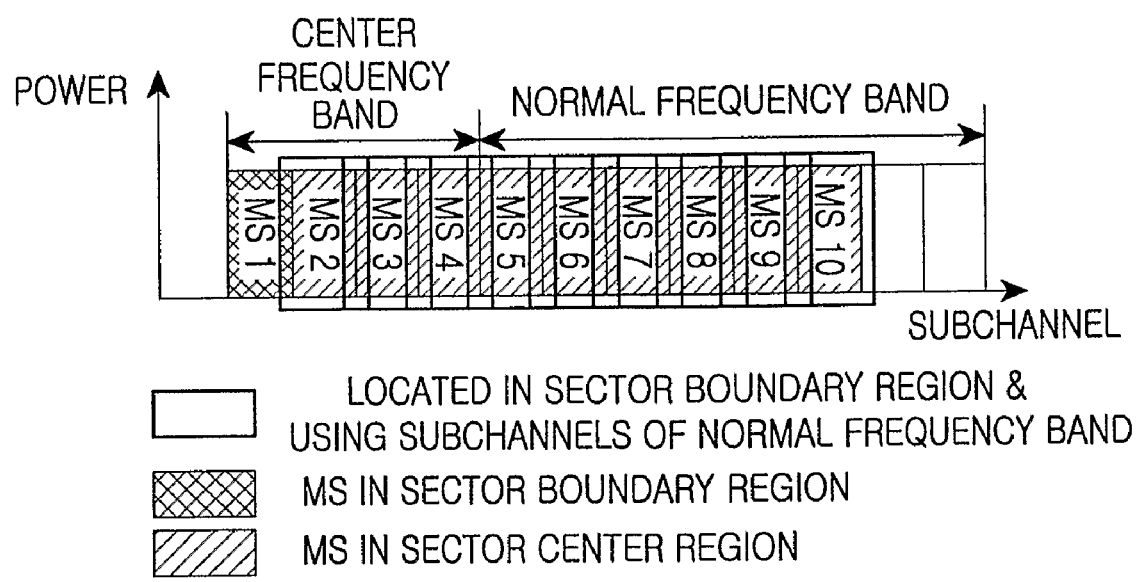
FIG. 46 illustrates an operation for detecting all MSs with $P_{sector\ boundary}$ equal to or larger than $\eta_{threshold}$.
Figure 47:
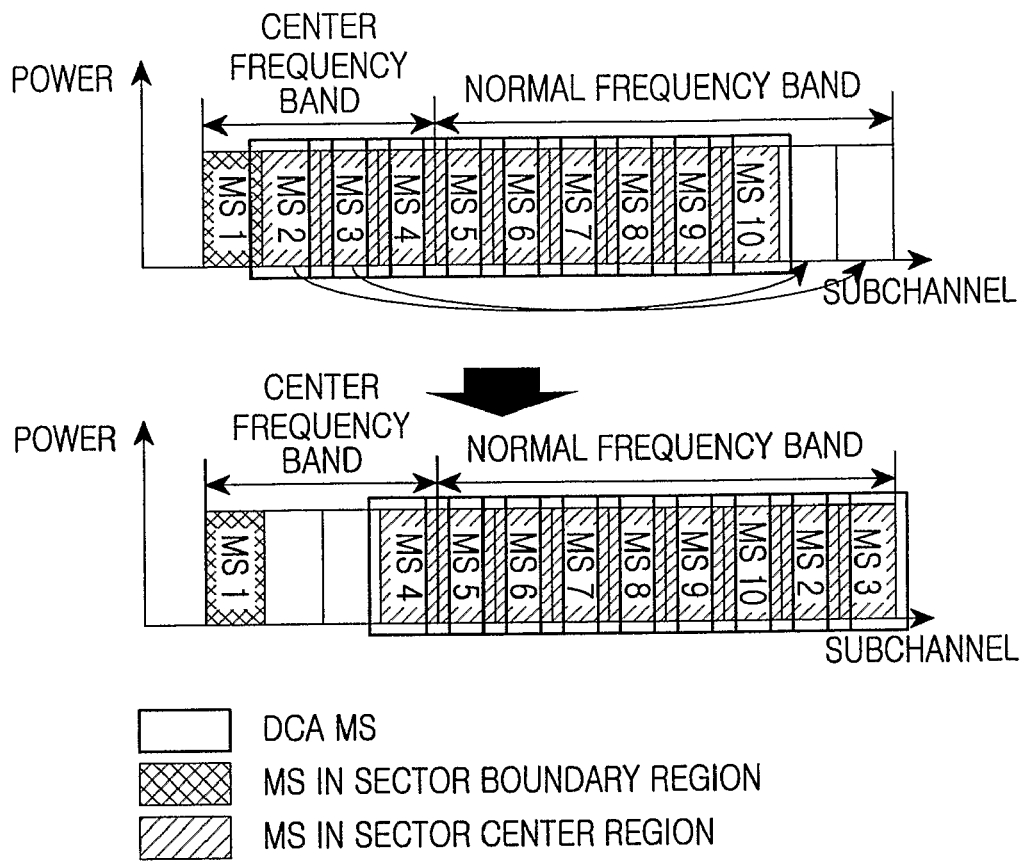
FIG. 47 illustrates an operation for re-allocating resources of a normal frequency band to MS 2, MS 3, MS 5, MS 6, MS 7, MS 8, MS 9 and MS 10 with higher $P_{sector\ boundary}$ with priority among the MSs with $P_{sector\ boundary}$ equal to or larger than $\eta_{threshold}$ illustrated in FIG. 46.

One is to prioritize the DCA MSs according to $P_{sector\ boundary}$. All MSs With $P_{sector\ boundary}$ equal to or larger than $\eta_{threshold}$ are detected, as illustrated in FIG. 46. That is, FIG. 46 illustrates an operation for detecting all MSs with $P_{sector\ boundary}$ equal to or larger than $\eta_{threshold}$. Due to the non-uniform distribution of MSs located in the sector center region, it may occur that more MSs that can be accommodated in the normal frequency band exist. Therefore, an MS with the highest $P_{sector\ boundary}$ takes the highest priority in re-allocation of resources of the normal frequency band, among the DCA MSs. Assuming that $P_{sector\ boundary}$ of MS 2, MS 3, MS 5, MS 6, MS 7, MS 8, MS 9 and MS 10 exceed that of MS 4 in FIG. 46, resources of the normal frequency band are re-allocated to MS 2, MS 3, MS 5, MS 6, MS 7, MS 8, MS 9 and MS 10, first of all, as illustrated in FIG. 47. That is, FIG. 47 illustrates an operation for re-allocating resources of the center frequency band to MS 2, MS 3, MS 5, MS 6, MS 7, MS 8, MS 9 and MS 10 with higher $P_{sector\ boundary}$ with priority.

Figure 48:
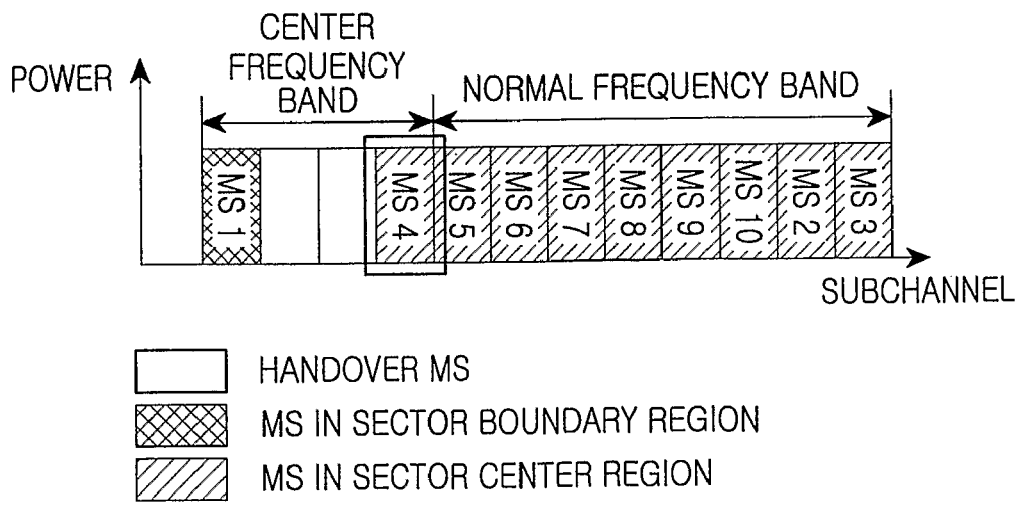
FIG. 48 illustrates an operation for classifying MS 4 except MS 2, MS 3, MS 5, MS 6, MS 7, MS 8, MS 9 and MS 10 with higher $P_{sector\ boundary}$ as a handover MS candidate among the MSs with $P_{sector\ boundary}$ equal to or larger than $\eta_{threshold}$ illustrated in FIG. 46.

MS 4 beyond the capacity of the normal frequency band is allowed to keep using resources of the center frequency band. When its $SINR_{user}$ becomes equal to or less than a handover threshold, MS 4 is classified as a handover MS candidate, as illustrated in FIG. 48. FIG. 48 illustrates an operation for classifying MS 4 other than MS 2, MS 3, MS 5, MS 6, MS 7, MS 8, MS 9 and MS 10 with higher $P_{sector\ boundary}$ among the MSs with $P_{sector\ boundary}$ equal to or larger than $\eta_{threshold}$ illustrated in FIG. 46 as a handover MS candidate, when its $SINR_{user}$ becomes equal to or less than a handover threshold.

Figure 49:
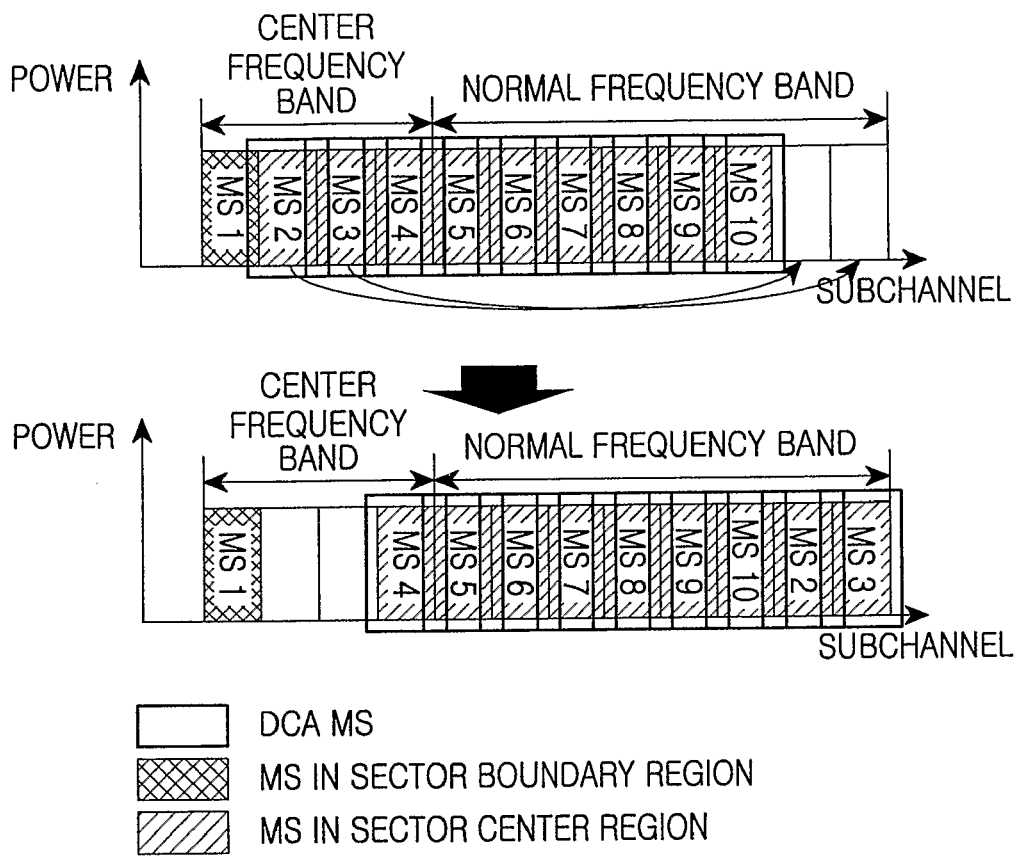
FIG. 49 illustrates an operation for re-allocating resources of the normal frequency band to MS 2, MS 3, MS 5, MS 6, MS 7, MS 8, MS 9 and MS 10 with higher $SINR_{user}$ with priority among the MSs with $P_{sector\ boundary}$ equal to or larger than $\eta_{threshold}$ illustrated in FIG. 46.

The other way is to prioritize the DCA MSs according to $SINR_{user}$. Due to the non-uniform distribution of the MSs, it may occur that more MSs that can be accommodated in the normal frequency band exist. Therefore, an MS with the highest $SINR_{user}$ takes the highest priority in re-allocation of resources of the normal frequency band, among MSs for which DCA should be performed. Assuming that $SINR_{user}$ of MS 2, MS 3, MS 5, MS 6, MS 7, MS 8, MS 9 and MS 10 exceed that of MS 4 in FIG. 46, resources of the normal frequency band are re-allocated to MS 2, MS 3, MS 5, MS 6, MS 7, MS 8, MS 9 and MS 10, first of all, as illustrated in FIG. 49. That is, FIG. 49 illustrates an operation for re-allocating resources of the center frequency band to MS 2, MS 3, MS 5, MS 6, MS 7, MS 8, MS 9 and MS 10 with higher $SINR_{user}$ with priority.

Figure 50:
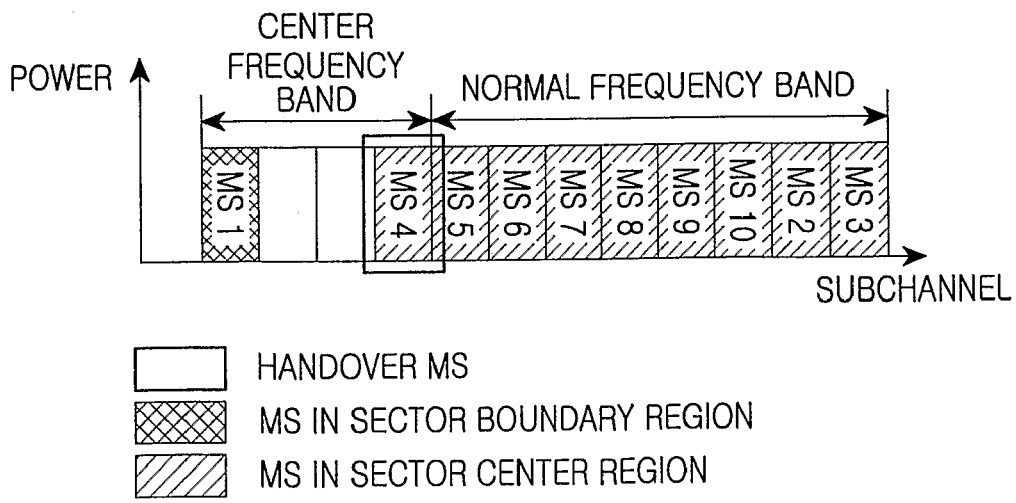
FIG. 50 illustrates an operation for classifying MS 4 except MS 2, MS 3, MS 5, MS 6, MS 7, MS 8, MS 9 and MS 10 with higher $SINR_{user}$ as a handover MS candidate among the MSs with $P_{sector\ boundary}$ equal to or larger than $\eta_{threshold}$ illustrated in FIG. 46.

MS 4 beyond the capacity of the normal frequency band is allowed to keep using resources of the center frequency band. When its $SINR_{user}$ becomes equal to or less than a handover threshold, MS 4 is classified as a handover MS candidate, as illustrated in FIG. 50. FIG. 50 illustrates an operation for classifying MS 4 other than MS 2, MS 3, MS 5, MS 6, MS 7, MS 8, MS 9 and MS 10 with higher $SINR_{user}$ among the MSs with $P_{sector\ boundary}$ equal to or larger than $\eta_{threshold}$ illustrated in FIG. 46 as a handover MS candidate, when its $SINR_{user}$ becomes equal to or less than a handover threshold.

When there are DCA MSs in both the center frequency and the normal frequency band, DCA is performed as follows.

Figure 51:
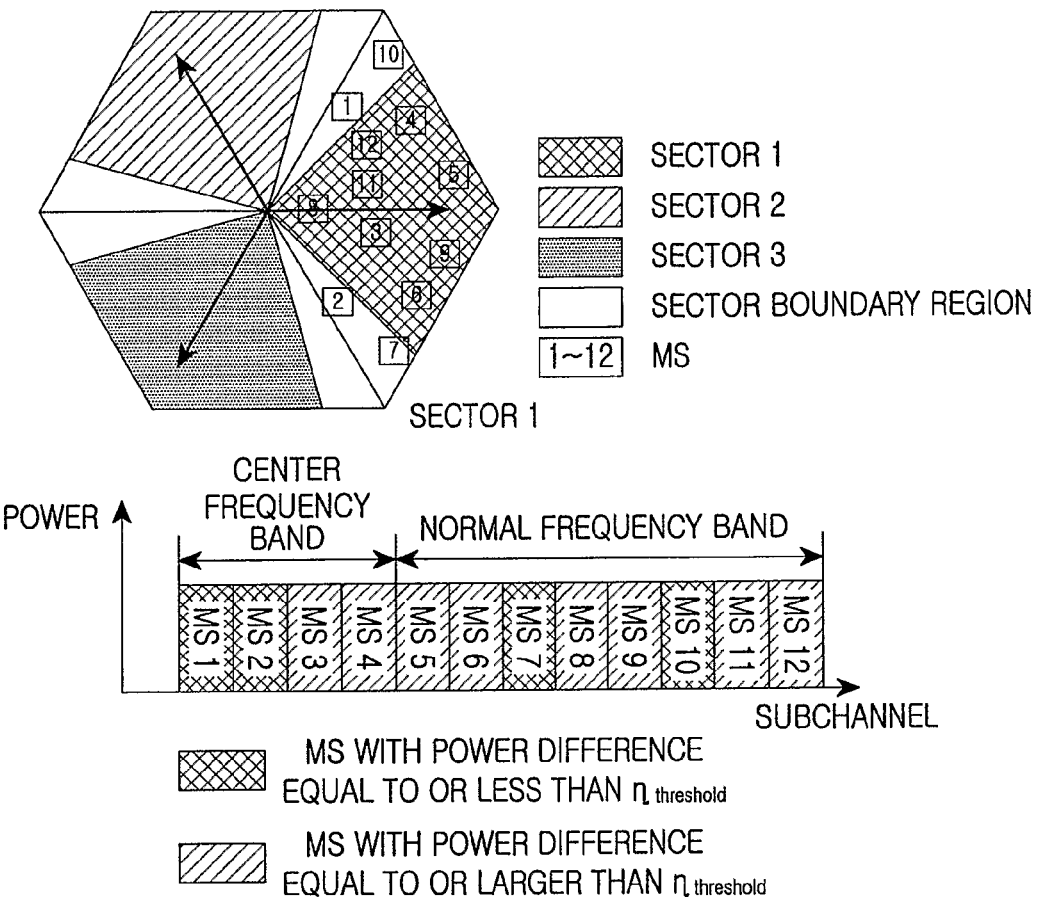
FIG. 51 illustrates an operation for detecting users using a center frequency band and users using a normal frequency band, when the same number of DCA users use the center frequency band and the normal frequency band according to an exemplary embodiment of the present invention.

In the case where the same number of DCA MSs use the center frequency and the normal frequency band, they must be detected, as illustrated in FIG. 51. FIG. 51 illustrates an operation for detecting users using each frequency band when there are the same number of DCA MSs in the center frequency band and the normal frequency band according to an exemplary embodiment of the present invention.

Figure 52:
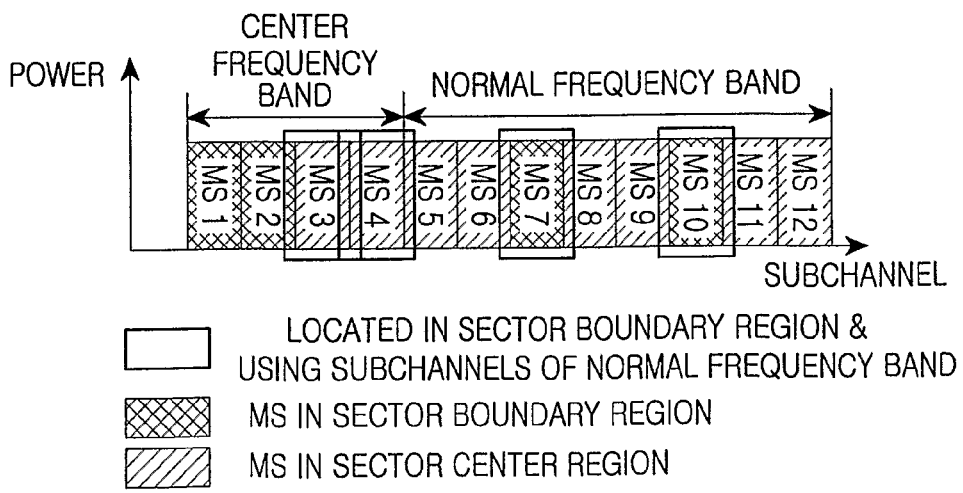
FIG. 52 illustrates an operation for detecting MSs to which resources of the normal frequency band were allocated among MSs with $P_{sector\ boundary}$ less than $\eta_{threshold}$ illustrated in FIG. 51 and detecting MSs to which resources of the center frequency band were allocated among MSs with $P_{sector\ boundary}$ equal to or larger than $\eta_{threshold}$ illustrated in FIG. 51.
Figure 53:
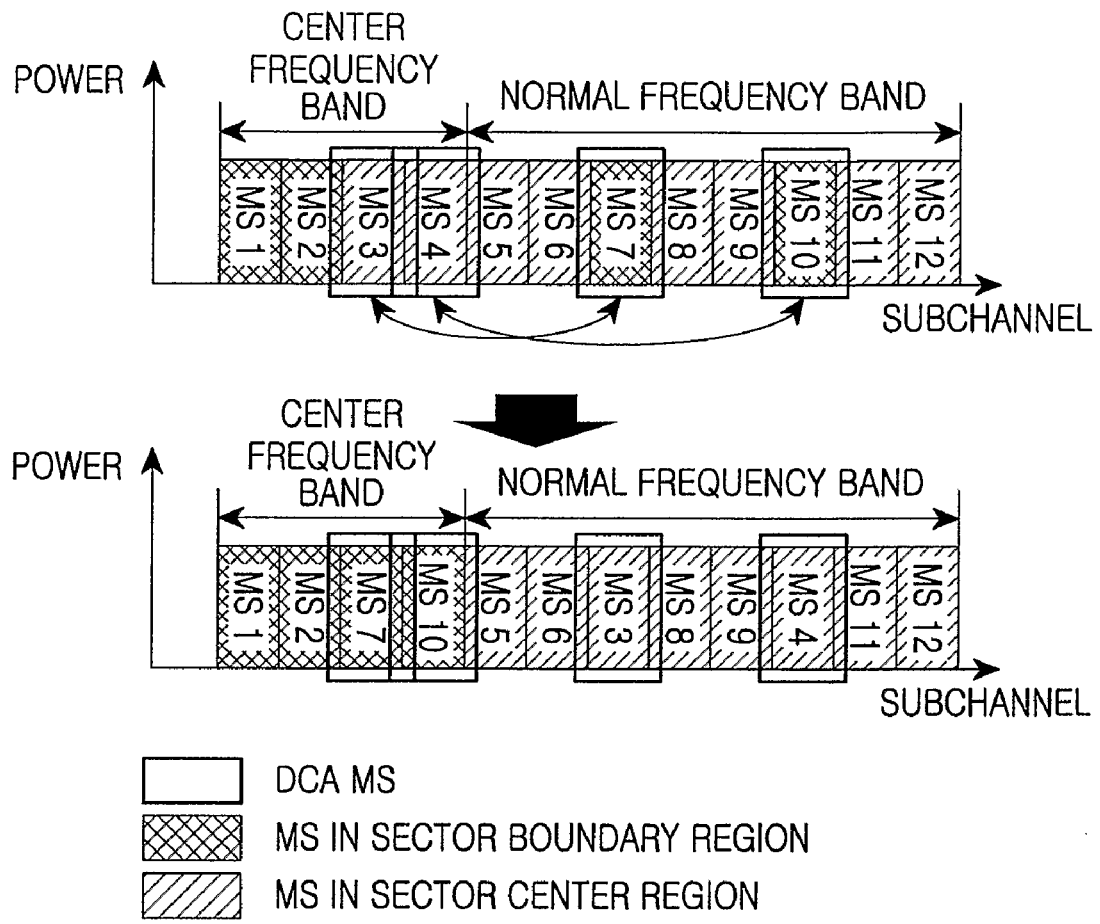
FIG. 53 illustrates an operation for exchanging resources between the MSs illustrated in FIG. 52 to which the resources of the normal frequency band were allocated but are located in a sector boundary region and the MSs illustrated in FIG. 52 to which the resources of the center frequency band were allocated but are located in a sector center region.

MSs with resources of the normal frequency band are detected among MSs with $P_{sector\ boundary}$ less than $\eta_{threshold}$, and MSs with resources of the center frequency band are detected among MSs with $P_{sector\ boundary}$ equal to or larger than $\eta_{threshold}$, as illustrated in FIG. 52. As illustrated in FIG. 53, resources should be exchanged between the MSs with resources of the normal frequency band in the sector boundary region and the MSs with resources of the center frequency band in the sector center region. That is, FIG. 53 illustrates an operation for exchanging resources between the MSs with resources of the normal frequency band in the sector boundary region and the MSs with resources of the center frequency band in the sector center region.

Figure 54:
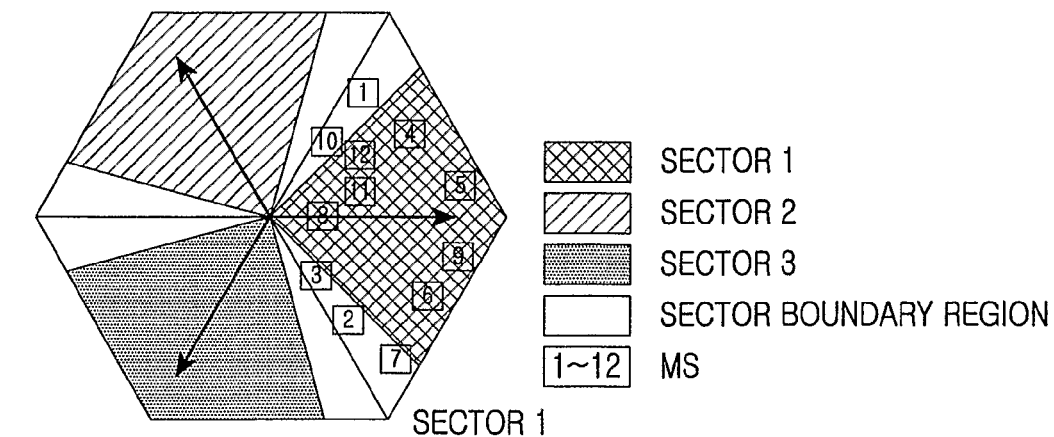
FIG. 54 illustrates an operation for detecting users using a center frequency band and users using a normal frequency band, when different numbers of DCA users use the center frequency band and the normal frequency band according to an exemplary embodiment of the present invention.
Figure 54:
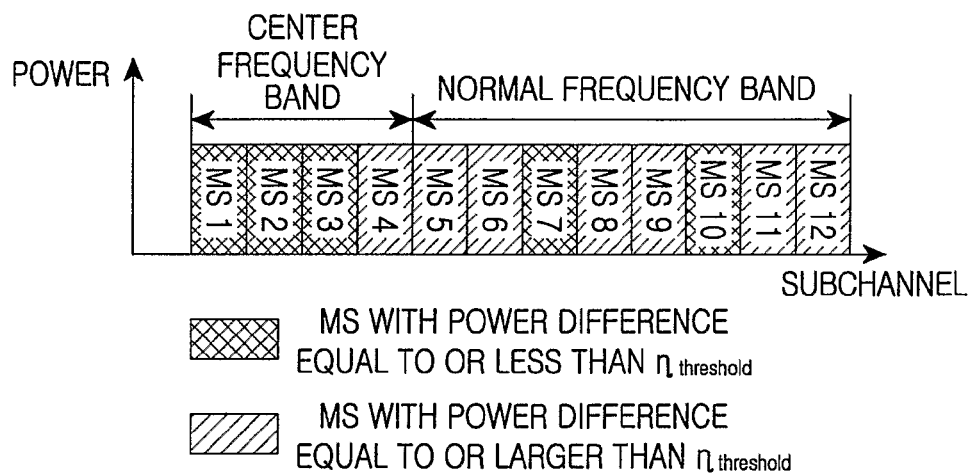

In the case where different numbers of DCA MSs use the center frequency and the normal frequency band, they must be detected, as illustrated in FIG. 54. FIG. 54 illustrates an operation for detecting users using each frequency band when there are different numbers of DCA MSs in the center frequency band and the normal frequency band according to an exemplary embodiment of the present invention.

Figure 55:
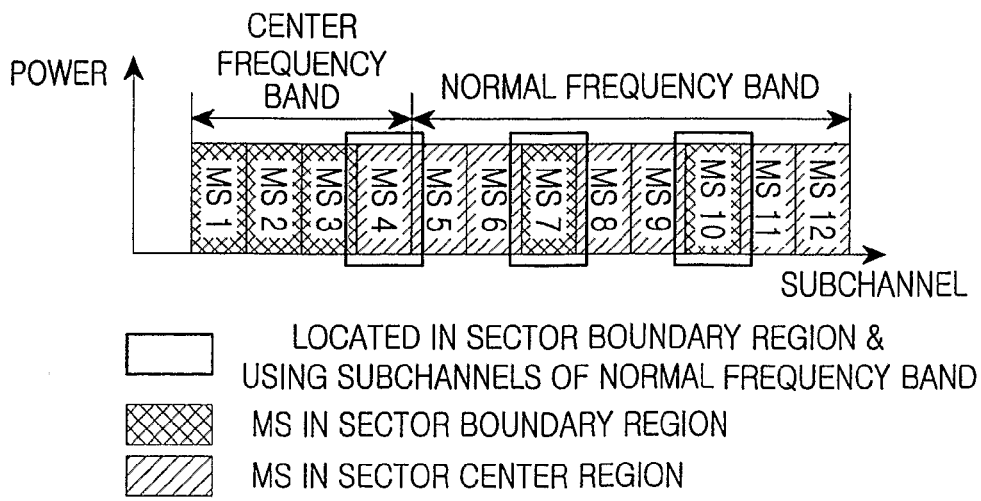
FIG. 55 illustrates an operation for detecting MSs to which resources of the normal frequency band were allocated among MSs with $P_{sector\ boundary}$ less than $\eta_{threshold}$ illustrated in FIG. 54 and detecting MSs to which resources of the center frequency band were allocated among MSs with $P_{sector\ boundary}$ equal to or larger than $\eta_{threshold}$ illustrated in FIG. 54.
Figure 56:
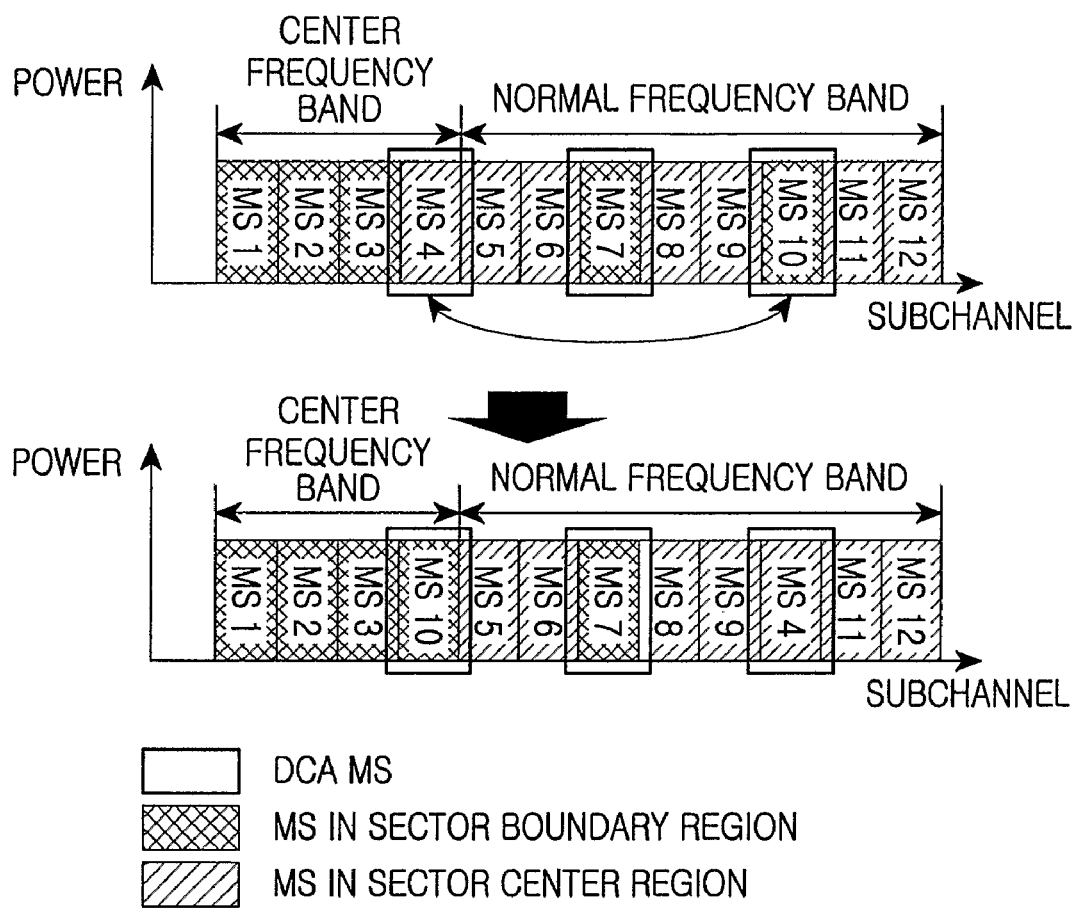
FIG. 56 illustrates an operation for exchanging resources between the MSs to which the resources of the normal frequency band were allocated but are located in a sector boundary region and the MSs to which the resources of the center frequency band were allocated but are located in a sector center region, when the DCA MSs are prioritized according to $P_{sector\ boundary}$ in FIG. 55.

MSs with resources of the normal frequency band are detected among MSs with $P_{sector\ boundary}$ less than $\eta_{threshold}$ and MSs with resources of the center frequency band are detected from among MSs with $P_{sector\ boundary}$ equal to or larger than $\eta_{threshold}$, as illustrated in FIG. 55. Resources should be exchanged between the MSs with resources of the normal frequency band in the sector boundary region and the MSs with resources of the center frequency band in the sector center region. For the resource exchange, the DCA MSs may be prioritized according to $P_{sector\ boundary}$ or $SINR_{user}$. With reference to FIG. 56, the resource exchange will be described when the DCA MSs are prioritized according to $P_{sector\ boundary}$.

FIG. 56 illustrates an operation for exchanging resources between the MSs with resources of the normal frequency band in the sector boundary region and the MSs with resources of the center frequency band in the sector center region, when the DCA MSs are prioritized according to $P_{sector\ boundary}$.

Referring to FIG. 56, since the DCA MSs are prioritized according to $P_{sector\ boundary}$, an MS using the center frequency band with the highest $P_{sector\ boundary}$ takes the highest priority in re-allocation of the normal frequency band, and an MS using the normal frequency band with the lowest $P_{sector\ boundary}$ takes the highest priority in re-allocation of the center frequency band. For example, since $P_{sector\ boundary}$ of MS 10 is lower than that of MS 7, MS 10 is higher in DCA priority than MS 7.

Figure 57:
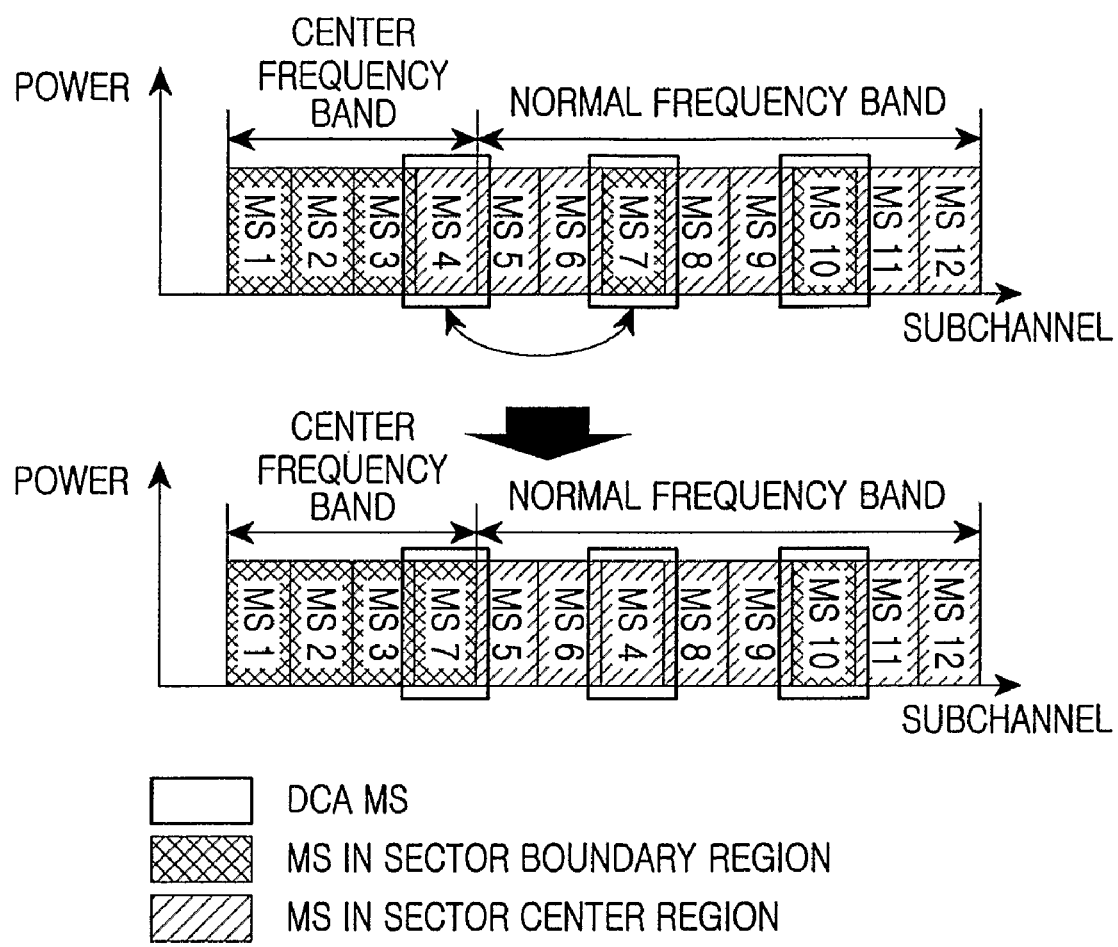
FIG. 57 illustrates an operation for exchanging resources between the MSs to which the resources of the normal frequency band were allocated but are located in a sector boundary region and the MSs to which the resources of the center frequency band were allocated but are located in a sector center region, when the DCA MSs are prioritized according to $SINR_{user}$ in FIG. 55.

With reference to FIG. 57, the resource exchange will be described when the DCA MSs are prioritized according to $SINR_{user}$.

FIG. 57 illustrates an operation for exchanging resources between the MSs with resources of the normal frequency band in the sector boundary region and the MSs with resources of the center frequency band in the sector center region, when the DCA MSs are prioritized according to $SINR_{user}$.

Referring to FIG. 57, since the DCA MSs are prioritized according to $SINR_{user}$, an MS using the center frequency band with the highest $SINR_{user}$ takes the highest priority in re-allocation of the normal frequency band, and an MS using the normal frequency band with the lowest $SINR_{user}$ takes the highest priority in re-allocation of the center frequency band. For example, since $SINR_{user}$ of MS 10 is lower than that of MS 7, MS 10 is higher in DCA priority than MS 7.

When different numbers of DCA MSs exist in the center frequency band and the normal frequency band, they are classified as DCA MSs. Now a DCA method for MSs whose allocated resources are still kept will be described below.

Regarding a DCA MS using a center frequency band, since it is located in a sector center region, resources of a normal frequency band must be re-allocated to the MS. That is, resources are to be re-allocated to the MS by DCA in the manner illustrated in FIGS. 40 to 50.

Regarding a DCA MS to which the normal frequency band was allocated but which are now located in the sector boundary region, resources of the center frequency band must be reallocated to the MS. That is, resources are to be re-allocated to the MS by DCA in the manner illustrated in FIGS. 26 to 36.

An inter-sector DCA according to an exemplary embodiment of the present invention will be described below.

Figure 58:
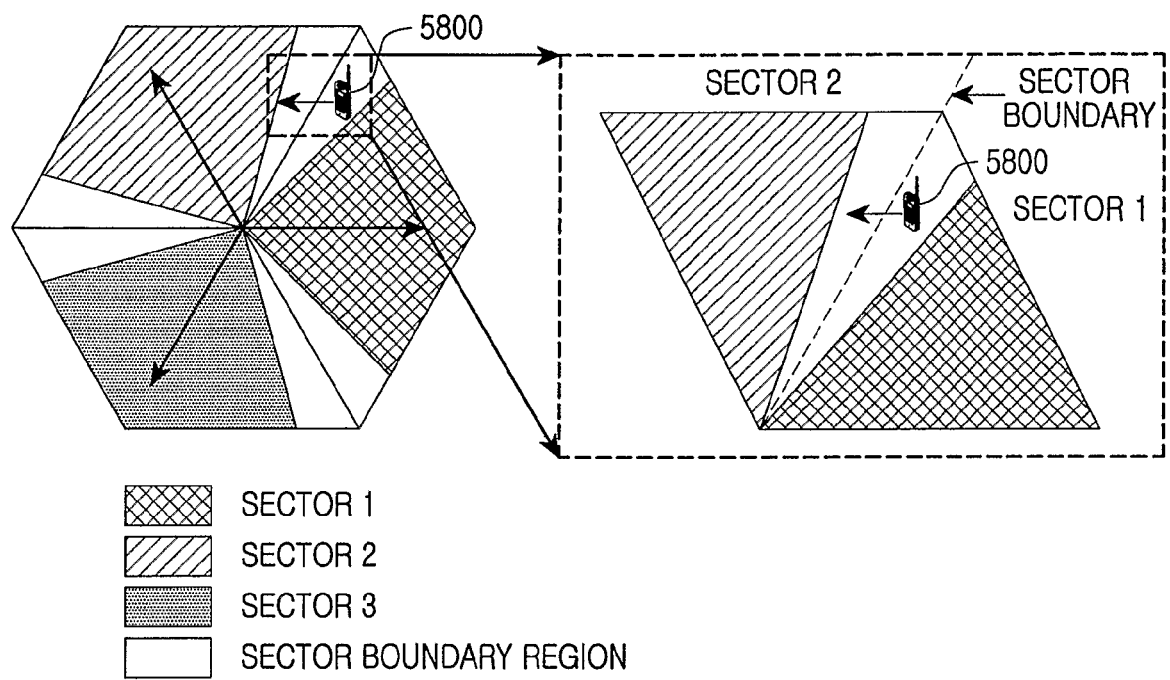
FIG. 58 illustrates an inter-sector handover operation according to an exemplary embodiment of the present invention.

With reference to FIG. 58, an inter-sector handover method according to an exemplary embodiment of the present invention will be described.

FIG. 58 illustrates an inter-sector handover method according to an exemplary embodiment of the present invention.

Referring to FIG. 58, an MS 5800 moves from sector 1 to sector 2, thus triggering an inter-sector handover. For the inter-sector handover, the downlink and the uplink should be considered respectively.

(1) Downlink

As the MS 5800 moves from sector 1 to sector 2, $P_{sector\ boundary}$ calculated with respect to sector 1 is a negative value. This means that the power of a signal received from sector 1 is lower than that of a signal received from sector 2. Therefore, the MS 5800 reports $P_{sector\ boundary}$ to the BS. The BS controls the MS 5800 to connect to sector 2 according to $P_{sector\ boundary}$ and re-allocates resources of the center frequency band of sector 2 to the MS 5800. An inter-sector handover is preferably performed by an MS to which resources of a center frequency band are allocated between sectors.

(2) Uplink

As the MS 5800 moves from sector 1 to sector 2, $P_{sector\ boundary}$ calculated with respect to sector 1 is a negative value. This means that the power of a signal received from sector 1 is lower than that of a signal received from sector 2. Therefore, the MS 5800 reports $P_{sector\ boundary}$ to the BS. The BS controls the MS 5800 to connect to sector 2 according to $P_{sector\ boundary}$ and re-allocates resources of the center frequency band of sector 2 to the MS 5800.

Figure 59:
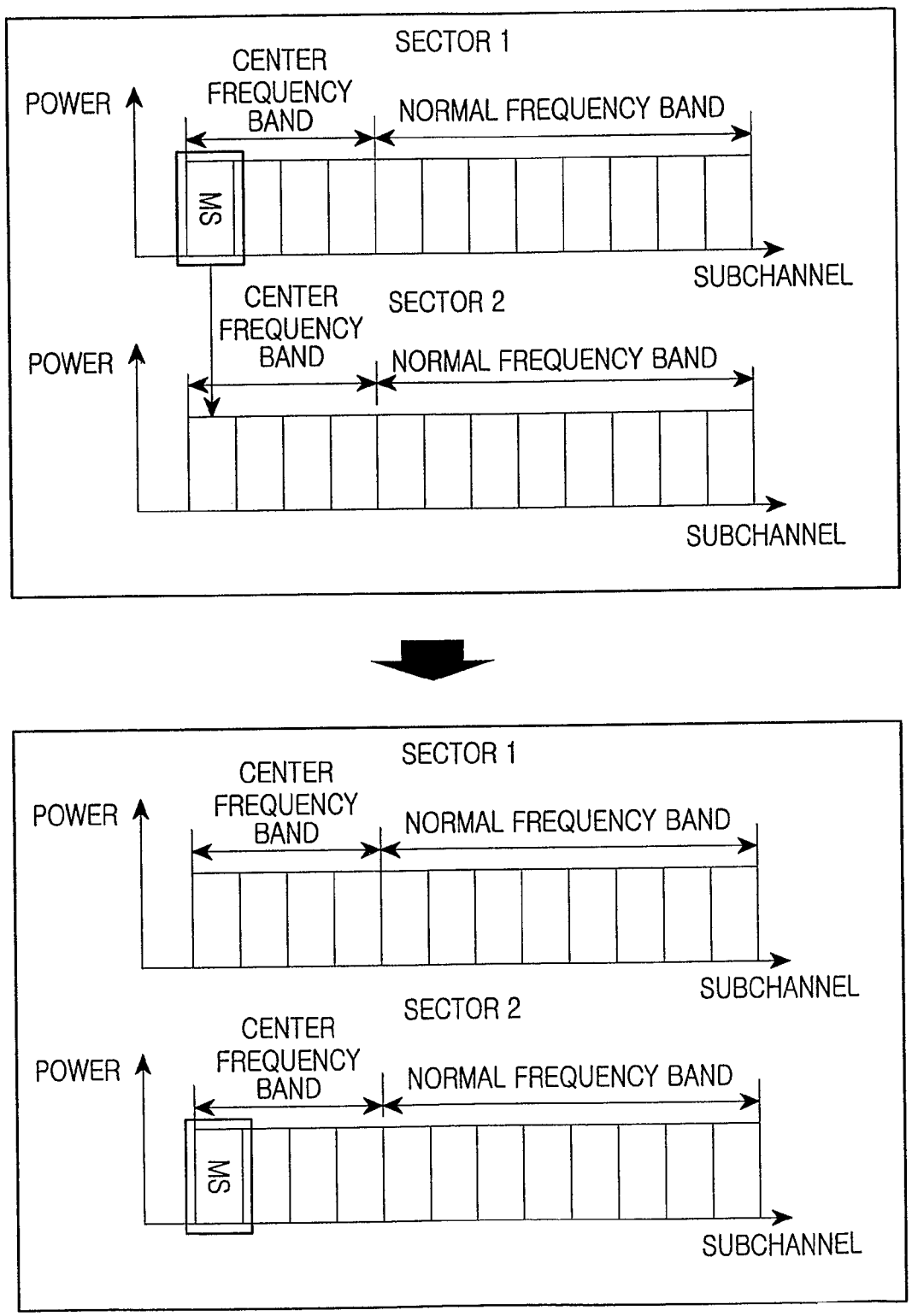
FIG. 59 illustrates an operation for re-allocating resources to an MS 5800 illustrated in FIG. 58 during the inter-sector handover.

With reference to FIG. 59, an operation for re-allocating resources to the MS 5800 during the inter-sector handover will be described.

FIG. 59 illustrates an operation for re-allocating resources to the MS 5800 during the inter-sector handover. As the MS 5800 moves from the sector boundary region of sector 1 to the sector boundary region of sector 2, the BS re-allocates the center frequency band of sector 2 to the MS 5800.

Now a description will be made of a DCA-based handover method according to an exemplary embodiment of the present invention.

Handover is performed in a different procedure according to the following conditions.

(1) Handover is categorized into inter-cell handover (for short, handover) and inter-sector handover (soft handover).

(2) Handover is a process of receiving a service in an MS, while moving from a serving cell to a target cell. Soft handover can be re-defined as an inter-sector DCA and is a process of receiving a service in an MS, while moving from a serving sector to a target sector.

A DCA is an operation for dynamically allocating resources of a center frequency band and a normal frequency band in a sector. By DCA, resources of the center frequency band are dynamically allocated to MSs in the sector boundary region and resources of the normal frequency band are dynamically allocated to MSs in the sector center region. During soft handover, the BS is involved in resource allocation between adjacent sectors. Parameters that determines an inter-sector DCA are with $P_{sector\ boundary}$ equal to or larger than $\eta_{threshold}$ and parameters that determines handover is $HO_{threshold}$ and $SINR_{user}$. $HO_{threshold}$ is an SINR threshold by which an MS is determined to be a handover MS candidate.

A DCA operation according to $P_{sector\ boundary}$, $\eta_{threshold}$, $HO_{threshold}$ and $SINR_{user}$ will be described.

Regarding a DCA operation when an inter-sector DCA is requested for soft handover, if $P_{sector\ boundary} < 0$, the MS has to move from a serving sector to a target sector. Thus, the serving sector should be changed and resources of a center frequency band of the target sector should be allocated to the MS by the inter-sector DCA.

Regarding a DCA operation when the MS to which resources of a normal frequency band were allocated requests re-allocation of resources of a center frequency band, i.e. the MS has moved from a sector center region to a sector boundary region, (1) the number of available subchannels of the center frequency band≧the number of DCA MSs i) $P_{sector\ boundary} \geq \eta_{threshold}$ and $SINR_{user} \geq HO_{threshold}$ The MS is located in the sector center region and is not classified as a handover MS candidate. Thus, the current resources are kept for the MS.

ii) $P_{sector\ boundary} < \eta_{threshold}$ and $SINR_{user} \geq HO_{threshold}$ The MS is located in the sector boundary region and is not classified as a handover MS candidate. Thus, resources of the center frequency band are re-allocated to the MS by DCA.

iii) $P_{sector\ boundary} \geq \eta_{threshold}$ and $SINR_{user} < HO_{threshold}$ The MS is located in the sector center region and is classified as a handover MS candidate. Thus, only a handover operation is performed.

iv) $P_{sector\ boundary} < \eta_{threshold}$ and $SINR_{user} < HO_{threshold}$ The MS is located in the sector boundary region and is classified as a handover MS candidate. Thus, resources of the center frequency band are first re-allocated to the MS by DCA.

In this case, the MS to which resources are re-allocated by DCA has $SINR_{user}$ equal to or larger than $HO_{threshold}$ ($SINR_{user}$ (DCA-based resource-reallocated MS)$\geq HO_{threshold}$), the resources are kept for the MS by DCA. In the opposite case, the MS to which resources are re-allocated by DCA has $SINR_{user}$ below than $HO_{threshold}$ ($SINR_{user}$ (DCA-based resource-reallocated MS)$< HO_{threshold}$) the MS is classified as a handover MS candidate after DCA.

(2) the number of available subchannels of the center frequency band<the number of DCA MSs i) $P_{sector\ boundary} \geq \eta_{threshold}$ and $SINR_{user} \geq HO_{threshold}$ The MS is located in the sector center region and is not classified as a handover MS candidate. Thus, the current resources are kept for the MS.

ii) $P_{sector\ boundary} < \eta_{threshold}$ and $SINR_{user} \geq HO_{threshold}$ The MS is located in the sector boundary region and is not classified as a handover MS candidate. Thus, resources of the center frequency band are re-allocated to MSs by DCA in an ascending order of $SINR_{user}$. If there is no more subchannel available in the center frequency band, current resources are kept for an MS.

iii) $P_{sector\ boundary} \geq \eta_{threshold}$ and $SINR_{user} < HO_{threshold}$ The MS is located in the sector center region and is classified as a handover MS candidate. Thus, only a handover operation is performed.

iv) $P_{sector\ boundary} < \eta_{threshold}$ and $SINR_{user} < HO_{threshold}$ The MS is located in the sector boundary region and is classified as a handover MS candidate. Thus, resources of the center frequency band are re-allocated to MSs by DCA in an ascending order of $SINR_{user}$. If there is no more subchannel available in the center frequency band, an MS is classified as a handover MS candidate.

In this case, the MS to which resources are re-allocated by DCA has $SINR_{user}$ equal to or larger than $HO_{threshold}$ ($SINR_{user}$ (DCA-based resource-reallocated MS)$\geq HO_{threshold}$), the resources are kept for the MS by DCA. In the opposite case, the MS to which resources are re-allocated by DCA has $SINR_{user}$ below than $HO_{threshold}$ ($SINR_{user}$ (DCA-based resource-reallocated MS)$< HO_{threshold}$) the MS is classified as a handover MS candidate after DCA.

Regarding a DCA operation when the MS to which resources of a center frequency band were allocated requests re-allocation of resources of a normal frequency band, i.e. the MS has moved from a sector boundary region to a sector center region, (1) the number of available subchannels of the normal frequency band≧the number of DCA MSs i) $P_{sector\ boundary} \geq \eta_{threshold}$ and $SINR_{user} \geq HO_{threshold}$ The MS is located in the sector center region and is not classified as a handover MS candidate. Thus, resources of the normal frequency band are—reallocated to the MS by DCA.

ii) $P_{sector\ boundary} < \eta_{threshold}$ and $SINR_{user} \geq HO_{threshold}$ The MS is located in the sector boundary region and is not classified as a handover MS candidate. Thus, current resources are kept for the MS.

iii) $P_{sector\ boundary} \geq \eta_{threshold}$ and $SINR_{user} < HO_{threshold}$ The MS is located in the sector center region and is classified as a handover MS candidate. Thus, resources of the normal frequency band are—reallocated to the MS by DCA. Even though resources of the center frequency band are re-allocated to an MS to which resources of the normal frequency band were allocated, the center frequency band is highly vulnerable to inter-sector interference and thus there is a high probability of impossible service provisioning in the center frequency band.

In this case, the MS to which resources are re-allocated by DCA has $SINR_{user}$ equal to or larger than $HO_{threshold}$ ($SINR_{user}$ (DCA-based resource-reallocated MS)$\geq HO_{threshold}$), the resources are kept for the MS by DCA. In the opposite case, the MS to which resources are re-allocated by DCA has $SINR_{user}$ below than $HO_{threshold}$ ($SINR_{user}$ (DCA-based resource-reallocated MS)$<HO_{threshold}$), the MS is classified as a handover MS candidate after DCA.

iv) $P_{sector\ boundary} < \eta_{threshold}$ and $SINR_{user} < HO_{threshold}$ The MS is located in the sector boundary region and is classified as a handover MS candidate. Thus, only a handover operation is performed.

(2) the number of available subchannels of the normal frequency band<the number of DCA MSs i) $P_{sector\ boundary} \geq \eta_{threshold}$ and $SINR_{user} \geq HO_{threshold}$ The MS is located in the sector center region and is not classified as a handover MS candidate. Thus, resources of the normal center frequency band are re-allocated to MSs by DCA in a descending order of $SINR_{user}$. If there is no more subchannel available in the normal frequency band, current resources are kept for an MS.

ii) $P_{sector\ boundary} < \eta_{threshold}$ and $SINR_{user} \geq HO_{threshold}$ The MS is located in the sector boundary region and is not classified as a handover MS candidate. Thus, current resources are kept for the MS.

iii) $P_{sector\ boundary} \geq \eta_{threshold}$ and $SINR_{user} < HO_{threshold}$ The MS is located in the sector center region and is classified as a handover MS candidate. Thus, resources of the normal frequency band are reallocated to the MS by DCA. Even though resources of the center frequency band are re-allocated to an MS to which resources of the normal frequency band were allocated, the center frequency band is highly vulnerable to inter-sector interference and thus there is a high probability of impossible service provisioning in the center frequency band.

In this case, the MS to which resources are re-allocated by DCA has $SINR_{user}$ equal to or larger than $HO_{threshold}$ ($SINR_{user}$ (DCA-based resource-reallocated MS)$\geq HO_{threshold}$), the resources are kept for the MS by DCA. In the opposite case, the MS to which resources are re-allocated by DCA has $SINR_{user}$ below than $HO_{threshold}$ ($SINR_{user}$(DCA-based resource-reallocated MS)$<HO_{threshold}$), the MS is classified as a handover MS candidate after DCA.

iv) $P_{sector\ boundary} < \eta_{threshold}$ and $SINR_{user} < HO_{threshold}$ The MS is located in the sector boundary region and is classified as a handover MS candidate. Thus, only a handover operation is performed.

As is apparent from the above description, the present invention advantageously utilizes resources in the manner that avoids inter-sector interference in an OFDM sectorized cellular communication system. Therefore, an actual system capacity increase that can be achieved by cell sectorization approaches a theoretical system capacity increase from cell sectorization.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. A method for utilizing resources in a communication system, the method comprising:
   dividing a cell into N sectors;
   dividing a total frequency resource into a center frequency portion of the total frequency resource and a normal frequency portion of the total frequency resource;
   dividing the center frequency portion of the total frequency resource into N or more center frequency bands; and
   allocating resources so that up to N sectors each use a respective at least one center frequency band that is not used by another of the up to N sectors, and all of the up to N sectors use a normal frequency band corresponding to the normal frequency portion of the total frequency resource.

2. The method of claim 1, wherein the center frequency bands are one of contiguous and discontiguous in frequency and the normal frequency band is one of contiguous and discontiguous in frequency.

3. The method of claim 1, further comprising:
   controlling each of the up to N sectors to generate a plurality of subchannels using resources of the respective at least one center frequency band and to generate a plurality of subchannels using resources of the normal frequency band; and
   controlling each of the up to N sectors to allocate subchannels.

4. The method of claim 3, wherein the total frequency resource includes a plurality of unit frequency bands and each of the subchannels includes at least one unit frequency band.

5. The method of claim 1, wherein the size of each of the center frequency bands and the size of the normal frequency band are variable.

6. The method of claim 1, wherein the resource allocation comprises allocating the respective at least one center frequency band to each of the N sectors,
   wherein the center frequency bands of the N sectors are mutually orthogonal in the cell.

7. The method of claim 1, further comprising dividing each of the up to N sectors into a sector boundary region and a sector center region.

8. The method of claim 7, wherein the resource allocation comprises allocating resources of the respective at least one center frequency band to a Mobile Station (MS) in the sector boundary region and allocating resources of the normal frequency band to an MS in the sector center region.

9. The method of claim 8, wherein the sector boundary region is a region where an inter-sector interference equal to or larger than an interference requirement exists and the sector center region is a region where an interference below the interference requirement exists or no interference exists.

10. The method of claim 7, wherein the resource allocation comprises allocating resources of the respective at least one center frequency band and resources of the normal frequency band to an MS located in the sector boundary region or the sector center region according to a predetermined Dynamic Channel Allocation (DCA) scheme.

11. A system for utilizing resources in a communication system, the system comprising:
a resource allocation system for dividing a cell into N sectors, dividing a total frequency resource into a center frequency portion of the total frequency resource and a normal frequency portion of the total frequency resource, dividing the center frequency portion of the total frequency resource into N or more center frequency bands, and allocating resources so that up to N sectors each use a respective at least one center frequency band that is not used by another of the up to N sectors, and all of the up to N sectors use a normal frequency band being the normal frequency portion of the total frequency resource.

12. The system of claim 11, wherein the center frequency bands are one of contiguous and discontiguous in frequency and the normal frequency band is one of contiguous and discontiguous in frequency.

13. The system of claim 11, wherein the resource allocation system controls each of the up to N sectors to generate a plurality of subchannels using resources of the respective at least one center frequency band and to generate a plurality of subchannels using resources of the normal frequency band, and controls each of the up to N sectors to allocate subchannels.

14. The system of claim 13, wherein the total frequency resource includes a plurality of unit frequency bands and each of the subchannels includes at least one unit frequency band.

15. The system of claim 11, wherein the size of each of the center frequency bands and the size of the normal frequency band are variable.

16. The system of claim 11, wherein the respective at least one center frequency band is allocated to each of the N sectors, and
wherein the center frequency bands of the N sectors are mutually orthogonal in the cell.

17. The system of claim 11, wherein the resource allocation system divides each of the up to N sectors into a sector boundary region and a sector center region.

18. The system of claim 17, wherein the resource allocation system allocates resources of the respective at least one center frequency band to a Mobile Station (MS) in the sector boundary region and allocates resources of the normal frequency band to an MS in the sector center region.

19. The system of claim 18, wherein the sector boundary region is a region where an inter-sector interference equal to or larger than an interference requirement exists and the sector center region is a region where an interference below the interference requirement exists or no interference exists.

20. The system of claim 17, wherein the resource allocation system allocates resources of the respective at least one center frequency band and resources of the normal frequency band to an MS located in the sector boundary region or the sector center region according to a predetermined Dynamic Channel Allocation (DCA) scheme.

* * * * *